US009808383B2

(12) United States Patent
Mulhern et al.

(10) Patent No.: US 9,808,383 B2
(45) Date of Patent: *Nov. 7, 2017

(54) ELEVATED HEIGHT WHEELCHAIR

(71) Applicant: PRIDE MOBILITY PRODUCTS CORPORATION, Exeter, PA (US)

(72) Inventors: James P. Mulhern, Nanticoke, PA (US); Stephen J. Antonishak, Nanticoke, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,148

(22) Filed: Apr. 18, 2016

(65) Prior Publication Data

US 2016/0228311 A1    Aug. 11, 2016

Related U.S. Application Data

(63) Continuation of application No. 14/572,559, filed on Dec. 16, 2014, now Pat. No. 9,351,889.
(Continued)

(51) Int. Cl.
*A61G 5/06* (2006.01)
*A61G 5/04* (2013.01)
(Continued)

(52) U.S. Cl.
CPC ............... *A61G 5/06* (2013.01); *A61G 5/04* (2013.01); *A61G 5/042* (2013.01); *A61G 5/104* (2013.01);
(Continued)

(58) Field of Classification Search
CPC .......... A61G 5/063; A61G 5/068; A61G 5/04; A61G 5/043; A61G 5/06; A61G 3/006;
(Continued)

(56) References Cited

U.S. PATENT DOCUMENTS

| 2,586,273 A | 2/1952 | Steven |
| 3,375,105 A | 3/1968 | Lynch |

(Continued)

FOREIGN PATENT DOCUMENTS

| CA | 2254372 A1 | 5/2000 |
| CN | 103169579 A | 6/2013 |

(Continued)

OTHER PUBLICATIONS

Jazzy 600 ES Owner's Manual, Pride Mobility Products Corporation, INFMANU4480/RevB/Jun. 2013, pp. 1-32.
(Continued)

*Primary Examiner* — Hau Phan
*Assistant Examiner* — Jacob Meyer
(74) *Attorney, Agent, or Firm* — Baker & Hostetler LLP

(57) ABSTRACT

Embodiments of the present disclosure include a wheelchair configured to reposition an occupant between a lowered and a raised position. The wheelchair can include a frame, a seat moveable relative to the frame, a drive wheel, and one or more pairs of arm assemblies. The arm assembly includes a wheel configured to move from a first spatial location when the wheel chair is operating on flat, level ground to a second spatial location that is different than the first spatial location. Arm limiters can selectively engage the arm assembly based on at least one of a seat position, position of the arm assembly and surface conditions of ground surface. The arm limiters can limit the range of motion of the arm assembly and sometimes other operational aspects of the chair.

31 Claims, 53 Drawing Sheets

Related U.S. Application Data

(60) Provisional application No. 61/938,880, filed on Feb. 12, 2014, provisional application No. 61/916,500, filed on Dec. 16, 2013.

(51) Int. Cl.
*A61G 5/10* (2006.01)
*B60K 31/02* (2006.01)
*A61G 5/12* (2006.01)
*B60K 31/00* (2006.01)

(52) U.S. Cl.
CPC ......... *A61G 5/1059* (2013.01); *A61G 5/1078* (2016.11); *A61G 5/1089* (2016.11); *A61G 5/122* (2016.11); *A61G 5/125* (2016.11); *A61G 5/127* (2016.11); *A61G 5/128* (2016.11); *B60K 31/02* (2013.01); *A61G 2203/10* (2013.01); *A61G 2203/14* (2013.01); *A61G 2203/42* (2013.01); *A61G 2203/70* (2013.01); *B60K 2031/0091* (2013.01)

(58) Field of Classification Search
CPC .. A61G 5/1078; A61G 5/1089; A61G 5/1059; Y10S 180/907
See application file for complete search history.

(56) References Cited

U.S. PATENT DOCUMENTS

| | | | |
|---|---|---|---|
| 3,964,725 A | 6/1976 | Matsui | |
| 4,842,233 A | 6/1989 | Rusin | |
| 5,108,493 A | 4/1992 | Causton | |
| 5,209,322 A | 5/1993 | McMahon | |
| 5,601,302 A | 2/1997 | Beard et al. | |
| 5,772,237 A | 6/1998 | Finch et al. | |
| 5,904,214 A | 5/1999 | Lin | |
| 5,964,473 A * | 10/1999 | Degonda | A61G 5/043 180/907 |
| 6,070,898 A * | 6/2000 | Dickie | A61G 5/043 180/65.1 |
| 6,129,165 A * | 10/2000 | Schaffner | A61G 5/042 180/65.1 |
| 6,142,568 A | 11/2000 | Abelbeck et al. | |
| 6,202,773 B1 | 3/2001 | Richey, II et al. | |
| 6,234,507 B1 | 5/2001 | Dickie et al. | |
| 6,357,793 B1 | 3/2002 | Dickie et al. | |
| 6,454,286 B1 * | 9/2002 | Hosino | A61G 5/06 280/124.11 |
| 6,460,641 B1 * | 10/2002 | Kral | A61G 5/043 180/209 |
| 6,484,829 B1 | 11/2002 | Cox | |
| 6,540,250 B1 | 4/2003 | Peterson | |
| 6,554,086 B1 | 4/2003 | Goertzen | |
| 6,615,937 B2 | 9/2003 | Richey, II et al. | |
| 6,776,430 B2 * | 8/2004 | White | A61G 5/045 180/907 |
| 6,851,711 B2 * | 2/2005 | Goertzen | A61G 5/043 280/124.104 |
| 6,923,278 B2 * | 8/2005 | Mulhern | A61G 5/043 180/209 |
| 7,003,381 B2 | 2/2006 | Wakefield, II | |
| 7,040,429 B2 | 5/2006 | Molnar | |
| 7,090,241 B2 | 8/2006 | Silva | |
| 7,104,346 B2 | 9/2006 | Schaffner | |
| 7,150,463 B1 * | 12/2006 | Liao | A61G 5/063 180/65.1 |
| 7,219,924 B2 * | 5/2007 | Mulhern | G06F 9/383 180/65.51 |
| 7,232,008 B2 | 6/2007 | Levi | |
| 7,264,272 B2 * | 9/2007 | Mulhern | A61G 5/043 180/65.1 |
| 7,306,247 B2 | 12/2007 | Wu | |
| 7,311,329 B2 | 12/2007 | Mulhern et al. | |
| 7,316,282 B2 | 1/2008 | Mulhern et al. | |
| 7,370,876 B2 | 5/2008 | Hsu et al. | |
| 7,374,002 B2 | 5/2008 | Fought | |
| 7,380,824 B2 | 6/2008 | Chen et al. | |
| 7,419,176 B2 | 9/2008 | Perk | |
| 7,516,984 B2 | 4/2009 | Tang | |
| 7,556,109 B2 | 7/2009 | Chen et al. | |
| 7,694,990 B2 | 4/2010 | Goertzen et al. | |
| 7,708,093 B1 | 5/2010 | Baker | |
| 7,726,689 B2 * | 6/2010 | Mulhern | A61G 5/042 180/907 |
| 7,735,591 B2 | 6/2010 | Grymko et al. | |
| 7,748,490 B2 | 7/2010 | Hornick | |
| 7,766,106 B2 | 8/2010 | Puskar-Pasewicz | |
| 7,921,954 B2 | 4/2011 | Johnson et al. | |
| 7,931,300 B2 * | 4/2011 | Mulhern | A61G 5/042 180/907 |
| 7,942,445 B2 * | 5/2011 | Kramer, Jr. | B62H 1/12 180/907 |
| 8,050,820 B2 | 11/2011 | Yanaka et al. | |
| 8,078,365 B2 | 12/2011 | Emilsson | |
| 8,113,531 B2 * | 2/2012 | Zhou | A61G 5/043 180/209 |
| 8,118,321 B2 | 2/2012 | Hunziker et al. | |
| 8,172,015 B2 | 5/2012 | Molnar | |
| 8,181,992 B2 * | 5/2012 | Mulhern | A61G 5/042 180/907 |
| 8,272,461 B2 * | 9/2012 | Bekoscke | A61G 5/043 180/65.1 |
| 8,297,388 B2 | 10/2012 | Lindenkamp et al. | |
| 8,362,872 B2 | 1/2013 | Clapperton | |
| 8,408,343 B2 | 4/2013 | Puskar-Pasewicz | |
| 8,408,598 B2 * | 4/2013 | Mulhern | A61G 5/042 180/907 |
| 8,556,347 B2 | 10/2013 | Lin | |
| 8,573,341 B2 | 11/2013 | Fought | |
| 8,851,214 B2 | 10/2014 | Mirzaie | |
| 8,910,975 B2 * | 12/2014 | Bekoscke | A61G 5/043 180/65.1 |
| 8,925,943 B2 | 1/2015 | Molnar | |
| 9,010,470 B2 * | 4/2015 | Cuson | A61G 5/06 180/65.31 |
| 9,308,143 B2 | 4/2016 | Bekoscke et al. | |
| 9,320,661 B2 | 4/2016 | Mirzaie | |
| 9,333,132 B2 | 5/2016 | Bruestle et al. | |
| 9,358,165 B2 | 6/2016 | Wu | |
| 9,370,455 B2 | 6/2016 | Molnar | |
| 2002/0149168 A1 | 10/2002 | Brown | |
| 2003/0205420 A1 | 11/2003 | Mulhern et al. | |
| 2004/0262859 A1 | 12/2004 | Turturiello | |
| 2005/0046129 A1 | 3/2005 | Antonisak et al. | |
| 2005/0077715 A1 * | 4/2005 | Mulhern | A61G 5/042 280/755 |
| 2005/0206124 A1 | 9/2005 | Levi et al. | |
| 2006/0022445 A1 * | 2/2006 | Mulhern | A61G 5/042 280/755 |
| 2006/0076748 A1 * | 4/2006 | Pauls | A61G 5/043 280/124.11 |
| 2006/0087166 A1 | 4/2006 | Trippensee et al. | |
| 2006/0120837 A1 | 6/2006 | Hung et al. | |
| 2007/0084648 A1 | 4/2007 | DuFresne | |
| 2007/0208483 A1 | 9/2007 | Rabin | |
| 2007/0278761 A1 | 12/2007 | Firth | |
| 2008/0106060 A1 * | 5/2008 | Knopf | A61G 5/02 280/250.1 |
| 2008/0133089 A1 | 6/2008 | Bayomy | |
| 2008/0157513 A1 | 7/2008 | Cheng | |
| 2008/0265541 A1 * | 10/2008 | Mulhern | A61G 5/042 280/124.106 |
| 2009/0257855 A1 | 10/2009 | Iannelli | |
| 2010/0004820 A1 | 1/2010 | Bekoscke | |
| 2010/0219623 A1 * | 9/2010 | Mulhern | A61G 5/042 280/755 |
| 2011/0108348 A1 * | 5/2011 | Mulhern | A61G 5/042 180/291 |
| 2012/0143400 A1 | 6/2012 | Hinkel, III | |
| 2012/0217081 A1 * | 8/2012 | Mulhern | A61G 5/042 180/291 |

(56) References Cited

U.S. PATENT DOCUMENTS

| | | |
|---|---|---|
| 2013/0111660 A1 | 5/2013 | Wilson |
| 2013/0220717 A1 | 8/2013 | Mulhern et al. |
| 2013/0253769 A1 | 9/2013 | Kamo et al. |
| 2014/0019011 A1 | 1/2014 | Lofstrand |
| 2014/0262566 A1* | 9/2014 | Davis .................. A61G 5/1056 180/54.1 |
| 2015/0173985 A1* | 6/2015 | Mulhern ................ A61G 5/042 180/24.02 |
| 2015/0196441 A1* | 7/2015 | Mulhern ................ A61G 5/04 180/170 |
| 2015/0202102 A1 | 7/2015 | Dunham |
| 2016/0120715 A1 | 5/2016 | Farmer |

FOREIGN PATENT DOCUMENTS

| | | |
|---|---|---|
| CN | 103230319 A | 8/2013 |
| EP | 1 523 971 A2 | 4/2005 |
| JP | 08238274 A | 9/1996 |
| JP | 11188064 A | 7/1999 |
| JP | 2001-104391 | 4/2001 |
| WO | WO 90/06097 | 6/1990 |
| WO | WO 00/21478 | 4/2000 |
| WO | WO 02/34190 | 5/2002 |
| WO | WO 2013/123398 A1 | 8/2013 |
| WO | WO 2016/041087 A1 | 3/2016 |

OTHER PUBLICATIONS

International Patent Application No. PCT/US2014/070652: International Search Report & Written Opinion dated Oct. 5, 2015 (36 Pages).

\* cited by examiner

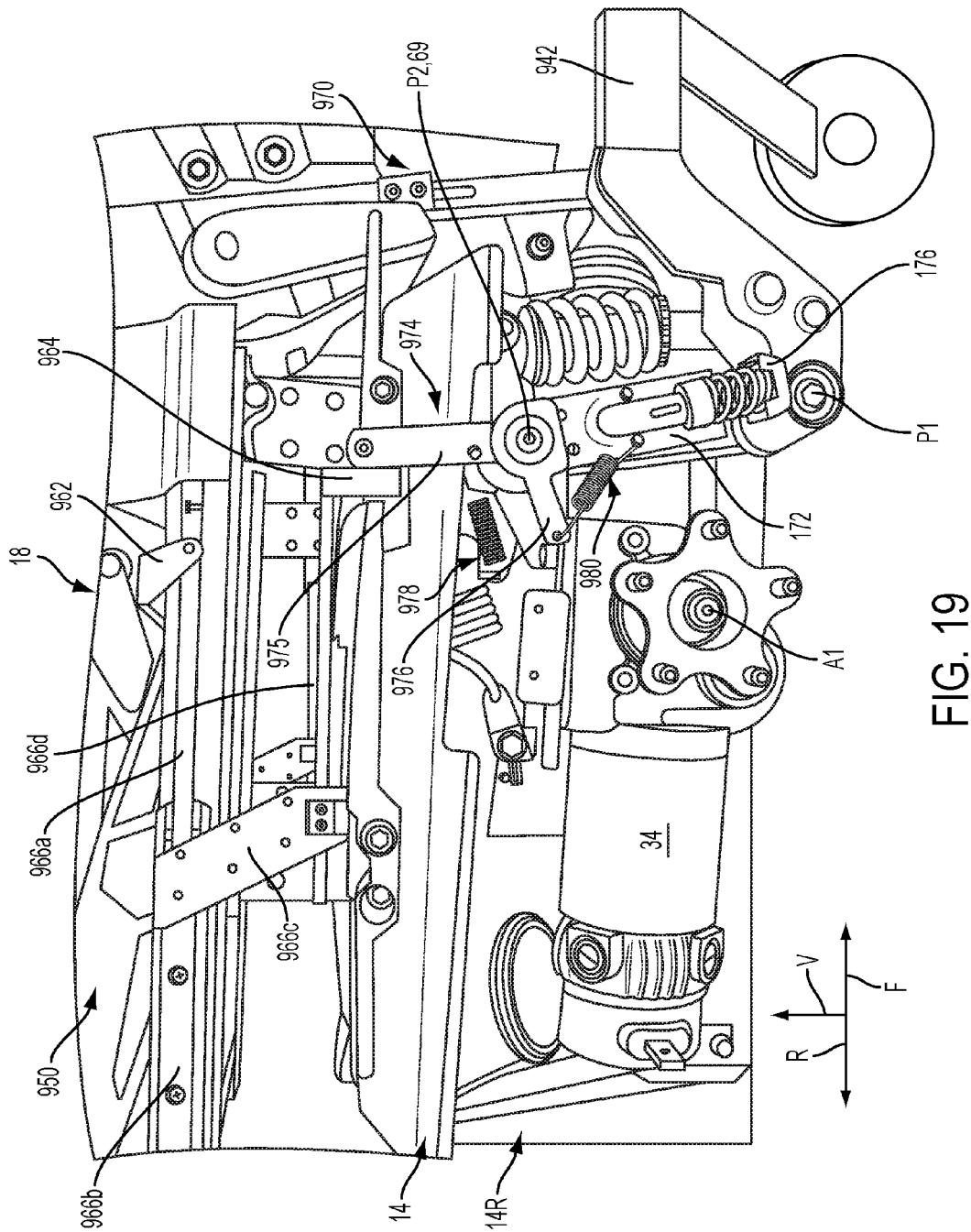

ELEVATED HEIGHT WHEELCHAIR

CROSS-REFERENCE TO RELATED APPLICATIONS

This application is a continuation of U.S. application Ser. No. 14/572,559, filed Dec. 16, 2014, now U.S. Pat. No. 9,351,889 which claims the benefit of and priority to U.S. Provisional Application No. 61/916,500, filed Dec. 16, 2013, and U.S. Provisional Application No. 61/938,880, filed Feb. 12, 2014. The entire contents of each application listed in this paragraph are incorporated by reference into this application for all purposes.

TECHNICAL FIELD

The present application relates to a wheelchair, and in particular to a power wheelchair configured to operate at least in an elevated mode where an occupant is elevated.

BACKGROUND

Wheelchairs are an important means of transportation for a significant portion of society. Whether manually propelled or powered, wheelchairs provide an important degree of independence for those they assist. However, this degree of independence can be limited if the wheelchair is required to traverse obstacles such as, for example, curbs that are commonly present at sidewalks and other paved surface interfaces, and door thresholds. Accordingly, power wheelchairs have been the subject of increasing development efforts to provide handicapped and disabled persons with independent mobility to assist them in leading even more normal and active lives.

To aid in climbing curbs, some power wheelchairs typically have a pair of forward extending anti-tip assemblies that are rotatably coupled to the wheelchair frame. The arm members of the anti-tip assemblies are rotatably coupled to the wheelchair frame such that when the wheelchair encounters a curb, the anti-tip assemblies will pivot upwardly to thereby allow the wheelchair to traverse the curb. Some power wheelchairs also have elevatable seats that permit the occupant to move at "eye-level" with persons walking with them. Wheelchairs operating with seats at elevated positions are susceptible to instability under certain conditions.

SUMMARY

Embodiments of the present disclosure include a wheelchair configured to reposition an occupant between a lowered and a raised position. The wheelchair can include a frame, a seat moveable relative to the frame, a drive wheel, and one or more pairs of arm assemblies. The arm assembly includes a wheel configured to move from a first spatial location when the wheel chair is operating on flat, level ground, to a second spatial location that is different than the first spatial location. Arm limiters can selectively engage the arm assembly dependent on at least one of a seat position, position of the arm assembly, and surface conditions of ground surface. The arm limiters can limit the range of motion of the arm assembly and sometimes other operational aspects of the chair.

BRIEF DESCRIPTION OF THE DRAWINGS

The foregoing summary, as well as the following detailed description of example embodiments of the application, will be better understood when read in conjunction with the appended drawings, in which there is shown in the drawings example embodiments for the purposes of illustration. It should be understood, however, that the application is not limited to the precise systems and methods shown. In the drawings:

FIG. 19 is a partial side perspective view of the powered wheelchair shown in FIGS. 18A-18B, with the drive wheel removed to illustrate a linkage assembly and an arm limiter assembly according to an embodiment of the present disclosure;

DETAILED DESCRIPTION OF ILLUSTRATIVE EMBODIMENTS

Figure 1:
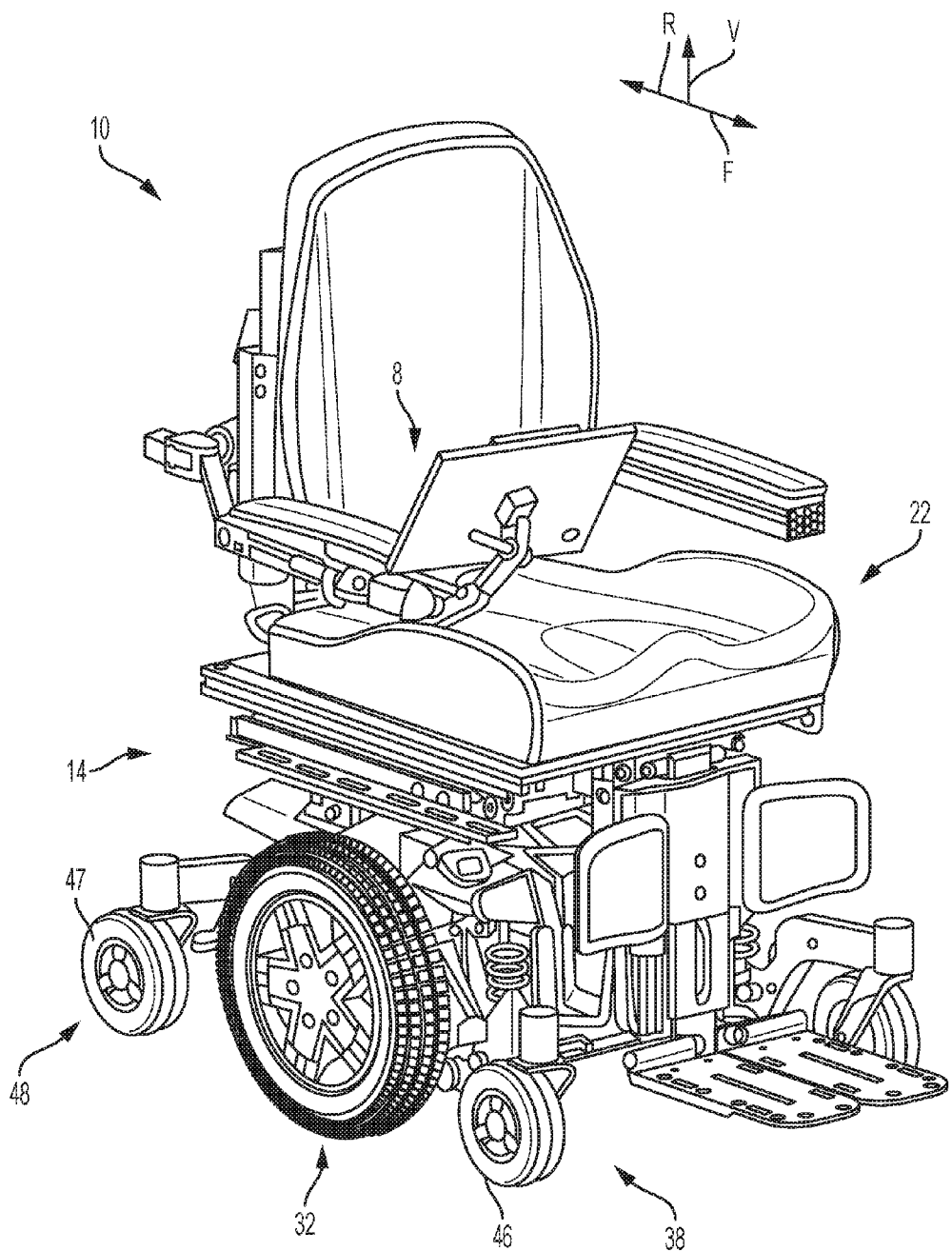
FIG. 1 is a top perspective view of a powered wheelchair in accordance with an embodiment of the present disclosure.

Embodiments of the present disclosure include wheelchairs configured to elevate a seated occupant and operate the wheelchair in a safe, stable condition dependent on the occupant position, ground surface features, and/or one or more wheelchair operational parameters. Referring to FIGS. 1-2B, an embodiment of the present disclosure includes a wheelchair 10 configured to elevate a seat 22 between a conventional lowered position and a raised position that allows an occupant to operate the wheelchair 10 with the seat at the raised position, which in some circumstances can be at a conversational height with others who are standing or walking along with the wheelchair 10. The wheelchair 10 may be a powered wheelchair. In some embodiments, wheelchair 10 is configured to selectively limit certain operational aspects when, for example, the wheelchair 10 is in the process of traversing an obstacle, is on un-level ground, and/or when the seat is raised. Likewise, the wheelchair 10 may prevent the raising of the seat when the wheelchair is climbing an obstacle or is on unlevel ground. An "obstacle" as the term is used herein includes any relatively raised or lowered structure on the ground surface G that the wheel must ascend or descend to cross over. Operating a wheelchair when the seat is in the raised position can create instability, especially when climbing curbs or transitioning to a descent when appropriate safety features are not deployed. For instance, when the seat is in the fully raised position, the center of gravity of the occupied wheelchair is elevated and/or shifted forward or rearward (depending, for example, on the lift mechanism associated with the chair). The risk of tipping can increase on an incline and overall wheelchair stability can be compromised, especially when traversing or attempting to traverse an obstacle. The wheelchair 10 as described herein improves stability when the seat 22 is in the raised position such as when the individual is at a conversational height with someone who is standing. As a result of improved stability chair travelling speeds can be increased. Increased traveling speeds may include walking speeds, jogging speeds or running speeds. Conversational height as used herein refers to when the occupant is elevated above the ground surface G to make communication with others (e.g., average height adult males or females) standing or walking next to wheelchair easier. For example, conversational height could be "eye-level."

Figure 2A:
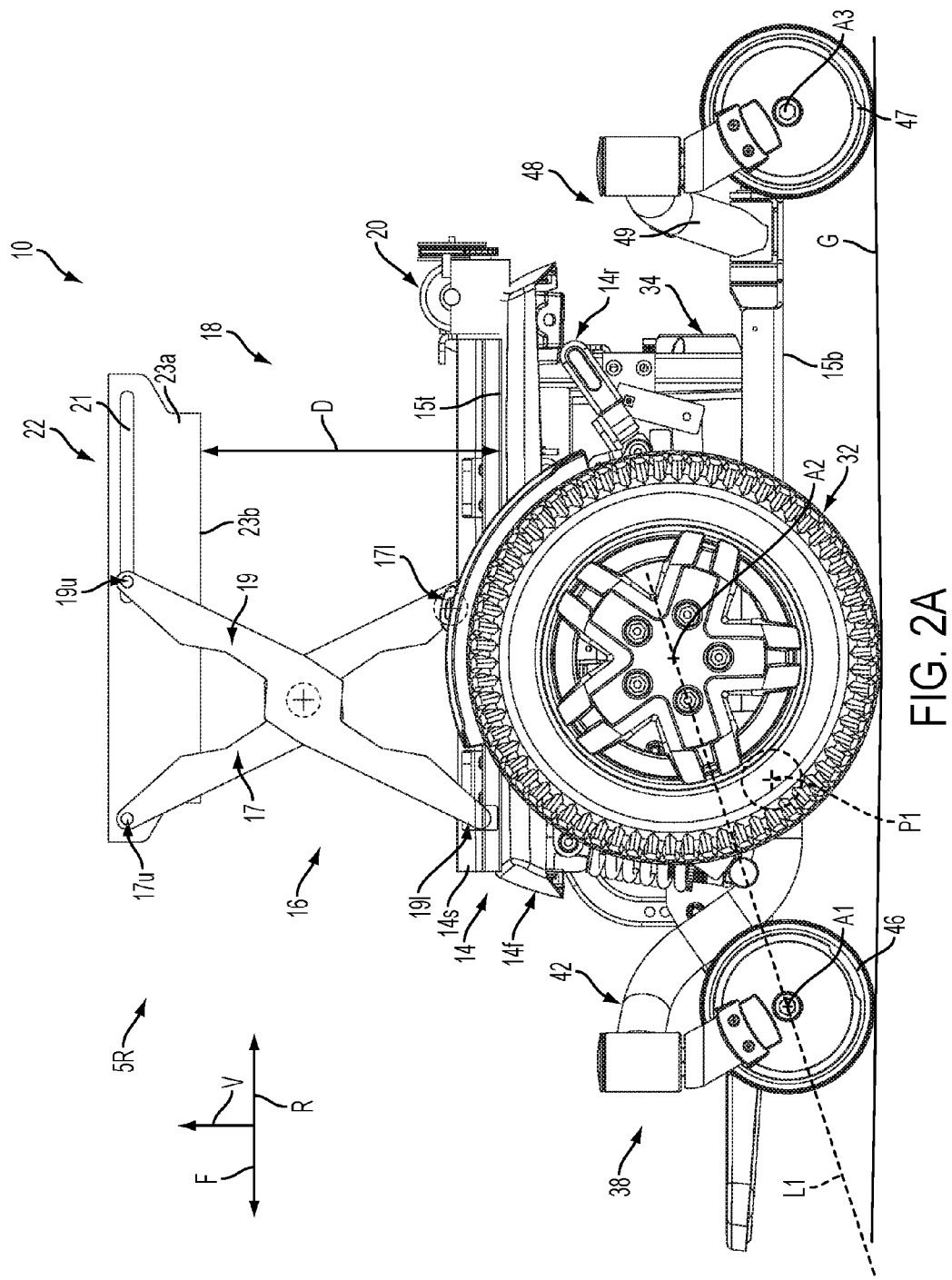
FIG. 2A is a side elevation view of the powered wheelchair shown in FIG. 1, with a portion of the seat removed and illustrating the seat in a raised position.
Figure 2B:
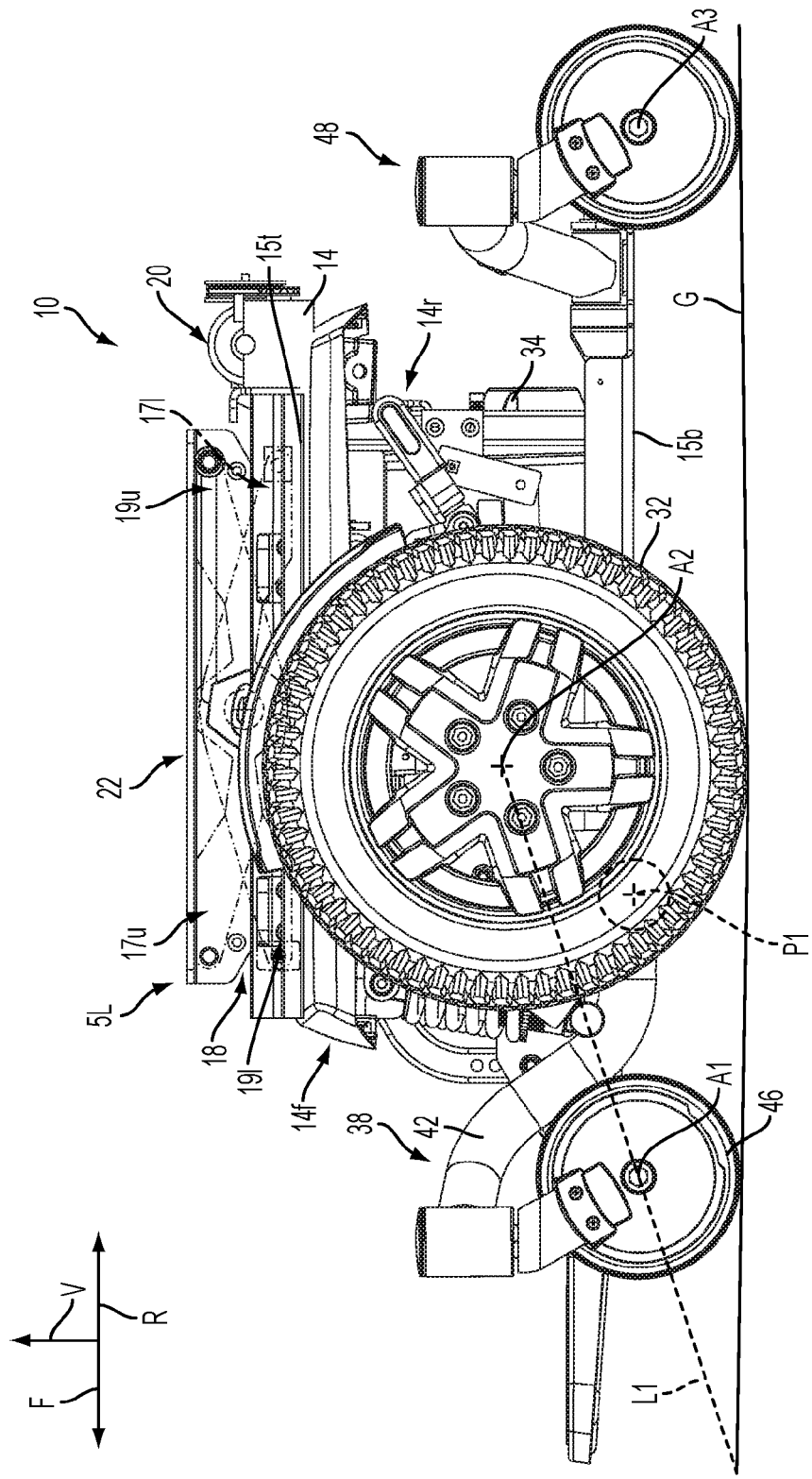
FIG. 2B is a side elevation view of the powered wheelchair shown in FIG. 2A, showing the seat in the lowered position.

The powered wheelchair 10 includes a frame 14, a pair of drive wheels 32 coupled to the frame 14 and driven by at least one drive motor 34 (FIG. 2A). A pair of anti-tip arm assemblies 38 may extend from the frame 14 in a forward direction F relative to the drive wheels 32. A pair of rear arm assemblies 48 may extend from the frame 14 in a rearward direction R that is opposite to the forward direction F. As used herein the forward-rearward direction F-R may refer the horizontal direction when the wheelchair is operating on flat, level ground. In accordance with the illustrated embodiment, the wheelchair 10 is a mid-wheel drive power wheelchair and includes front wheels 46 and rear wheels 49 disposed in the forward and rearward directions F and R relative to the drive wheels 32, respectively. The drive motor 34 causes the drive wheels 32 to rotate about the drive wheel axis A2 to advance the wheelchair along the surface G. The front wheel 46 is rotatable about the front wheel axis A1 and the rear wheel 47 is rotatable about the rear wheel axis A3. The present disclosure, however, is not limited to mid-wheel powered wheel chairs.

The powered wheelchair 10 may also includes a lift mechanism 18 mounted to the frame 14 with the seat 22 supported by the lift mechanism 18. The lift mechanism 18 is configured to, in response to inputs an occupant applies to an input device 8, move the seat 22 between a lowered position 5L (FIGS. 1 and 2B) and a raised position 5R (FIG. 2A) generally along a vertical direction V that is perpendicular the forward and rearward directions F and R. While a scissor-type lift mechanism that is actuated by a lead screw mechanism is illustrated and described below, any type of lift mechanism may be employed. Further, the wheelchair can be configured to move the seat into the raised position and tilt the seat base and seat back relative to each other in the raised position. In an embodiment, the wheelchair can include a lift and tilt mechanism, such as the lift and tilt mechanism disclosed in U.S. Patent App. Pub. No. 2014/

0262566, entitled "Lift Mechanism And Tilt Mechanism For A Power Wheelchair," incorporated by reference herein in its entirety.

Figure 3A:
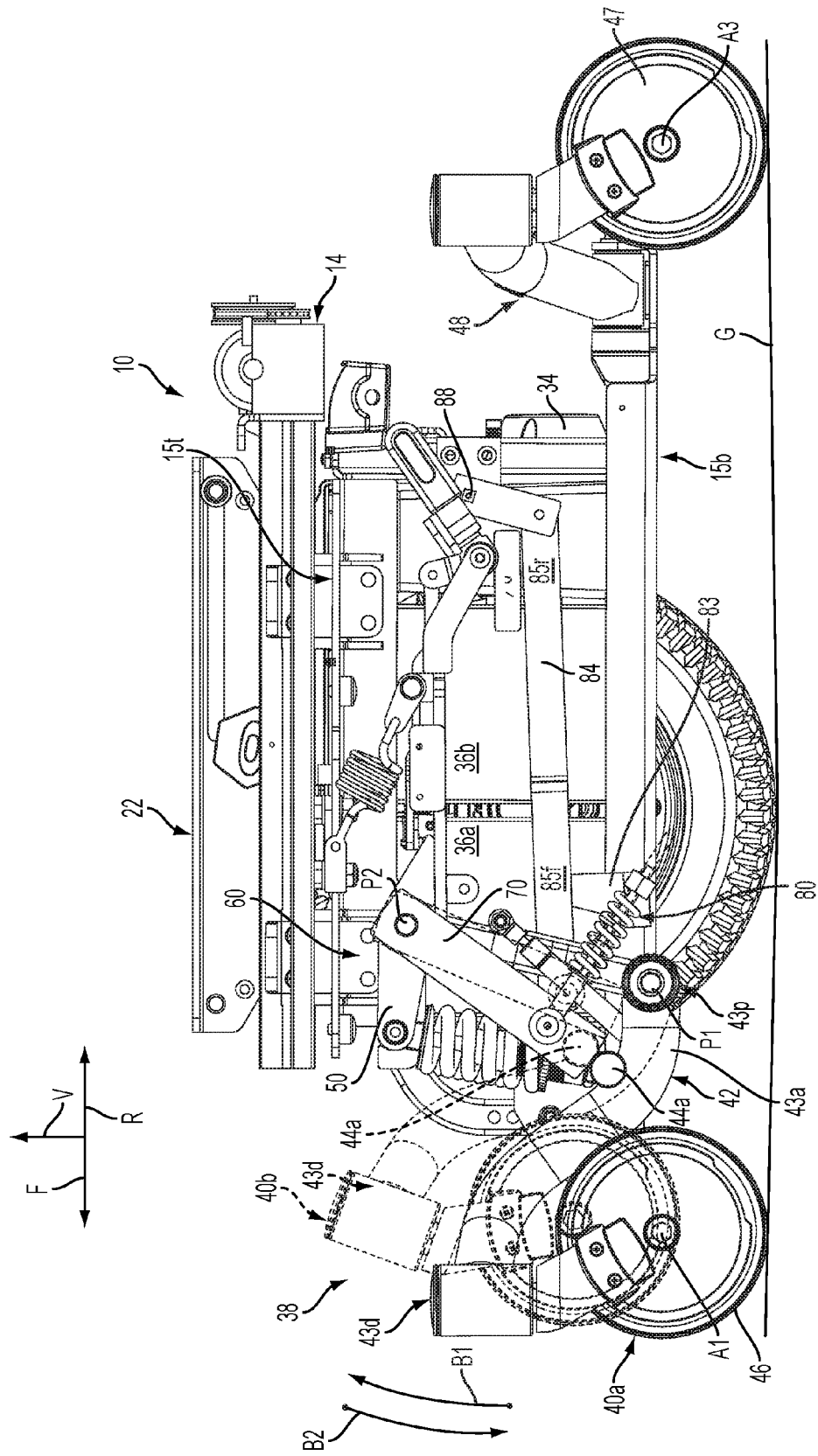
FIG. 3A is a side elevation view of the powered wheelchair shown in FIG. 2B, with a drive wheel removed to illustrate a forward arm assembly and an arm limiter according to an embodiment of the present disclosure.

The powered wheel chair 10 also includes one or more arm limiter assemblies 60, shown for example in FIG. 3A, coupled the frame 14 and configured to selectively engage the anti-tip assemblies 38 so as to inhibit relative motion between the anti-tip assemblies 38 and frame 14 in certain instances during operation of the wheelchair 10. Preventing relative motion between anti-tip assemblies 38 and the frame 14 can limit certain operations of the wheelchair 10 in order to improve stability and occupant safety. The arm limiter assemblies 60 transition between a first or disengaged configuration and a second or locked configuration where operation of the anti-tip assemblies 38 are limited. Further, operation of arm limiter assemblies 60 may be limited, inhibited, impaired or delayed when the wheelchair is traversing an obstacle. For instance, the arm limiter assemblies 60 may not transition into a locked configuration if the anti-tip assemblies are already attempting to traverse an obstacle, as will be further discussed below. For just one instance, operation of the lift mechanism 18 can be limited so that the seat cannot be moved to the raised position when the wheelchair is climbing an obstacle or descending along an incline. The wheelchair 10 is configured to safely operate in a mode whereby the seat 22 of the wheelchair 10 is raised to a raised position at the conversational height with walking companions and the wheelchair 10 is capable of safely advancing along the surface G, for instance a normal speed, such as normal walking speed.

The power wheelchair 10 has different operational modes, such as a standard mode and one or more elevated motion modes. In some embodiments, a control system 90 (FIG. 5) includes a controller 92 configured to operate the wheelchair 10 in the different operational modes, an input device 8 in electronic communication with the controller 92, and a plurality of sensors 96a-96c in electronic communication with the controller 92. The controller 92 is responsive to inputs from the input device 8 and one or more of the sensors 96a-96c in order to cause the powered wheelchair 10 to operate at least in (i) a standard mode when the seat 22 is in the lowered position such that the wheelchair is moveable along the surface G in accordance with standard drive parameters (that is, conventional parameters that are not limited for elevated seat operation), and (ii) one or more elevated motion modes whereby the seat is in the raised position and drive parameters are limited to some extent. The elevated motion modes may include A) a first or normal elevated motion mode where the wheelchair is capable operating according to a first set of limited drive parameters, and B) a second elevated motion mode (sometimes referred to as an elevated-inhibited mode) whereby the wheelchair 10 is capable of operating according to a second set of limited drive parameters that have limits that are typically less than upper limits of the first set of limited drive parameters. The phrase "drive parameters" as used herein (whether in standard or elevated modes) include at least a speed (miles/hr), acceleration, and deceleration of the wheelchair. In some embodiments, the drive parameters include directional components, such as forward speed, reverse speed, and turn speed, forward acceleration, forward deceleration, reverse acceleration, and reverse deceleration. For brevity and ease of illustration, the standard and elevated modes below are described with reference to the speed of the wheelchair. However, it should be appreciated that the ranges and limits discussed below with respect to speed are applicable to the other drive parameters such as turn speed, acceleration, and deceleration described above.

In accordance with the illustrated embodiment, the standard mode is when the seat 22 is in the lowered position such that the wheelchair is moveable along the surface G at typical wheelchair speeds. The first elevated motion mode can be when the wheelchair is capable of moving at a first speed range, up to a maximum raised-seat drive speed, which is less than the typical wheelchair speeds. The second elevated motion mode (or an elevated-inhibited mode) is when the wheelchair 10 is capable of moving at a second elevated mode speed range, up to a maximum raised-inhibited drive speed that is less than the upper limit of the first speed range.

In the standard mode the wheelchair can move at a standard or lowered-seat drive speed range that is typical of conventional wheelchairs, such as between 0.0 mph and about 10.0 mph. Accordingly, it should be appreciated that the fully lowered-seat drive speed can have an upper limit that is anywhere in the conventional range of between a practical minimum (or at rest at 0 mph) and, for example, 10.0 mph as indicated. Furthermore, it should be appreciated that when the wheelchair is operating in the standard mode, the wheelchair 10 can be configured to move at any speed as desired and is not limited to a speed that is between the practical minimum and 10.0 mph. The powered wheelchair 10 would typically be in the standard mode (that is, with the seat in the fully-lowered position) when the wheelchair is traversing obstacles O (FIG. 4C) such as a curb. The term "standard mode" includes a mode that has no speed restrictions by the controller that are related to seat position.

When in the elevated motion modes, the wheelchair 10 can be configured to move at a speed that has a limit that is less than the standard mode drive speed upper limit. In the elevated motion modes, the power wheelchair preferably is capable of moving at a walking speed (or perhaps faster) while seat 22 is in the raised position such that the occupant is at the conversational height with a person walking next the powered wheelchair. In an exemplary embodiment, when in the normal elevated motion mode, the first speed range is between a practical minimum and 5.0 mph, preferably between the practical minimum and 3.75 mph. That is, the wheelchair 10 can be configured to move at a maximum raised-seat drive speed that is no more than 5.0 mph, preferably no more than 3.75 mph. It should be appreciated that the raised-seat drive speed can have an upper limit that is anywhere between first speed range of the practical minimum to 5.0 mph. Furthermore, when the wheelchair 10 is operating in the normal elevated motion mode, there may be circumstances in which the upper limit may be set higher than 5.0 mph. The term "practical minimum" speed as used herein means that the lower limit of the range is chosen according to the parameters understood by persons familiar with wheelchair structure and function, and may be close to zero mph under some conditions.

In an instance in which wheelchair 10 is operating in the elevated motion mode, and at least one safety criteria is not met, the controller will cause the wheelchair 10 to operate in some mode other than the first, normal elevated motion mode. For example, the controller may cause the wheelchair 10 to operate in the second elevated motion mode or elevated inhibited mode at least until all of the safety criteria are met. For example, in some embodiments, if the seat 22 is in the raised position and one of the safety criteria is not met, the controller will allow the wheelchair 10 to move within the second, elevated-inhibited speed range, up to the reduced maximum raised-inhibited speed that is less then maximum raised-seat drive speed. The maximum raised-inhibited drive speed can be a speed that is no more than 3.0 mph, preferably no more than 1.5 mph. It should be appreciated, however, that the raised-inhibited drive speed can have any upper limit as desired so long as it is less than an upper limit of the first, normal speed range.

Accordingly, in order for the wheelchair 10 to operate in the elevated motion modes, certain safety criteria should be satisfied as will be discussed further below. The sensors 96a-96c can collectively detect information indicative of when the wheelchair 10 is in a position to safely operate in the elevated motion modes. If the sensors 96a-96c detect a condition that indicates that it is not safe to operate the wheelchair in the elevated motion mode, the controller 92 will operate the wheelchair 10 in some other mode such as the elevated inhibited mode or standard mode (that is, by requiring the seat to be in the lowermost position). In certain instances, for example, the wheelchair 10 will not operate in the elevated motion modes, i.e., the seat 22 will not move into the raised position if the seat 22 is initially in the lowered position and the wheelchair 10 is ascending an obstacle or descending down an incline.

Turning to FIGS. 2A-2B, the frame 14 supports the drive wheels 32, anti-tip assemblies 38, rear assemblies 48, the lift mechanism 18 and seat 22. As illustrated, the frame 14 includes a front end 14f, a rear end 14r spaced from the front end 14f in a forward direction F, a bottom 15b, and a top 15t spaced from the bottom 15b in the vertical direction V. The frame 14 further supports one or more batteries 36a and 36b, the drive motors 34, and various control modules that are used to operate the powered wheelchair.

The lift mechanism 18, in some embodiments, includes left and right of scissor assemblies 16 operatively connected to frame 14, a lift motor 20, and a lift control system (which preferably is integrated with the controller described herein) that can be used to impart a lifting force and rate by which the seat 22 moves from the lowered position to the raised position. One scissor assembly will be described below for ease of illustration. The other scissor assembly is constructed similarly. The scissor assembly 16 includes first and second scissor bars 17 and 19 that extend between the seat 22 and the frame 14 and are rotatably coupled to each other. The first scissor bar 17 has an upper end 17u fixed to the seat 22 and a lower end 17l that is moveably coupled to the top 15t of the frame 14. For instance, the lower end 17l can be movably coupled to a support rack 14s attached to or extending monolithically from the top 15t of the frame 14. The second scissor bar 19 includes an upper end 19u that is moveably coupled to the seat 22. As illustrated, the upper end 19u extends partly into an elongate slot 21 defined in the seat frame 23a. The lower end 19l of the scissor bar 19 is fixed to the frame 14, for instance to the support rack 14s.

The motor 20 is operatively coupled to the lower end 17l of the scissor bar 17 and is configured to cause the lower end 17l to translate along the frame 14 in the forward and rearward directions F and R. The lift motor 20 is operatively coupled to a drive actuator, such as a threaded shaft, that is connected to the lower end 17l of the scissor bar 17. For instance, a threaded nut (not shown) is fixed, directly or indirectly, to the lower end 17l and the drive screw extends through the threaded nut. Operation of the motor turns the drive screw in the drive nut, which causes translation of the lower end 17l to advance along the drive screw depending on rotational direction of the drive screw. In operation, when the seat is raised, the lower end 17l of the scissor bar 17 is disposed toward the central region of the frame 14 and when the seat 22 is in the lowered position, the lower end 17l of the scissor bar 17 is has translated closer to the rear end 14r of the frame 14. As the lower end 17l translates along the frame 14, the upper end 19u of the second scissor bar 19 translates along the elongated slot 21 of the seat 22 as the seat 22 is lowered toward the frame 14. The seat 22 is a seat assembly that includes a base, a seat back (base and seat back not numbered or shown in FIGS. 2A and 2B), seat frame 23a that supports the base. The seat frame 23a defines a seat bottom 23b that faces the frame 14. The distance D extends from the top 15t of the frame 14 to the bottom 23b of the seat 22 along a vertical direction V. The distance D increases as the seat 22 is moved from the lowered position 5L to the raised position 5R, and decreases the seat 22 is moved from the raised position 5R to the lowered position 5L. The lift mechanism illustrated is exemplary only. And it should be appreciated that the lift mechanism is not limited to scissor-type mechanisms or the use of screw-type actuators as described above.

Figure 3B:
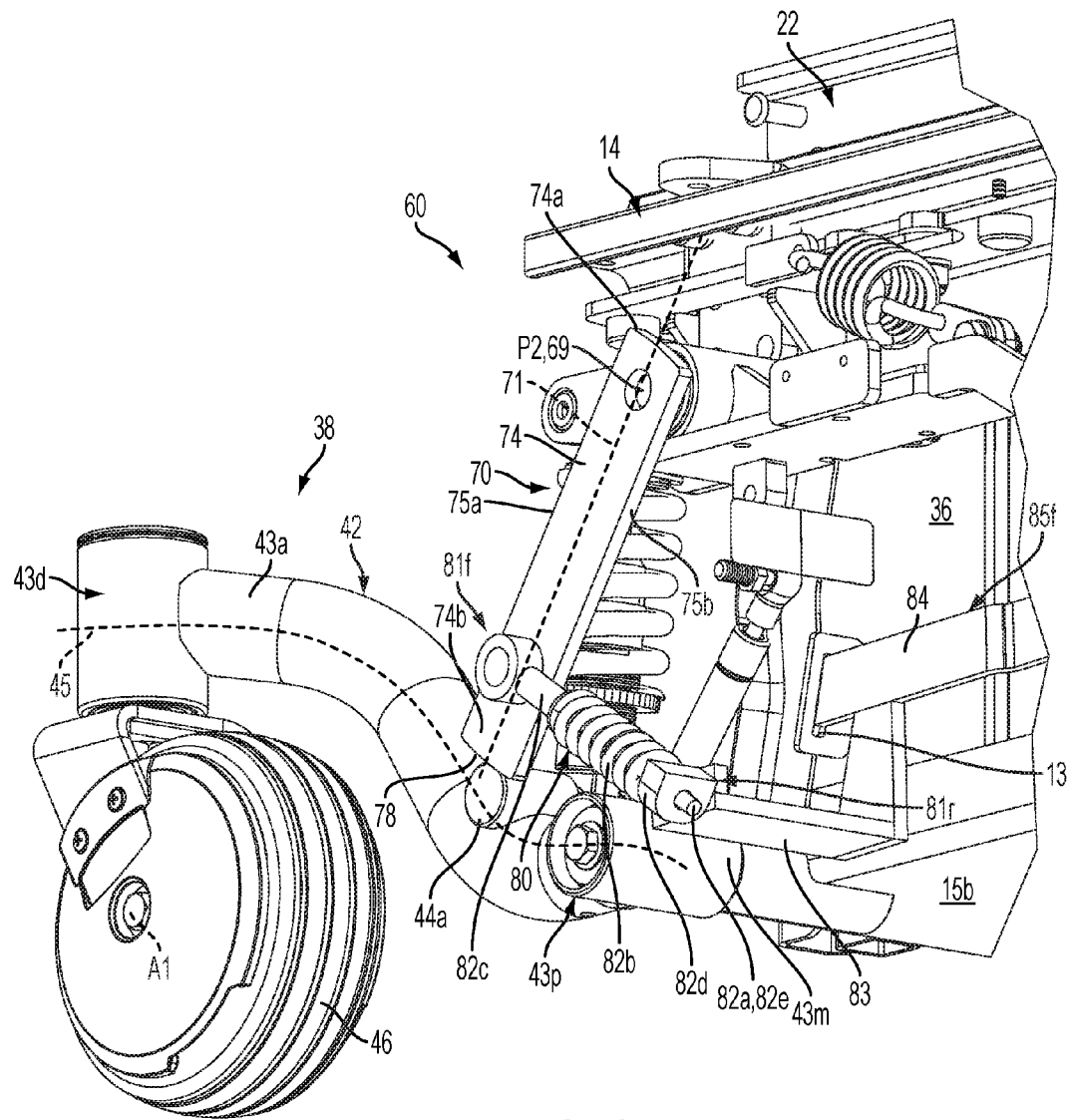
FIG. 3B is a rear perspective of a portion of the powered wheelchair shown in FIG. 3A.

Turning to FIGS. 3A and 3B, as noted above, the wheelchair 10 includes a pair of anti-tip arm assemblies 38. For ease of illustration only one anti-tip arm assembly 38 will be described below. The other anti-tip assembly 38 in the pair preferably has the same structure but oriented on the opposite hand. The anti-tip arm assembly is also referred to in this disclosure as an arm assembly 38. The arm assembly 38 includes an arm member 42 moveably coupled to the frame 14, a front wheel 46 coupled to the arm member 42, and at least one stop member 44a disposed along the arm member 42. In the illustrated embodiment, the arm member 42 includes an arm body 43a that defines an arm proximal end 43p and an arm distal end 43d spaced from the arm proximal end 43p along an arm body axis 45. The arm member body 43a is curved along the arm axis 45 such that distal end 43d is spaced a greater vertical distance from the surface G compared to the vertical distance that the proximal end 43p is spaced from the surface G. The curved arm body 43a provides clearance for the wheel assembly. It should be appreciated that the arm member body 43a could be linear along the arm axis 45 in other embodiments. The distal end 43d of the arm member 42 includes a distal housing 43n that receives an assembly to carries the front wheel 46. The proximal end 43p defines a proximal housing 43m that holds and/or defines a connector (not numbered) that is coupled to the frame 14. The arm member body 43a can be any structure, such as an elongate tube, bar, rod or plate and may or may not have uniform or substantially uniform cross section between proximal end 43p and distal end 43d. As illustrated, the arm member body 43a is tubular and is exemplary only. In other embodiments, the arm member body 43a can be or may include a bar or plate with a substantially rectilinear cross-section perpendicular the arm axis 45. In still other embodiments, the arm member 42 that can be formed of multiple components that are connected together with fasteners or welds, or pivotally attached together, without limitation. In other embodiments, the arm member body can be a monolithic structure, such as a cast or extruded material.

The front wheel 46 is coupled to the distal end 43d and is rotatable about the front wheel axis A1. As illustrated, the front wheel 46 is in contact with ground or surface G during normal operation. The distal end 43d of arm member includes a caster assembly (not numbered) supported by the distal housing. The caster assembly rotatably couples the front wheel 46 to the arm member 42 such that wheel 46 is rotatable about an axis (not shown) that is normal to the ground surface G and perpendicular the wheel axis A1. It should be appreciated, however, that in some embodiments, the front wheel 46 can be an anti-tip wheel that is raised or otherwise spaced from the ground or surface G during normal operation in a configuration that does not include a caster. The term "anti-tip" wheel as used herein encompasses caster wheel assemblies (such as front wheel 46) and anti-tip wheels that are raised during normal operation and encompasses wheels in the front and the rear of the wheelchair. In such embodiments, the raised anti-tip wheels can have a first or rest position 40A when the wheelchair 10 is operating on flat, level ground.

Continuing with FIGS. 3A and 3B, the arm assembly 38 is coupled to the frame 14 and configured to move the wheel 46 relative to the frame 14 upon encountering an obstacle. The arm assembly 38 illustrated in FIGS. 3A and 3B is pivotably coupled the frame 14 such that the arm assembly 38 and wheel axis A1 pivots about the pivot axis P1. It should be appreciated, however, that the arm assemblies can be coupled to the frame 14 such that the arm member 42 and wheel axis A1 translates relative to the frame 14, e.g. as illustrated in wheelchair 610 shown in FIGS. 14A and 14B. Accordingly, the powered wheelchair is configured such that the spatial location of the arm member 42 and front wheel axis A1 are moveable, rotationally and/or translatably (e.g., relative to the frame and/or drive axis as opposed to spinning about its axle or caster kingpin). The words "move," "moveable", or "movement" when used in reference to motion of the arm member and front wheel includes rotational movement (FIGS. 3A, 3B and 18A) and translational movement (FIGS. 14A and 14B) (and is not intended to include rotation about a front wheel axis A1 or wheel axle).

In the embodiment illustrated in FIGS. 3A and 3B, the arm assembly 38 is coupled to the frame 14 and configured to pivot such that the arm member 42 and wheel axis A1 is pivotable about the axis P1 along a rotational direction B1-B2. For instance, the arm assembly 38 is configured to pivot about the pivot axis P1 as the wheelchair 10 traverses obstacles along the surface G, such as a curb. The arm assembly 38 is configured so that arm member 42 is in a first or rest position 40A relative to the frame 14 when the wheelchair 10 is operating on flat, level ground (that is, "normal operation"). When the wheelchair encounters an obstacle, the arm member 42 pivots upwardly about axis P1 in a first or upward rotational direction B1 toward a second position 40b that is different from the first position 40A. In this regard, the second position 40b is different from the first position 40A along 1) both the vertical direction V and the forward-rearward direction F-R, or 2) only the vertical direction V. When the front wheel 46 encounters a descent down a curb, however, the arm member 42 pivots downwardly about the axis P1 in a second or downward rotational direction B2 that is opposite the first rotational direction B1 (which movement below ground G is not shown in the figures). The second position 40b as used herein can mean a position that is different from the first position 40A in an upward or downward direction. When viewing the figures, the first rotational direction is clockwise and the second rotational direction is counterclockwise. The extent that the arm member 42 pivots about the pivot axis P1 is referred to herein as the range of rotation or range of motion as further described below. Further, while reference is made to the arm member 42 having a first position 40A and a second position 40b that is different than the first position 40A, the first and second positions 40A and 40b also refer to the relative locations of the wheel axis A1 when encountering an obstacle. It should be appreciated that the wheel axis A1 can be repositioned from a first position 40A into a second position 40b.

Figure 14A:
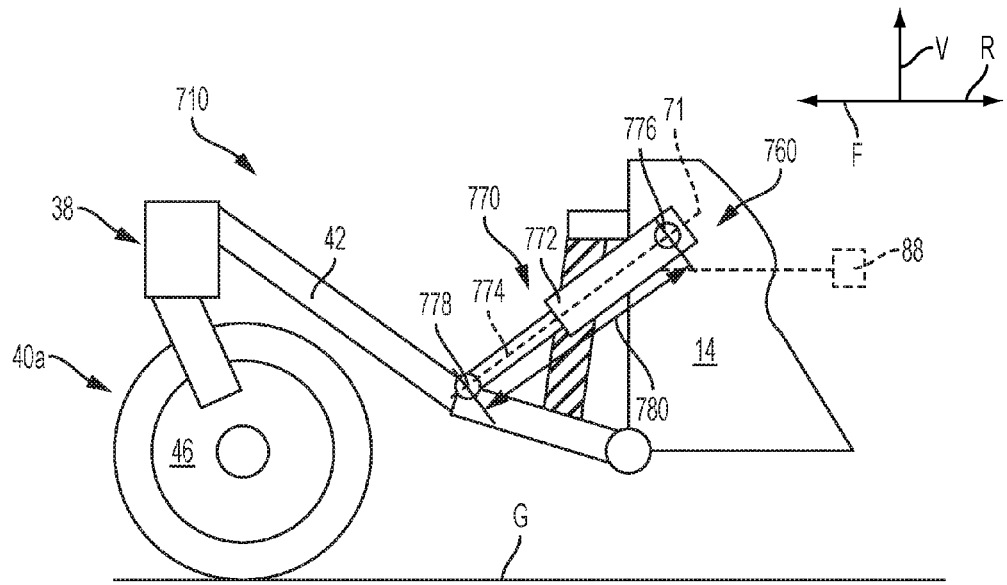
FIG. 14A is a schematic side elevation view of a portion of the powered wheelchair, illustrating the arm assembly on flat, level ground and an arm limiter assembly in an open configuration.
Figure 14B:
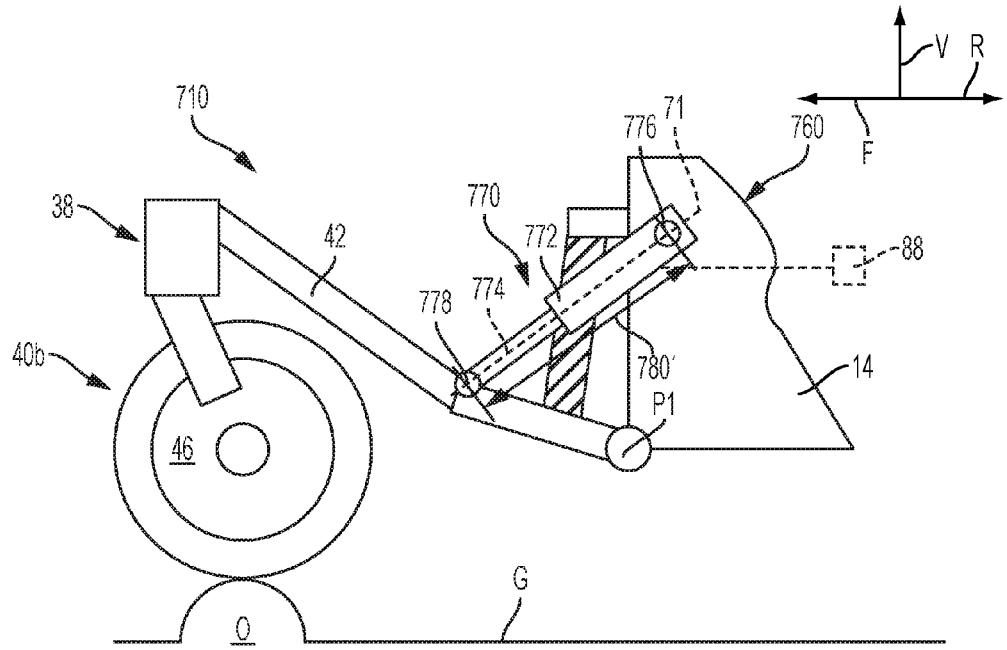
FIG. 14B is a side elevation view a portion of the powered wheelchair shown in FIG. 14A, illustrating the arm assembly translated upwardly as the powered wheelchair ascends an obstacle.

As noted above, the arm assembly 38 can be configured such that the arm member 42 and wheel axis A1 is translatable between the first position 40A to the second position 40b. For example, as illustrated in FIGS. 14A and 14B, arm assemblies 638 are coupled to the frame 14 such that the arm member 42 and wheel axis A1 is translatable between the first position 40A and the second position 40b along a linear direction C that is offset with respect to the vertical direction V and forward-rearward direction F-R. In such an embodiment, the second position 40b is different from the first position 40A along 1) the vertical direction V or the forward-rearward direction F-R. Operation of the wheel chair 610 and arm assembly 638 is further detailed below. The translating arm assemblies 638 can be similar to the arm assemblies disclosed in U.S. Pat. No. 7,232,008, entitled, "Active anti-tip wheels for power wheelchair," (the 008 Patent) assigned to Pride Mobility Products Corporation. The disclosure of the 008 Patent is incorporated by reference herein.

Continuing with FIGS. 3A and 3B, the proximal end 43p of the arm member 42 is pivotably coupled to the frame 14 such that the proximal end 43p defines the pivot axis P1. However, the arm member 42 can be pivotably coupled to the frame 14 at a location disposed forward from the proximal end 43p. In other words, the pivot P1 can be defined at any location along the arm member 42 between the proximal end 43p and distal end 43d. In addition, in some embodiments, the pivot axis P1 is disposed below a line L1 (FIGS. 2A and 2B) that intersects the front wheel rotational axis A1 and the drive wheel rotational axis A2. The wheelchair 10 can be considered a "low pivot" axis type wheelchair, such as that disclosed in U.S. Pat. No. 8,181, 992, (the 992 Patent) entitled "Anti-tip system for a power wheelchair." The disclosure of the 992 Patent is incorporated by reference into this disclosure to define a low pivot axis type wheelchair. However, the wheelchair 10 is not required to be a low-pivot axis type wheelchair.

Continuing with FIGS. 3A and 3B, the stop member 44a is located on or is part of the arm member 42 so as to, in some circumstances, engage the arm limiter assembly 60. In the illustrated embodiment, the distance from the pivot axis P1 to the stop member 44a along the arm axis 45 is less than the distance from the stop member 44a to the distal end 43d of the arm member 42. In certain embodiments, the position of the stop member 44a toward the distal end 43d permits engagement with the illustrated arm limiter assembly 60 (when in locking configuration) when the front wheel 46 encounters moderately sized obstacles. However, the stop member 44a could be disposed along any portion of the arm member 42 as needed. The stop member 44a includes a first or upper engagement surface 44u (FIG. 4A) on a portion of the upper side of stop member 44a. The upper engagement surface 44u faces upwardly opposite the ground surfaced G when the arm member 42 is in the first position 40A. The stop member 44a also includes a second or rear surface 44r (FIG. 4B) on a rearward side of stop member 44a. The rear surface 44r faces the rearward direction R when the arm member 42 is in the first position 40A. The stop member 44a is shown as a cylindrical body disposed along the arm member 42. However, the stop member 44a can be monolithic with the arm member body 43a such that the arm member 42 defines the upper and rear engagement surfaces 44u and 44r. For instance, an upwardly facing surface of the arm member can define a curved or stepped profile. (see for example stop member 944 in FIGS. 18C and 18D). In certain embodiments, arm member 42 can include a projection that defines the stop member 44a.

Continuing with FIGS. 3A and 3B, each arm assembly 38 can further include at least one linkage 50 that operatively connects the arm member 42 to a respective drive motor 34. Motor torque from the drive motors 34 will influence or cause the forward arm members 42 to pivot about their respective pivots P1 as the wheelchair 10 traverses an obstacle to thereby aid the wheelchair during obstacle traversal. It should be appreciated, however, that the anti-tip assemblies 38 can alternatively be passive (i.e. not coupled to the drives) as desired.

Wheelchair 10 further includes a pair of arm limiter assemblies 60 that are each associated with a respective arm assembly 38. Each arm limiter assembly 60 is configured to selectively inhibit the range of motion of the arm assembly 38 relative to the frame 14. In the illustrated embodiment (see FIGS. 3A and 3B), the arm limiter assembly 60 is configured to selectively inhibit the extent that the arm assembly 38, specifically the arm member 42 or wheel 46, can pivot about the pivot axis P1 in the upward direction B1. The arm limiter assembly 60 has a first or disengaged or open configuration as shown in FIG. 4B (shown in dashed lines in FIG. 3A) in which the arm limiter assembly 60 does not restrict the upward range of motion of arm member 42. Accordingly, in the disengaged or open configuration, the arm assembly 38 is rotatable from the first position 40A (that is, it's normal state) through a first range of rotation about the pivot axis P1.

Figure 4A:
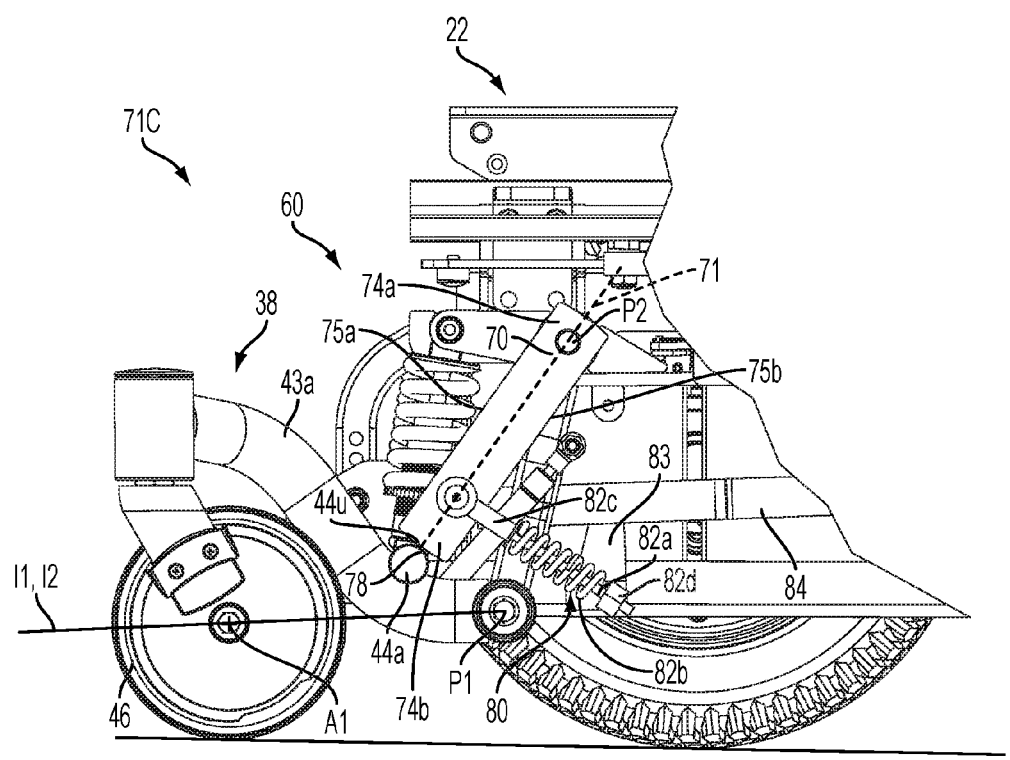
FIG. 4A is a side elevation view of a portion of the powered wheelchair shown in FIG. 3A, illustrating the arm limiter in the locked configuration.
Figure 4B:
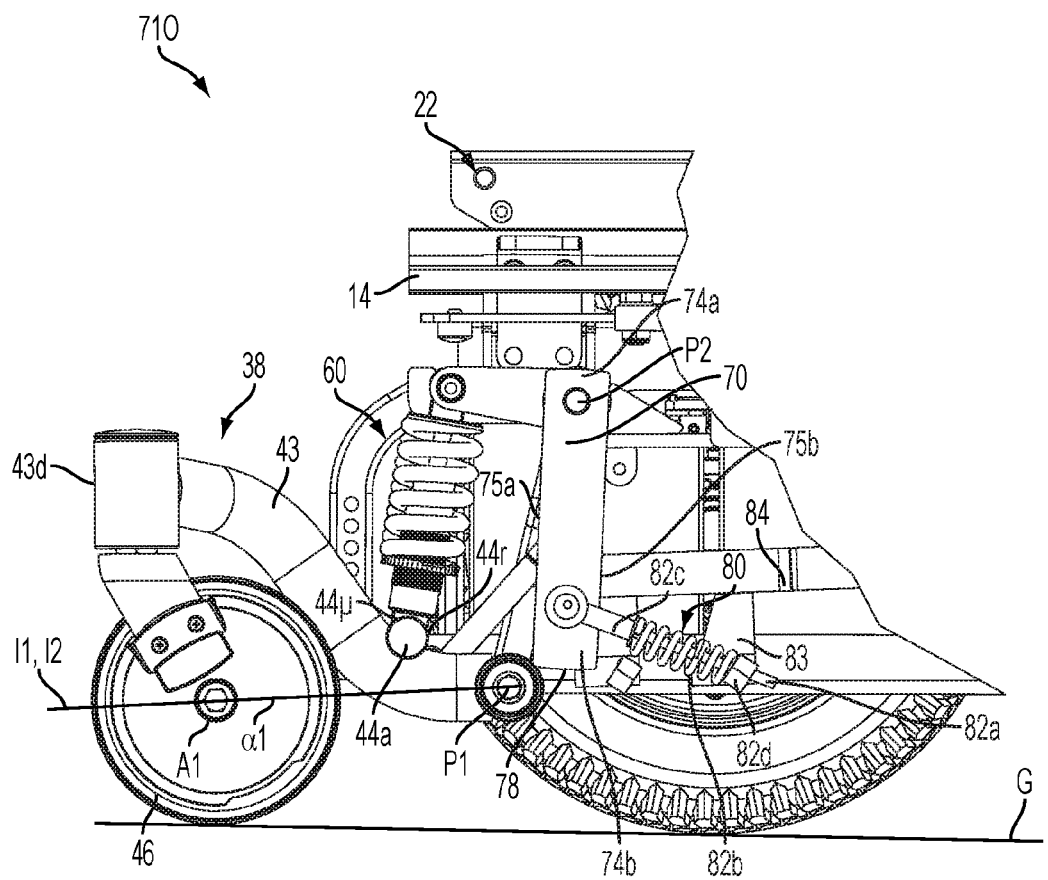
FIG. 4B is a side elevation view of a portion of the powered wheelchair shown in FIG. 3A, illustrating the arm limiter in an open configuration.

In addition, the arm limiter assembly 60 has a second or engaged or locked configuration as shown in FIG. 4A (shown in solid lines in FIG. 3A) in which arm limiter limits the upward range of motion of the arm member 42. In the engaged or locked configuration, the arm assembly 38 is rotatable through a second range of rotation that is less than the first range of rotation. Accordingly, when the arm limiter assembly 60 is in the locked configuration, the arm member 42 is not rotatable about the pivot axis P1 to the same extent that the arm member 42 is rotatable about the pivot axis P1 when the arm limiter assembly 60 is in the open configuration. The wheelchair 10 is configured to transition the arm limiter assembly 60 between the open and locked configurations based on position of the seat 22 and/or condition of the ground surface G that the wheelchair 10 is traveling along, as will be further detailed below.

The range of rotation as used herein refers to rotation of the arm member 42 to a position that is different than the first position 40A. When the arm member 42 is in the first position 40A, such that the wheelchair 10 is operating on flat, level ground, a first, fixed reference line I1 intersects the pivot axis P1 and the front wheel axis A1. The first line I1 is coaxial with an arm reference line I2 that also intersects the pivot axis P1 and wheel axis A1 only when the wheelchair 10, for example the front wheel 46 and drive wheels 32, are on a flat, level ground surface G. The arm reference line I2 represents the first position 40A of the arm assembly 38 (FIGS. 4A, 4B). The lines I1 and I2 define an angle α that is about zero (0) degrees when the arm assembly 38 is in the first position 40A. In the illustrated embodiment, in the first range of rotation (that is, without upward limit by arm limiter assembly 60) angle α can be up to, for example, about 20 degrees of rotation relative to the first position 40A in either the upward (first) rotational direction B1 or the downward (second) rotational direction B2. The range of arm rotation when arm limiter assembly 60 is in the open configuration is bounded merely by the wheelchair structure and its corresponding function. For instance, in the first range of rotation angle α can extend from −10 degrees (that is, in the downward direction) from the line I1 at the first position 40A to +10 degrees in the upward rotation direction B2 from the line I1 at the first position 40A.

The second range of rotation (that is, the rotation capable when the arm limiter is engaged with the arm) can be any desired range that is less than the first range of rotation. In the second range of rotation angle α can be, for example, up to about 10 degrees of rotation relative to the first position 40A in the upward (first) rotational direction B1 and/or the downward (second) rotational direction B2. For instance, in the second range of rotation angle α can extend from −5 degrees (that is, in the downward direction) from the line I1 at the first position 40A to +5 degrees in the upward rotation direction B2 from the line I1 at the first position 40A. When the arm limiter assembly 60 is in the locked configuration, the second range of rotation includes the angle α equal to about zero (0) degrees such that the arm member 42 is fixed relative to the frame 14. In other words, the second range of rotation includes arm member 42 fixed against pivotable movement (especially upward movement) relative to frame 14. It should be appreciated that the second range of rotation can be partially within the first range of rotation, such the upper and lower limits are 0 degrees and +10 degrees. In the exemplary embodiment shown, the arm limiter assembly 60 is inhibited from transitioning into the second configuration when the position of the arm assembly is rotationally different from the first position 40A relative to the frame 14 by more than four (4) degrees. In some embodiments, the arm limiter assembly 60 is prevented from transitioning into the second configuration under selected trigger configurations of the wheelchair. One trigger configuration may include when the position of the arm assembly is different from the first position 40A relative to the frame 14 by more than one degree. Other trigger conditions may include the position of the seat, and inclination of the wheelchair, e.g., un-level. In one embodiment, limiter assembly 60 is prevented from transitioning into the second configuration when the position of the arm assembly is different from the first position 40A relative to the frame 14 by more than two degrees. In one embodiment, limiter assembly 60 is prevented from transitioning into the second configuration when the position of the arm assembly is different from the first position 40A relative to the frame 14 by more than three degrees. In other exemplary embodiments, the arm limiter assembly 60 is inhibited from transitioning into the second configuration when the position of the arm assembly is rotationally different from the first position 40A relative to the frame 14 by less than four (4) degrees.

Figure 4C:
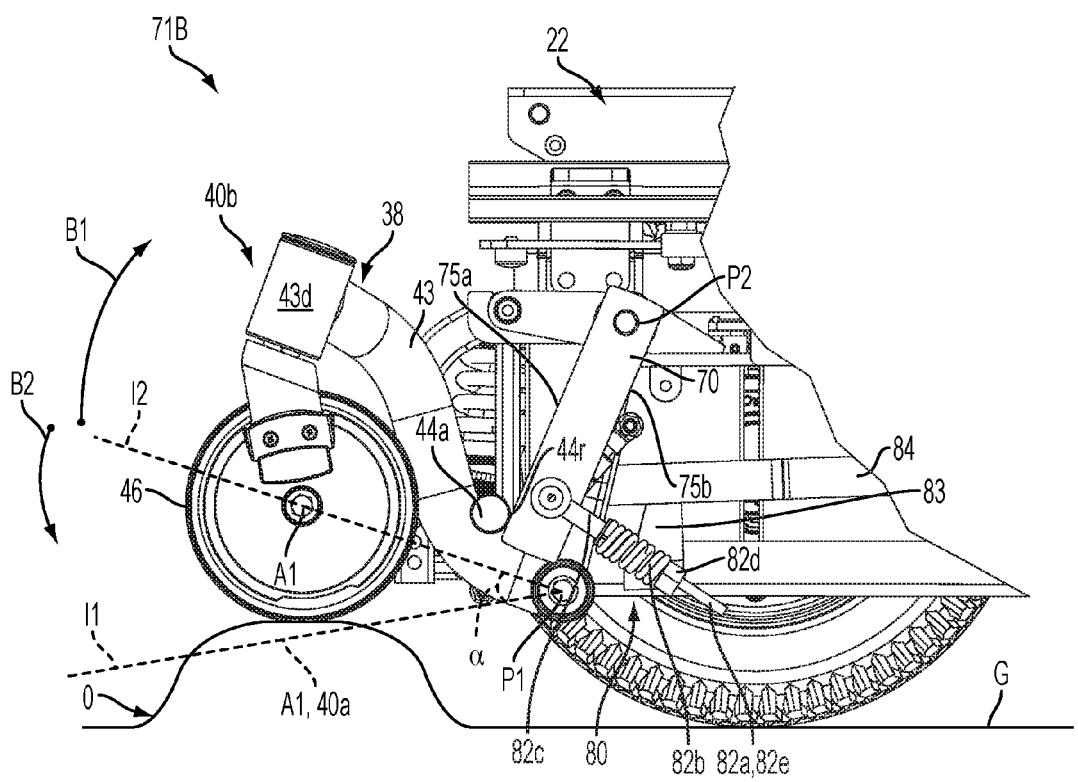
FIG. 4C is a side elevation view of a portion of the powered wheelchair shown in FIG. 3A, illustrating the arm limiter that is blocked from transitioning into the locked configuration as the powered wheelchair traverses an obstacle.

Arm limiter assembly 60 is in the open configuration when the wheelchair 10 is operating in the standard motion mode, i.e., when the seat is in the lowered position. When the controller 92 receives an input from the input device 8 to operate the wheelchair 10 in the elevated motion mode, the controller 92 causes arm limiter assembly 60 to transition into the second or engaged configuration. However, if certain conditions are not met the arm limiter assembly 60 may be inhibited from moving into the second configuration. For example, the arm limiter assembly 60 may be able to move into the second configuration only when the front wheel 46 and drive wheel 32 are on flat, level ground. Further, the arm limiter assembly 60 may be able to move into the second configuration only when front wheel 46 is in a different position from the first position 40A, but still within the second range of motion as noted above. In the embodiment shown, if the front wheels 46 are on uneven ground relative to the drive wheels 32 such that a forward arm member 42 is pivoted upwards into the second position 40b as shown in FIG. 4C, then the arm limiter assembly 60 is physically blocked from moving into the locking configuration. In alternative embodiments, the controller 92 may be configured to inhibit the arm limiter assembly 60 from transitioning into the second configuration when the front wheel 46 and drive wheel are on flat, level ground.

The arm limiter assembly 60 is configured to transition between the open configuration and the locking configuration so as to limit the range of rotation of the arm member 42 as described above. In the embodiment illustrated in FIGS. 3A-4C, the arm limiter assembly 60 includes a rotatable member 70 that is rotatably mounted to the frame 14, an actuator 88, a transfer linkage 84 coupled to actuator 88, and a biasing member, such as spring 80 operably connected to the linkage 84 and the rotatable member 70. The actuator 88 is operable to cause movement of the transfer linkage 84, which in turn causes movement of the rotatable member 70 as further detailed below.

Referring to FIG. 3B-4B, the rotatable member 70 is pivotably coupled to the frame 14 at a connection 69 and rotatable about the pivot axis P2 between the open configuration (FIG. 4B) and the locked configuration (FIGS. 3B, 4A). In the illustrated embodiment, the rotatable member 70 is a beam or brace in the form of a bar. Other elongate shapes, such as without limitation a plate, rod, tube, are contemplated in further embodiments. The rotatable member 70 defines a body 74 having a first or proximal end 74a rotatably coupled to the frame 14 and a second or distal end 74b that is opposed to proximal end 74a along an axis 71. The body 74 includes a forward edge 75a and a rearward edge 75b opposed to the forward edge 75a. The edges 75a and 75b extend at least partially from the proximal end 74a to the distal end 74b. The distal end 74b defines a distal-most contact surface 78, that can be curved, and is configured to engage the stop member 44a to thereby limit the pivotal movement of the arm member 42 in the upward direction B1. As illustrated, when the rotatable member 70 is in locking configuration, the distal surface 78 of the rotatable member 70 abuts the upper engagement surface 44u of the stop member 44a, thus preventing further upward rotational movement of the arm member 42. Contact surface 78 can be in contact with stop member 44a when rotatable body 74 is in the locked position and arm member 42 is oriented at its rest or first position in which angle α is zero. Alternatively when angle α is zero, arm limiter 60 and arm member 42 may also be configured to provide a clearance between contact surface 78 and stop member 44a for ease of rotation of body 74 into and out of the locked configuration, for manufacturing tolerances, and like factors. In one embodiment, if arm member 42 has a different position from first position 40A, the selected geometric configuration of at least one of the arm member 42, stop member 44, and rotatable member 70 can prevent rotatable member 70 from transitioning into the second configuration. For example, if the arm member 42 is rotationally different from the first position 40A (that is, angle α—illustrated in FIG. 4C—is non-zero) by a predetermined amount as further discussed below, the edge 75a of the rotatable member abuts the rear surface 44r which prevents the rotatable member 70 from transitioning into the second configuration.

Turning to FIGS. 3A and 3B, in accordance with the illustrated embodiment, the actuator 88 rotates member 70 between the open configuration and the locking configuration via movement of the transfer linkage 84 along the forward and rearward directions F and R. As shown, the transfer linkage 84 is an elongate rod or bar that includes a rearward portion 85r and a forward portion 85f spaced from the rearward portion 85r in the forward direction F. The rearward portion 85r is coupled to the actuator 88 and the forward portion 85f slides within an elongated slot 13 that is defined by a plate extending from the frame 14.

As shown in FIG. 3B, the biasing member 80 preferably is a strut that includes a rod 82a and a biasing element 82b, such as a coil spring, disposed about the rod 82a between a moveable stop element 82c and a fixed stop element 82d. The biasing member 80 defines a forward end 81f and a rearward end 81r disposed rearwardly with respect to the forward end 81f. As illustrated, opposed ends of the rod 82a define the forward and rearward ends 81f and 81r, respectively. The forward end 81f of the biasing member 80 is fixed to the rotatable member 70. A coupling plate 83 connects the transfer linkage 84 to the rearward end 81r of the biasing member 80 at the fixed stop element 82d. A distal end 83e of the rod 82a is slidable through a bore (not numbered) defined by the fixed stop element 82d. As the transfer linkage 84 is moved in the forward direction F by the actuator 88, the forward and rearward motion of the transfer linkage 84 is transferred to the rotatable member 70. In particular, when the controller 92 receives input from the input device 8 to operate the wheelchair 10 in the elevated motion mode, the controller 92 attempts to put arm limiter assembly 60 in the locked configuration by actuating the actuator 88 causing the transfer linkage 84 to move in the forward direction F and slide through the slot 13 along with the coupling plate 83. Movement of the coupling plate 83 urges the biasing member 80 toward the front of wheelchair 10, which in turn causes the rotatable member 70 to pivot about pivot axis P2 toward the second configuration (see FIG. 4A). The spring 82b is selected so that the force required to compress the spring 82b is greater than the force required to urge the rotatable member 70 into the second configuration uninhibited. Spring 82b is configured to bias arm limiter assembly 60 toward the locked configuration.

FIGS. 4A, 4B, 4C illustrate an arm limiter assembly 60 in the locking configuration 71c (FIG. 4A), the open configuration 71o (FIG. 4B), and a blocked configuration 71o (FIG. 4C), whereby the arm member 42 is preventing transition of the arm limiter assembly 60 from the open configuration 71o into the locking configuration 71c. Referring first to FIG. 4B, during normal operation and when the seat 22 is in the lowered position, the arm limiter assembly 60 is in the open configuration. The actuator 88 has been actuated to retract the transfer linkage 84 and thus move the rotatable member 70 into the open configuration. As noted above, in the open configuration, the arm member 42 is rotatable through its maximum range of rotation, such that the wheelchair 10 is operable to traverse an obstacle O or a descent along the surface G.

Turning to FIG. 4A, when wheelchair 10 is operated in an elevated mode—when the seat 22 is in the raised position—the arm limiter assembly 60 has transitioned into the locked configuration, with one exception discussed below. For instance, the actuator 88 cause the transfer linkage 84 to move along the forward direction F, which in turn causes the rotatable member 70 to transition into the locking configuration as shown in FIG. 4A. Because the rotatable member 70 has pivoted into locking configuration, the distal surface 78 of the rotatable member abuts the upper engagement surface 44u of the stop member 44a, thus preventing further upward rotational movement of the arm member 42. Accordingly, as the seat 22 is elevated into the raised position, the forward arm member 42 will have a limited range of rotation such that the wheelchair 10 is not operable to ascend an obstacle O along the surface G. When seat 22 is moved into a lowered position, the arm limiter assembly 60 transitions back into the open configuration such that range of motion of the arm member 42 is restored. In some embodiments, the wheelchair 10 is configured to require operation in the standard mode, when the seat 22 is lowered, before the full range of motion to the arm assembly 38 is restored and the obstacle can be safely traversed.

Referring now to FIG. 4C, if front wheel 46 is on uneven ground surface G relative to the drive wheels 32, such as when the wheelchair begins traversing the obstacle O, the forward extending arm member 42 is pivoted in an upward rotational direction B1 (that is, angle α is positive) away from the first position 40A toward the second position 40b. For example, the second position 40b illustrated in FIG. 4C can be when the arm member 42 is rotationally different from the first position 40A by a predetermined angle. In some embodiments the predetermined angle is by at least six (6) degrees, at least (5) degrees, at least four (4) degrees, at least three (3) degrees or at least two (2) degrees. In other embodiments, the predetermined angle is at least about six (6) degrees, at least about five (5) degrees, at least about four (4) degrees, at least about three (3) degrees or at least about two (2) degrees. As illustrated, the angle α2 between the first line l1 and the fixed line l2 is about 4 degrees. If the controller 92 receives a request to operate the wheelchair in the elevated mode and elevate the seat 22 into the raised position (e.g., an elevated position that is pre-determined or selected to merit engagement of an anti-tip safety feature such as one or more of the features described herein), the actuator 88 causes or attempts to cause the transfer linkage 84 to move in forward direction F, which in turn causes or attempts to cause the rotatable member 70 to advance toward the locking configuration. Because the arm member 42 is pivoted upwards, the rear surface 44r of the stop member 44a abuts the forward edge 75a of the rotatable member 70, preventing further rotation of the rotatable member 70 into the locking configuration. However, even when the forward extending arm member 42 is pivoted upwards away from the first position 40A into the second position 40b, the actuator 88 causes the transfer linkage 84 to bias the rotatable member 70 toward the locking configuration. More specifically, displacement of the transfer linkage 84 and the coupling plate 83 causes the biasing element 82b to compress as shown in FIG. 4C. The compressed spring 82b applies a force to the moveable stop element 82c urging the rotatable member 70 toward the locked configuration, which as shown is abutting the stop 44a. Once wheelchair 10 has moved to a location on the surface G such that the front wheel 46 and the drive wheels 32 are on flat, level ground (i.e. the first position 40A), the compressed biasing element 82b will automatically urge the rotatable member 70 into the second configuration as shown in FIG. 4A.

The wheelchair 10 in some embodiments can further include a linkage assembly that operatively connects the lift mechanism 18 to the arm limiter assembly 60 such that as the seat 22 is moved from the lowered position 5L to the raised position 5R, the linkage assembly automatically causes the arm limiter assembly 60 to move from the first or open configuration toward the second or locked configuration. The linkage assembly (not illustrated) can be configured such that the link can be capable of connecting to the lift mechanism 18 only when the front wheels 46 and the drive wheels 32 are on substantially even ground, for instance when the front wheels 46 are in the first position 40A as described above with respect to FIG. 2A-4C. In an embodiment, the linkage can include a hook member that is movable between an engaged position whereby the hook member is capable of connecting to the lift mechanism 18 and a disengaged position hereby the hook member is incapable of connecting to the lift mechanism 18. It should be appreciated, however, that in such embodiments, the link can have configurations other than the hook member as desired. For instance, the linkage assembly may include one or more elongate legs secured to the rotatable member 70, 170, a connection member that operatively connects the lift mechanism 18 to the one or more elongate legs, and one or more springs connected to the one or more elongate legs and the rotatable member which are configured to bias the rotatable member 70, 170 into the second configuration. The connection member include a cable or assembly of rods or connection bars that engage the lift mechanism and selectively engage the one or more elongated legs. When the lift mechanism causes the seat 22 to move from the raised position into the lowered position, the linkage assembly may cause the rotatable member 70, 170 to rotate from the locking configuration into the open configuration. Movement of the seat 22 from the lowered position to the raised position, permits the rotatable member 70, 170 to move from the open configuration into the locking configuration.

Figure 5:
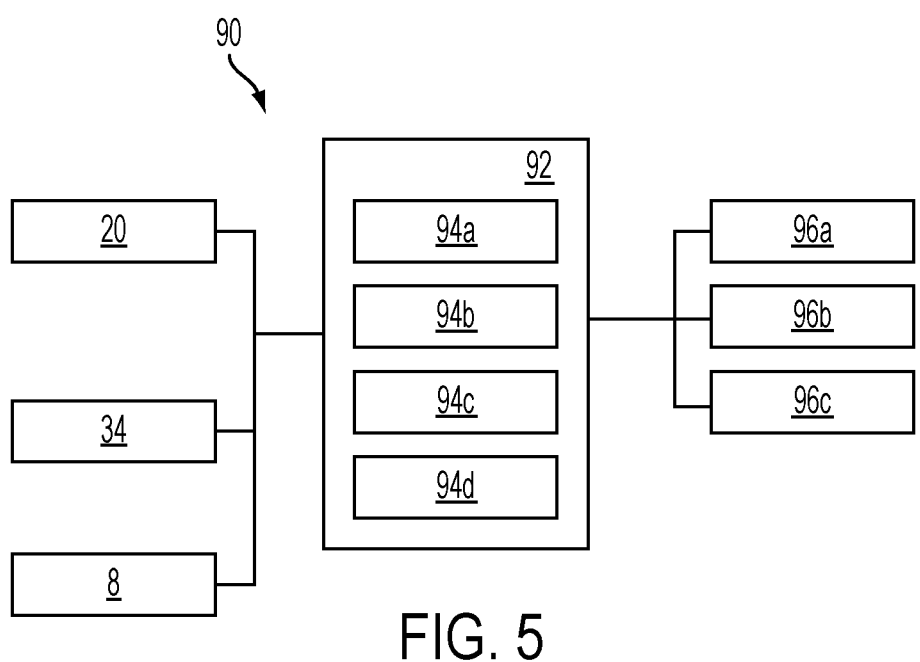
FIG. 5 is a block diagram illustrating a control system for operating the powered wheelchair illustrated in FIGS. 1 through 4C, according to an embodiment of the present disclosure.

Referring to FIG. 5, the wheelchair 10 includes control system 90 that includes a controller 92 configured to operate the wheelchair 10 in different operational modes (e.g., one or more of the operation modes described herein). The controller 92 in some embodiments is in electronic communication with the lift mechanism motor 20, the drive motors 34 (or multiple drive motors if present), and the actuator or actuators 88. As noted above, the input device 8 is also in electronic communication with the controller 92. Further, a plurality of sensors 96a-96c can include, for example, one or more position sensors 96a that can determine the position of the components of the arm assembly 38 and arm limiter assembly 60, a seat-position sensor 96b, and an inclination sensor 96c.

The controller 92 can be configured as a computing device configured to process input signals and control operation of the wheelchair 10. The controller can include a processing portion 94a, a memory portion 94b, an input/output portion 94c, and a user interface (UI) portion 94d. It is emphasized that the block diagram depiction of the computing device control system 90 is exemplary and not intended to imply a specific implementation and/or configuration. The processing portion 94a, a memory portion 94b, an input/output portion 94c, and a user interface (UI) portion 94d can be coupled together to allow communications therebetween. As should be appreciated, any of the above components may be distributed across one or more separate control boards as needed.

In various embodiments, the input/output portion 94c includes electronic connectors for wired connections to the lift motor 20, drive motors 34, and actuators 88. The input/output portion 94c is capable of receiving and/or sending signals information pertaining to operation of the lift mechanism, drive motors 34 and actuators 88. The input/output portion is configured to receive information or signals from the input device 8 or sensors 96a-96b. The signals can include inputs, such as instructions to cause the actuator 88 to move the transfer linkage 84 in the forward and rearward direction F and R, or data, such as the position of the seat 22. Depending upon the exact configuration and type of processor, the memory portion 94b can be volatile (such as some types of RAM), non-volatile (such as ROM, flash memory, etc.), or a combination thereof. The controller 92 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the controller 92. The user interface portion 94*d* can include an input device 8 and allows a user to communicate with the controller 92 and control operation of wheelchair as further detailed below.

Each arm limiter assembly 60 can further include one or more positions sensors 96*a* in communication with the controller 92. For example, each arm limiter assembly 60 can include a first position sensor that is configured to detect when the rotatable member 70 is in the locking configuration. In some embodiments, a second position sensor is configured to detect the position of the arm member 42. For instance, the arm position sensor can include a limit switch that detects when the arm member 42 is in the first position 40A or the position sensor can detect the second position 40*b* as well as any incremental positions between the first and second positions 40A and 40*b*. Based on the detected positions, the controller is configured to determine, based on the detected positions of the arm member 42, if the arm member 42 is locked such that it is within the second, more limited range of rotation. Furthermore, the position data can be used by the controller 92 to cause the rotatable member 70 to progressively restrict the range of rotation of the forward arm member 42 relative to the frame 14. Preferably, controller 92 enables operation in the normal elevated mode only when arm limiter 60 is in the locking configuration. The actuator 88 can be configured to progressively move the rotatable member 70 based on at least one of speed of the wheelchair 10, the distance the seat is spaced from the frame 14, and the position of the arm member 42 as the wheelchair moves down an obstacle.

The seat-lift sensor 96*b* can be a limit switch that is configured to detect when the seat 22 has been moved out of the lowered position. For example, the seat-lift sensor detects when the seat 22 is in contact with the frame 14. If the seat 22 is not in contact with the frame 14, the sensor 96*b* can transmit a signal to the controller 92. In certain embodiments, the seat-lift sensor 96*b* can be a limit switch that is configured to detect when seat is moved out the lowered position. The controller 92 can cause a message to display on the input device 8 or cause some other operation as needed and based on inputs from the other sensors.

The inclination sensor 96*c* is configured to detect whether the frame 14 is in a level position with respect to a horizontal plane or an inclined or unleveled position with respect to the horizontal plane along forward-rearward direction F-R and along a lateral direction C that is perpendicular to the forward-rearward direction F-R. The lateral direction C is not illustrated in the figures. The horizontal plane extends through the frame 14 is parallel to the surface G when the wheelchair 10 is on a flat, level ground surface G. In accordance with the illustrated embodiment, the inclination sensors 96*c* can be secured the frame 14 and oriented roughly parallel to the surface G. The inclination sensor 96*c* can measure the angular position data of the frame 14 relative to horizontal along the forward-rearward direction F-R and along the lateral direction C. The angular position data can be sent to the controller 92. The processing portion 94 determines, based on the angular position data, if the angular position of the frame 14 is within a predetermined threshold with respect to the horizontal plane in both the forward-rearward direction F-R and lateral direction C. The predetermined threshold is the range of inclination that is slight enough such that operation of the wheelchair 10 in the elevated motion mode would not cause a significant risk of instability due to the elevated center of gravity. The predetermined threshold depends on the particular parameters of the wheelchair and may be empirically chosen as will be understood by persons familiar with wheelchair design. For the embodiment shown in the figures, the inclination threshold may be about 1 degrees of inclination. If the frame 14 is inclined with respect to the horizontal plane (the inclination exceeds the predetermined threshold) compared with its at-rest state, the controller 92 may prevent operation of the wheelchair in the elevated motion mode or may restrict operation to an elevated-inhibited mode. For instance, if the controller 92 receives an input from the input device 8 to operate the wheelchair 10 in the elevated motion mode and the frame 14 is inclined with respect the horizontal plane, the controller 92 will only operate the wheelchair 10 in an elevated motion mode if the arm limiter assemblies 60 are in the locking configuration. If, however, the frame 14 is not inclined with respect to the horizontal plane (the inclination is within the predetermined threshold) and the controller 92 receives an input to operate in the elevated motion mode, the controller 92 causes the lift mechanism to elevate the seat 22 to the raised position. As discussed earlier, the arm limiter assembly 60 would be moved into the locking configuration as well. In an embodiment, the inclination sensor 96*c* can include an accelerometer and/or gyroscope, or others as needed.

The input device 8 is in communication with the controller 92 and configured to be operated by the occupant of the wheelchair 10. The input device 8 can include a joystick, a keypad and a display. The joystick can cause the wheel chair to move forward, rearward, or turn to change directions. The keypad includes input buttons that control operation of the wheelchair 10. The display can cause the display of notifications regarding wheelchair operation. The keypad and display can be integrated into a touch screen that receives user inputs and cause the display of various messages regarding wheelchair operation. The display or keypad and/or display can include input buttons that control various operational aspects of the wheelchair. For instance, the keypad include buttons that when depressed cause the wheelchair 10 to operate in the elevated motion mode. The controller 92 is configured to, in response to inputs from the input device 8 to operate the wheelchair 10 in the elevated motion mode, cause the input device 8 to display a message or otherwise indicate that the elevated motion mode is permitted. If the elevated motion mode is permitted, controller 92 causes the lift mechanism to move the seat 22 into the raised position when the frame 14 is level and the arm limiter assembly 60 is in the locking configuration.

The wheelchair 10 is, in some embodiments, configured to operate in the elevated motion mode only when one or more safety criteria are satisfied. As noted above, the safety criteria can include the position of the seat 22 (e.g., raised from its lowermost position), inclination of the frame 14, and the configuration of the arm limiter assemblies 60. If the seat 22 is in raised position, the center of gravity is elevated which decreases wheelchair stability. Further, the risk of tipping the wheelchair 10 increases when wheelchair 10 is attempting to ascend an obstacle and the seat is elevated. Further, stability is adversely affected when the frame 14 is inclined. The arm limiter assemblies 60 are configured to limit the ability of the wheelchair 10 to ascend an obstacle along the surface G if the seat is in raised position. Accordingly, if the controller 92 determines that fewer than all of the safety criteria are met, the controller 92 causes the input device 8 to display a message or otherwise indicate that the elevated motion mode is not permitted or is restricted to the elevated-inhibited mode.

Figure 6B:
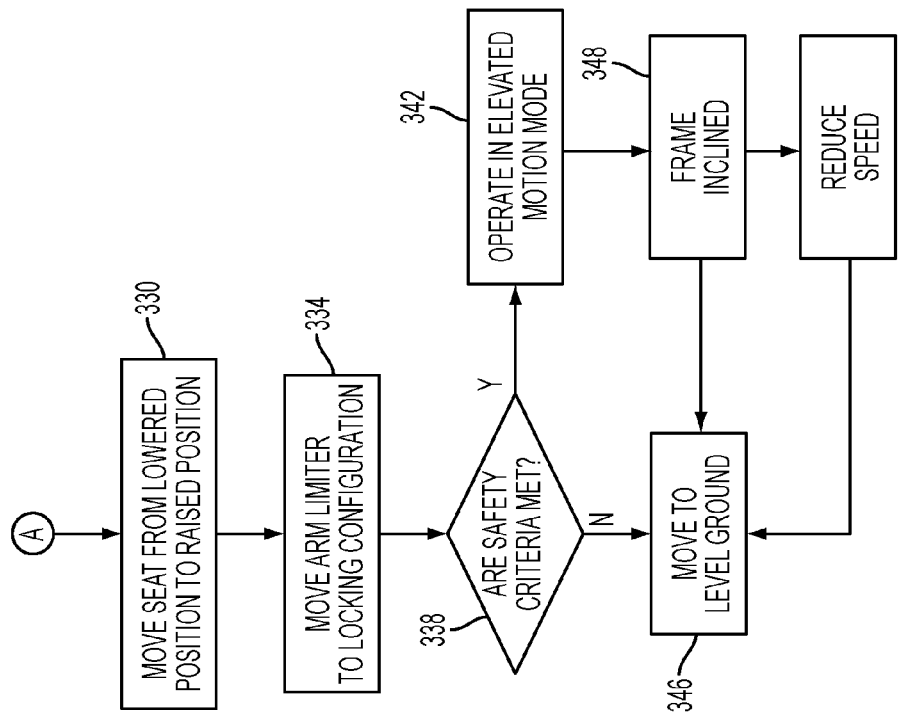
FIGS. 6A and 6B are process flow diagrams illustrating operation of powered wheelchair in standard operating mode and an elevated motion mode (a portion of the diagram is shown in FIG. 6A and another portion of the diagram is shown in FIG. 6B)
Figure 6A:
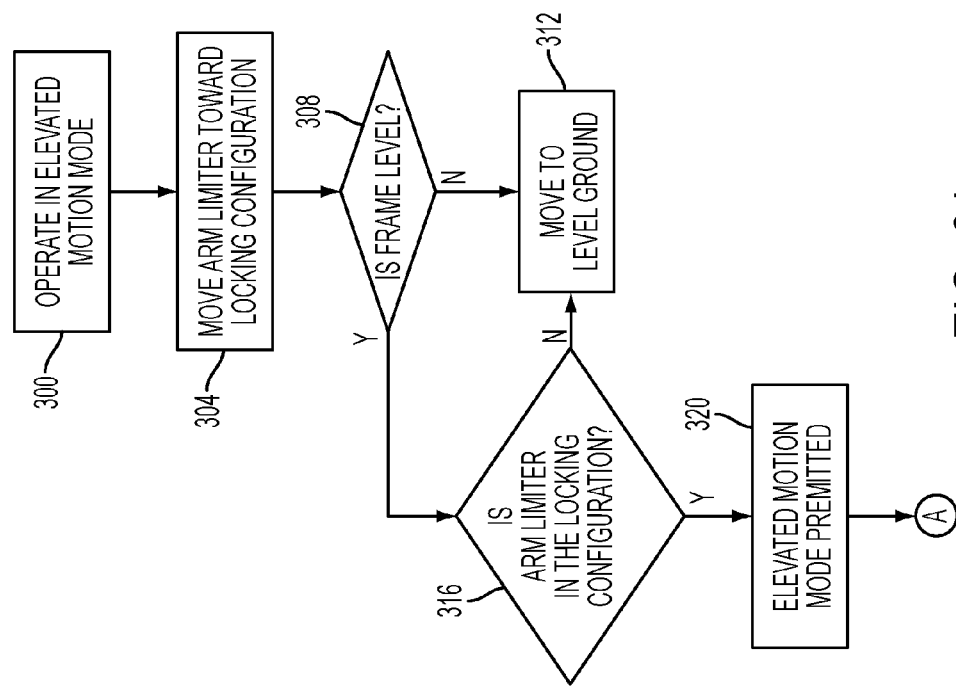

An embodiment of the present disclosure includes methods for operating wheelchair 10 in the standard mode, as shown in FIG. 6A, and the elevated motion modes, as shown in FIG. 6B. Turning to FIG. 6A, assuming that wheelchair 10 is on flat, level ground and the seat is in the fully lowered position, a method according to an embodiment includes steps 300-320. In step 300 the occupant of the wheelchair 10 can request to operate the wheelchair 10 in the elevated motion mode via the input device. At step 304, the controller in response to this input from the occupant causes the arm limiter assemblies 60 to move toward the locked configuration.

At step 308, the controller 92 receives angular position data from inclination sensor (e.g., inclination sensor 96c). The controller 92 will determine, based on the angular position data obtained from the inclination sensor, whether the frame 14 is level. At step 312, if the frame 14 is not level, the controller 92 causes an indication to display on the display device that the elevated motion mode is not permitted. The controller 92 can also cause the display of message indicating that the occupant should drive the wheelchair 10 to level, flat ground. If, in step 308, the controller determines that the frame 14 is level, process control is transferred to step 316.

In step 316, the arm limiter position sensors (e.g., position sensors 96a) send a signal to the controller 92 regarding the arm limiter position data for the arm limiter assemblies 60. The controller 92 determines, based on the arm limiter position data, whether the arm limiter assemblies 60 are in the locked configuration. If the controller 92 determines that the arm limiter assemblies 60 are not in the locked configuration, the controller 92 causes an indication to display on the display device that the elevated motion mode is not permitted. The controller can also cause the display of message indicating that the occupant should drive the wheelchair 10 to level, flat ground. At this instance, the arm member 42 may be in the second position 40b such that stop member 44a inhibits rotation of the rotatable member 70 into the second configuration (see FIG. 4C). When the wheelchair 10 has moved to level, flat ground, the arm member 42 is moved back toward the first position and the biasing member 80 will automatically urge the arm limiter assembly 60 into the locked configuration as discussed above.

At step 320, the controller 92 determines, based on inputs from each sensor, that all safety criteria are met. For instance, the controller 92 determines if the seat 22 is in the lowered position and the arm limiter assembly 60 is in the locked configuration. The controller 92 will indicate via the display device that operation of wheelchair 10 in the elevated motion mode is permitted. Process control is transferred to step 330 shown in FIG. 6B.

Turning now to FIG. 6B, a method for operating the wheelchair 10 in the elevated motion mode is illustrated. At step 330, controller 92 can, based on input from the input device 8 or automatically, cause the lift mechanism 18 to raise the seat 22 from the lowered position into the raised position. At step 334, the controller can cause the actuators 88 to move the rotatable members 70 toward the locked configuration.

At step 338, the controller 92, based on inputs from the inclination sensors (e.g., inclination sensor 96c) and arm limiter position sensors (e.g., position sensors 96a), can determine if the frame 14 is level and if the rotatable members 70 are in the locked configuration. In other words, in step 338, the controller 92 determines if all safety criteria are met. At step 342, if all safety criteria are met, the wheelchair 10 is permitted to operate in the elevated motion mode and the controller 92 powers the drive motors 34 such that the wheelchair 10 is capable of moving within the maximum raised-seat drive speed (e.g., 0 mph to 5 mph). In this regard, the controller 92 operates the drives up to the maximum raised-seat drive speed when the seat 22 is in the raised position and the rotatable member 70 is in the locked configuration. At step 342, if the controller 92 determines that less than all of the safety criteria are met when the wheelchair 10 is in the elevated motion mode, the controller 92 powers the drive motors 34 such that the wheelchair is capable of moving within the maximum raised-inhibited drive speed range (e.g., 0 mph to 3.75 mph). In this regard, the controller 92 operates the drive motors 34 so as to advance the wheelchair 10 up to the maximum raised-inhibited seat drive speed when the seat 22 is in the raised position and the rotatable member 70 is in the open or first configuration. As noted above, the upper limit of the maximum raised-inhibited seat drive speed range is less than the upper limit of the maximum raised-seat drive speed range. Accordingly, the wheelchair 10 is configured to limit the maximum attainable speed when the rotatable members 70 are in the open configuration and the arm members 42 are pivotable so as to traverse an obstacle.

At step 346, if the controller determines that all of safety criteria are not met, the controller 92 causes the display device to display a message to the occupant that the elevated motion mode is not permitted. The controller 92 can also cause the display of message indicating that the occupant should drive the wheelchair 10 to level, flat ground. If during operation of wheelchair 10 in the elevated motion mode the wheelchair 10 traverses an inclined surface or some other obstacle, the inclination sensor obtains the angular position data for the frame 14 as discussed above. At step 348, if the controller 92 determines, based on angular position data, that the frame 14 has transitioned from a level position to an inclined position that exceeds the predetermined threshold, the controller 92 automatically causes the drive motors 34 to reduce the speed of the wheelchair 10 to within the maximum raised-inhibited drive speed range.

Accordingly, in response to input from an input device to operate the wheelchair in an elevated motion mode and in response to data obtained from the inclination sensors and arm limiter position sensors, the controller 92 according to some embodiments is configured to: (i) power the drive motors 34 such that the wheelchair is capable of moving within the maximum raised-seat drive speed range when the seat is in the raised position, the locking mechanism is in the locked configuration, and the frame 14 is level. Further, the controller is configured to power the drive motors 34 such that the wheelchair 10 is capable of moving at the maximum raised-inhibited drive speed when the seat 22 is in the raised position and either A) the rotatable member is in the open configuration, and/or B) the frame is in the unleveled position. It should be appreciated, however, that the controller can be configured to operate the wheelchair 10 in an desired mode based on data obtained from the sensors in any order desired and after any desired criteria are met.

FIGS. 7-13B illustrate wheelchairs according to alternate embodiments of the present disclosure. Turning to FIGS. 9A and 9B, a powered wheel chair 110 is configured similar to the powered wheelchair 10 described above and illustrated in FIGS. 1-5. Accordingly, the description below regarding wheelchair 110 will use similar reference signs to identify elements common to wheel chair 10 and wheelchair 110. Powered wheelchair 110 includes a frame 14, drive wheels 32 coupled to the frame 14, forward arm assemblies 38, rear arm assemblies 48, a lift mechanism 18 and a seat 22 supported by the lift mechanism 18. Further, the powered wheel chair 110 includes control system 90 and associated sensors 96a, 96b, 96c.

Figure 9A:
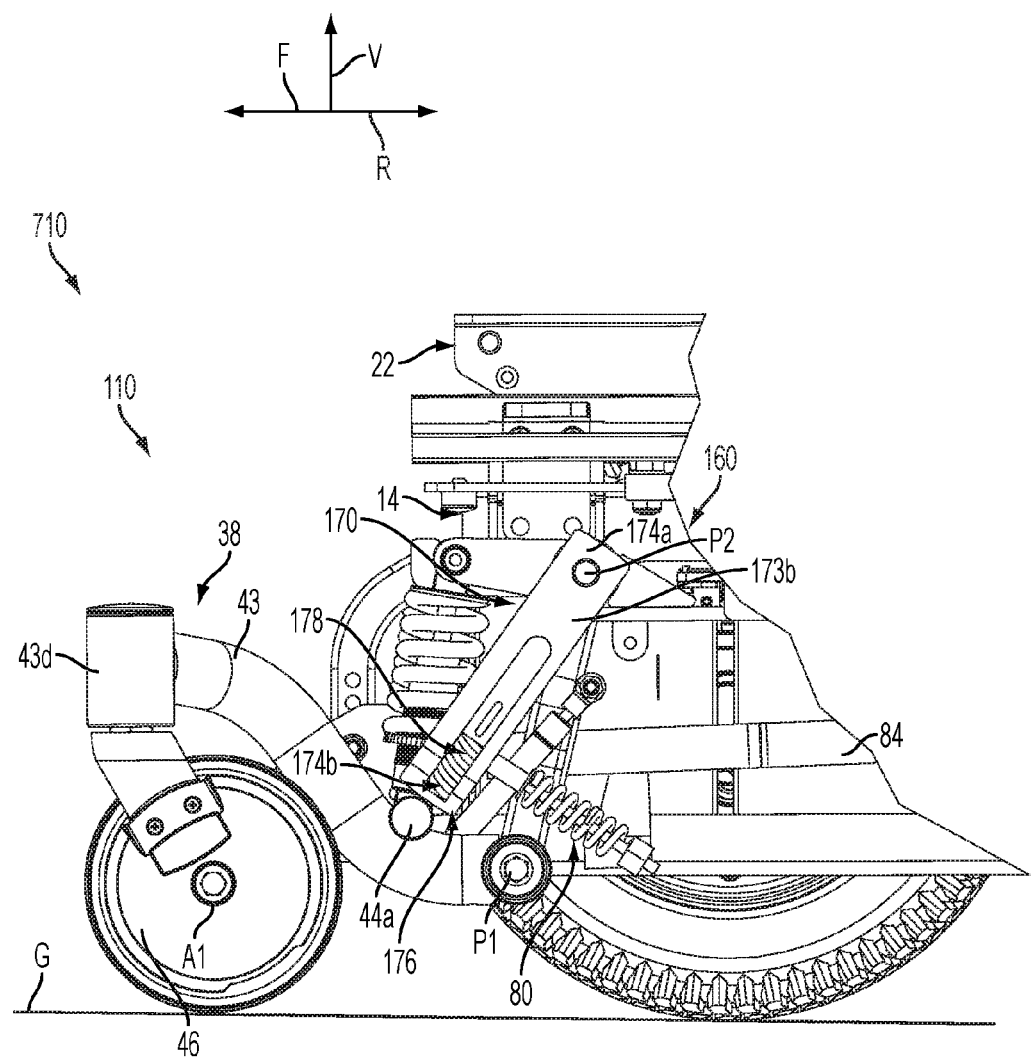
FIG. 9A is a side elevation view of a powered wheelchair according to another embodiment of an aspect of the present disclosure, illustrating the arm limiter shown FIG. 7.
Figure 9B:
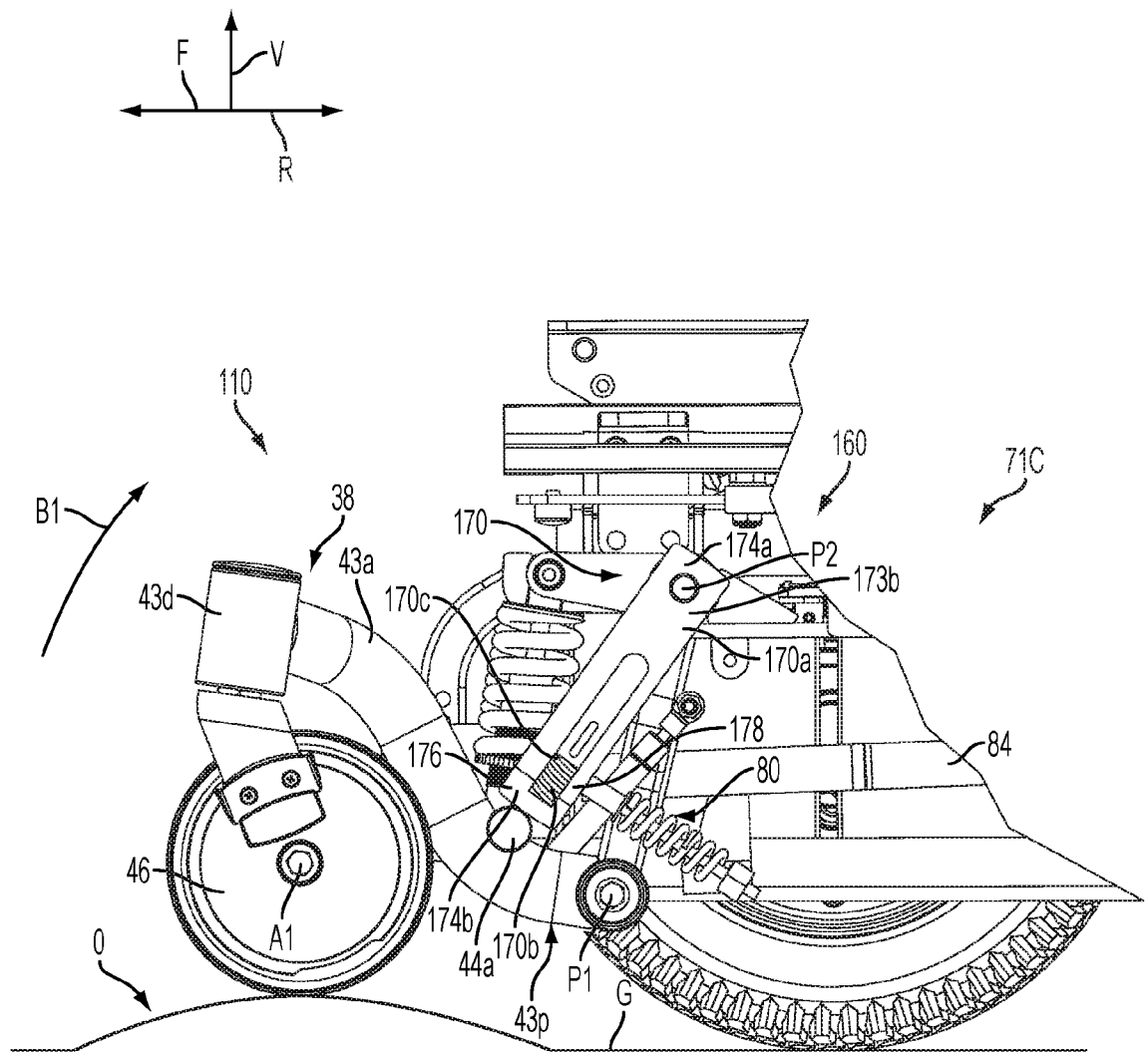
FIG. 9B is a side elevation view of a portion of the powered wheelchair shown in FIG. 9A, illustrating the front wheel ascending an obstacle.

Continuing with FIGS. 9A and 9B, in the alternative embodiment, the powered wheel chair 110 includes a pair of arm limiter assemblies 160. Only one arm limiter assembly will be described below, as the opposite arm limiter assembly in the pair is similarly constructed. The arm limiter assembly 160 includes a rotatable member 170 pivotally coupled to the frame 14, a compressible or moveable end 174b, an actuator 88 (not shown in FIGS. 9A and 9B), a linkage 84 coupled to the actuator, and a biasing member 80 coupled to the linkage 84 and the rotatable member 170. Actuation of the actuator 88 translates the linkage 84, which in turn, causes the biasing member 80 to advance the rotatable member 70 from the open configuration 71O (FIG. 9A) into the locked configuration 71c (FIG. 9A).

At least a portion of the rotatable member 170 is configured to at least partially compress along an axis 71 in response to upward movements of the arm member 42 against the end 174b when the rotatable member 70 is in the locking configuration, as further detailed below. The biasing member 80 can be directly or indirectly coupled to the linkage 84 and the rotatable member 170

Figure 7:
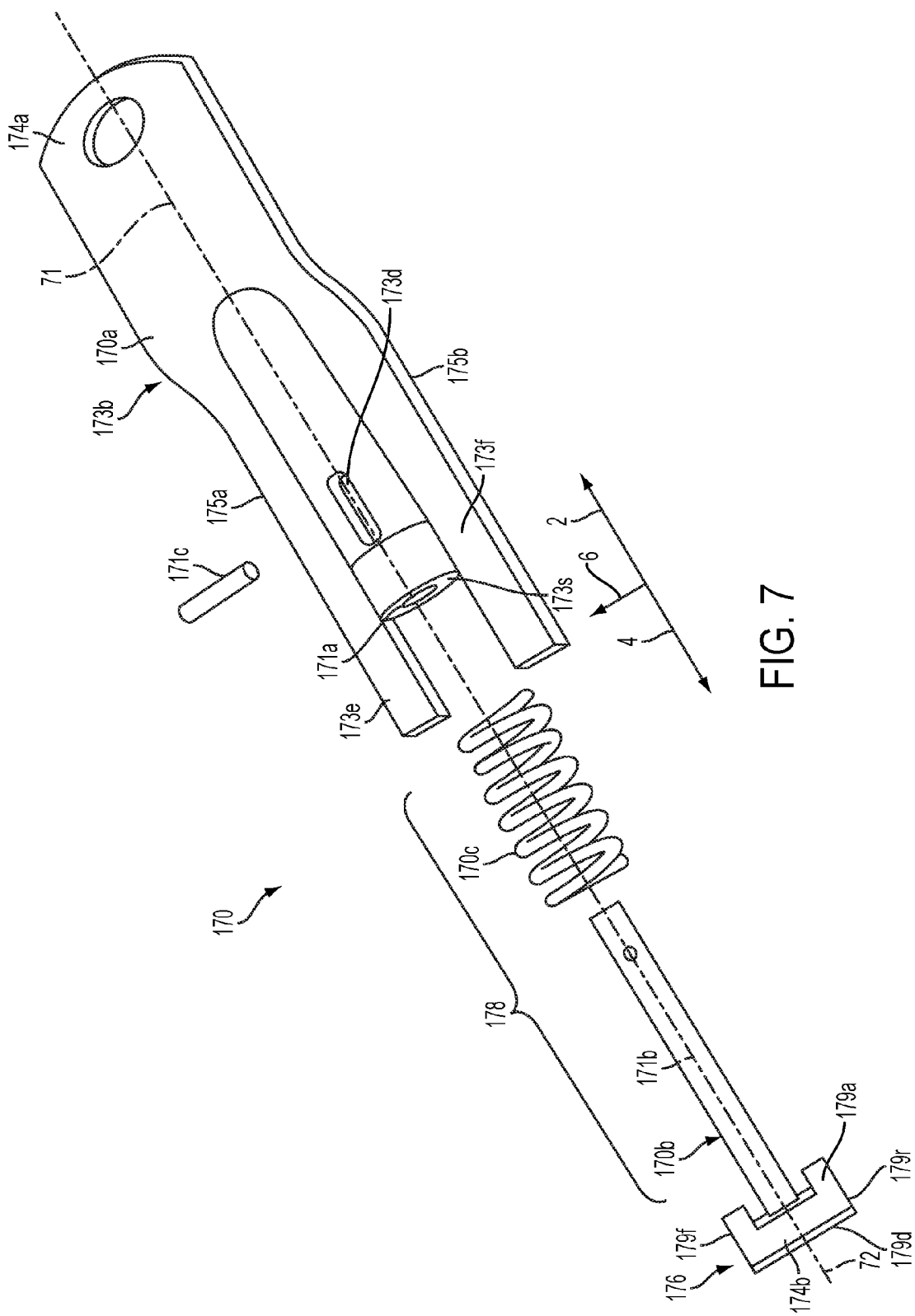
FIG. 7 is a perspective view of an arm limiter assembly for the powered wheelchair according to another embodiment of an aspect of the present disclosure.

Referring to FIGS. 7 and 9B, the rotatable member 170 includes a body 173b, a translating member 176 moveably coupled to the body 173b, and a biasing member 178. As shown in FIG. 9B, when the rotatable member 170 is in the locking configuration 70L and the wheelchair 10 ascends over an obstacle O, the biasing member 178 allows the arm member 42 to partially rotate upwards against the force of biasing member 178 so as to prevent the wheelchair from high-centering (e.g. drive wheels are able to contact the ground when the chair ascends a low obstacle). Continuing with FIG. 7, the rotatable member 170 has a first or proximal portion 170a and a second or distal portion 170b spaced from the proximal portion 170a along the axis 71 in a distal direction 4. The distal direction 4 is aligned with and parallel to the axis 71. The proximal portion 170a includes a proximal end 174a and the distal portion 170b includes the moveable or distal end 174b. As illustrated, the translating member 176 defines the moveable end 174b. The biasing member 178 is disposed at least partially between the proximal portion 170a and the distal portion 170b. The biasing member 178 is illustrated as a spring 170c. And while a helical compression spring is illustrated, other spring types could be used as well. Further, the biasing member 170c can have other configurations, such as for example, a hydraulic piston as desired, a compressible material, such as gel or foam, or other device or structure than provide a counter force against force applied to translating member 176 to cause the translating member to advance along axis 71.

Continuing with FIG. 7, the body 173b is configured to couple to the frame 14 and support the translating member 176 and biasing member 178. The body 173b defines the proximal end 174a, a forward side 175a, a rearward side 175b opposed to the forward side 175a along a transverse direction 6 that is perpendicular to the axis 71. The body 173b defines a width W1 (not shown) that extends from the forward side 175a to the a rearward side 175b in the transverse direction 6. The body 173b includes a pair of arms 173e and 173f defining a gap (not numbered). The body 173b defines a surface 173s that extends from arm 173e to arm 173f along the transverse direction 6, and a channel 171a extends from the surface 173s into the body 173b along the axis 71 toward the proximal end 174a. An elongate slot 173d extends through the body 173b and is in communication with the channel 171a. The body 173b can be a rigid plate or rod. As illustrated, the body 173b is an elongate plate with extending arms 173e and 173f.

As noted above and illustrated in FIG. 7, the translating member 176 is configured to compress or move in response to force applied to it by the arm member 42. More specifically, in accordance with the illustrated embodiment, the translating member is translatable 1) toward the body 173b in an upward or proximal direction 2 that is opposite to distal direction 4, and 2) away from the body 173b in the distal direction 4. The translating member 176 includes a connection member 171o, such as a rod, that is moveably coupled to the body 173b with a fastener 171c. The rod 171o is received by the channel 171a and moveable within the channel 171a along the axis 71. The fastener 171c extends through the slot 173d and is fixed to the portion of the rod 171o in the channel 171c. As the rod 171o moves within the channel 171a, the fastener slides within the slot 173d. It should be appreciated, however, that the translating member 176 and the body 173b can be coupled together in other ways. For example, the proximal portion 170a can include the rod and the distal portion 170b can define the channel as desired. Further, the connection member 171o is not limited to a rod but can be a plate or other elongate structure.

Continuing with FIG. 7, the distal end 174b, such as the translating member 176, can define an outer surface with any shape or profile that is configured to engage the arm member 42 as the arm member 42 pivots relative to the frame 14 during operation of the wheelchair. Accordingly, the distal end 174b can have a surface that is configured to abut the arm member 42 only when the rotatable member 70 or the arm member 42 is in specific orientations relative to the frame 14, e.g. when the rotatable member 70 is the locking configuration. In addition, the distal end 174b can be configured to progressively restrict rotational movement of the arm member 42 dependent upon the orientation of the rotatable member 70 relative to the frame 14. For instance, the rotational limit the rotatable member 70 applies to the arm member 42 can vary as the position of the rotatable member 70 varies with respect to the frame 14.

In accordance with the embodiment illustrated in FIG. 7, the translating member 176 further defines an outer surface 179a that is configured to engage the stop member 44a of the arm member 42. For instance, the outer surface 179a includes a forward surface portion 179f, a rearward surface portion 179r opposite to the forward surface portion along a transverse direction 6, and a distal-most surface portion 179d that extends from the forward surface portion 179f to the rearward surface portion 179r. The forward surface portion 179f is configured to engage the rear surface 44r of the arm assembly 42 if the arm member 42 is ascending an obstacle before the rotatable member 170 has transitioned into the locking configuration (see e.g. FIG. 4C). And while the forward and rearward surface portions 179f and 179r are illustrated parallel to the axis 71, the forward and rearward surface portions 179f and 179r can have any shape, curvature, or inclination as needed. The distal-most surface portion 179d, or distal surface 179d, is configured to abut the upper surface 44u of the stop member 44a when the rotatable member 170 is in the locking configuration. The translating member 176 defines a width W1 (not shown) that extends from the forward surface portion 179f to the rearward surface portion 179r in the transverse direction 6. The body 173b defines a width W2 (not shown) that extends from the forward side 175a to the rearward side 175b in the transverse direction 6. As illustrated the width W1 of the translating member 176 is about equal to the width W2 of the body 173b. However, it should be appreciated that the width W1 of the translating member 176 can be greater than the width W2 of the body 173b. For example, in embodiments where the translating member 176 is configured for progressive restriction of rotational motion of the arm member 42, the translating member width W1 could be greater than the width W2 of the body 173b.

FIGS. 8A-8D schematically illustrate various alternate embodiments of the translating member 176. As noted above, the translating member can define any particular shape and/or surface profile to engage the arm member 42 during operation of the wheelchair. For instance, the translating member 192a (FIG. 8A) defines first and second distal surfaces 19a and 198a. The first surface 19a is inclined at an oblique angle with respect to the axis 71 and the transverse direction 6, the second surface 198a is normal to the axis 71. Translating member 192b (FIG. 8B) defines a distal surface 198b that is slightly curved with respect to the axis 71 and is inclined along the transverse direction 6. Translating member 192c (FIG. 8C) defines a distal surface 198c that is curved with respect to the axis 71 and the surface extends from the intersection of the axis 71 and surface 198c toward edges 175a and 175b. The leading surfaces 192a, 192b, and 192c provide a ramp or cam surface for engaging stop member 44a. Translating member 192d shown in FIG. 8D defines a distal surface 198d that inclines toward the rearward side 175b of the rotatable member 170.

Turning to FIGS. 10A-10D, a powered wheelchair 210 according to an alternative embodiment of the present disclosure is configured similar to the powered wheelchair 10,110 described above and illustrated in FIGS. 1-5 and 9A-9B. For instance, the powered wheelchair 210 includes a frame 14, drive wheels 32 coupled to the frame 14, a pair of forward arm assemblies 38, a pair of rear arm assemblies 48, and a lift mechanism 18 mounted to the frame 14 and configured to move the seat 22 between the lowered and raised positions 5R. The powered wheelchair 210 includes control system 90 and sensors 96a, 96b, 96c similar to the wheelchair 10 described above. Accordingly, the description below regarding wheelchair 210 will use similar reference signs to identify elements common to wheelchair 10 and wheelchair 210.

Figure 10A:
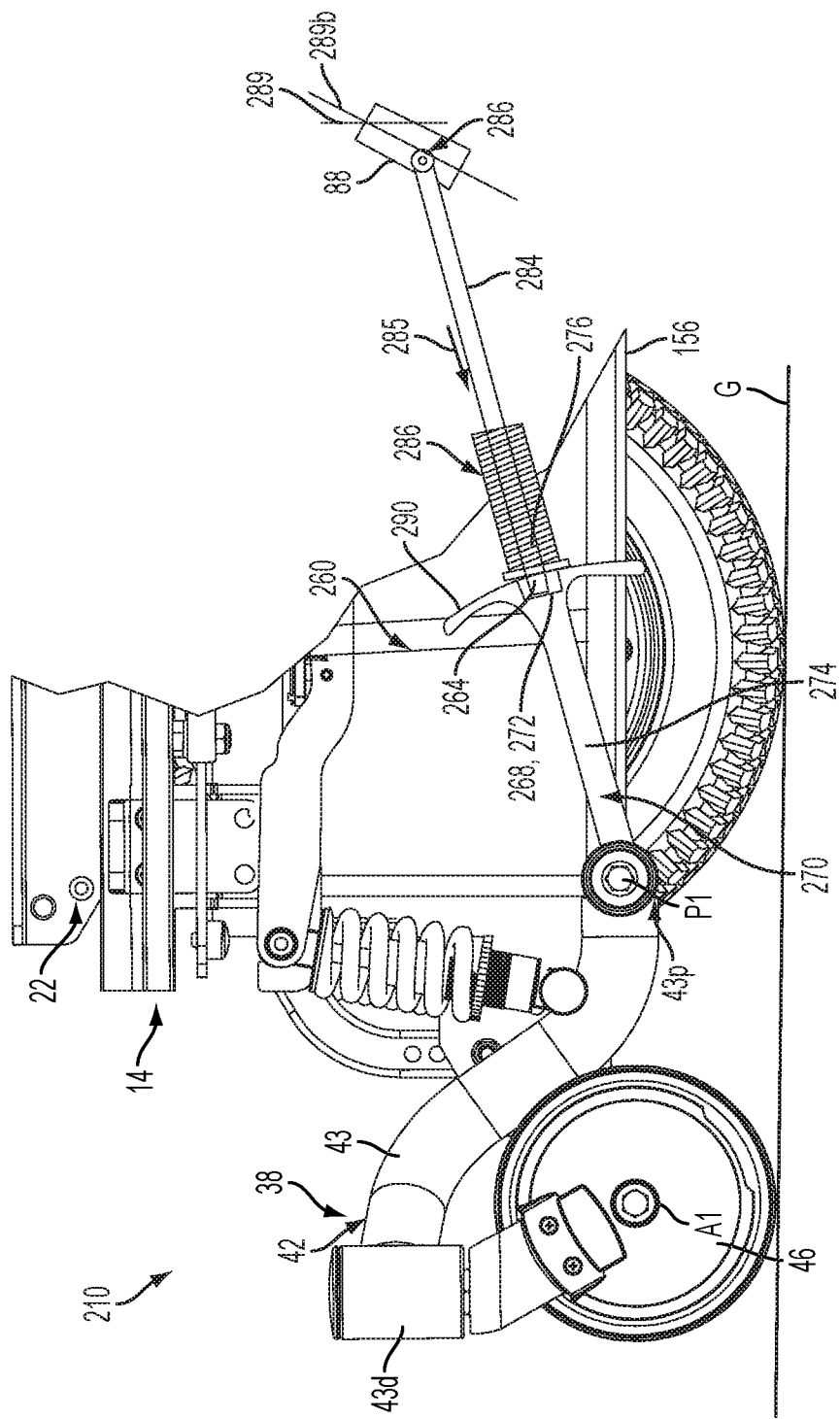
FIG. 10A is a side elevation view of a powered wheelchair according to another embodiment of an aspect of the present disclosure, illustrating the arm limiter in the locked configuration.
Figure 10D:
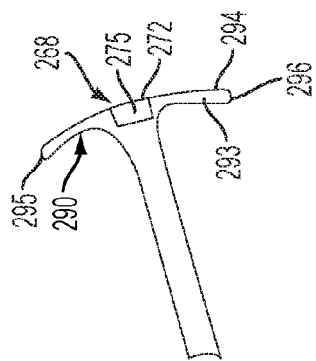
FIG. 10B is a side elevation view of a portion of the powered wheelchair shown in FIG. 10A, illustrating the arm limiter in an open configuration.
FIG. 10C is a side elevation view of a portion of the powered wheelchair shown in FIG. 10A, illustrating the arm limiter being inhibited from transitioning into the locked configuration as the powered wheelchair ascends an obstacle.
Figure 10B:
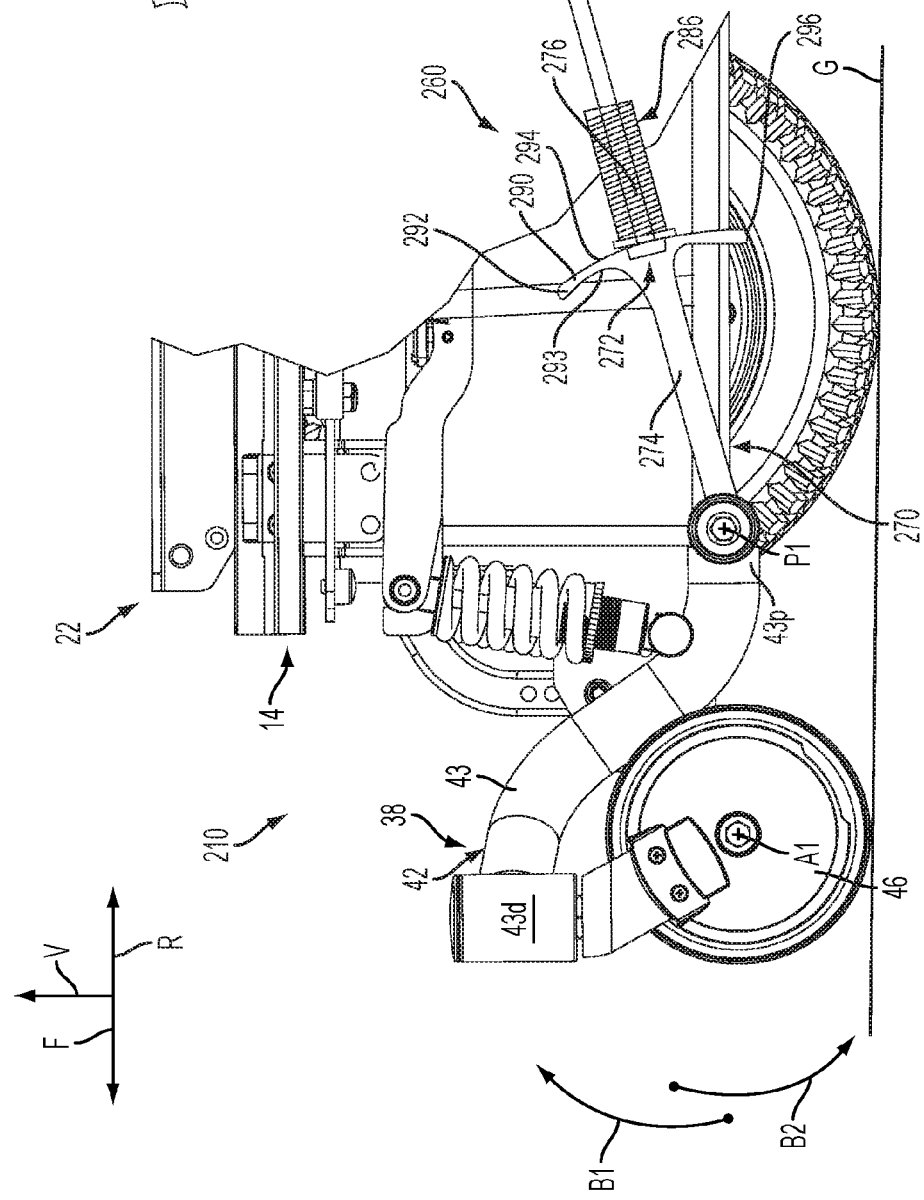
Figure 10C:
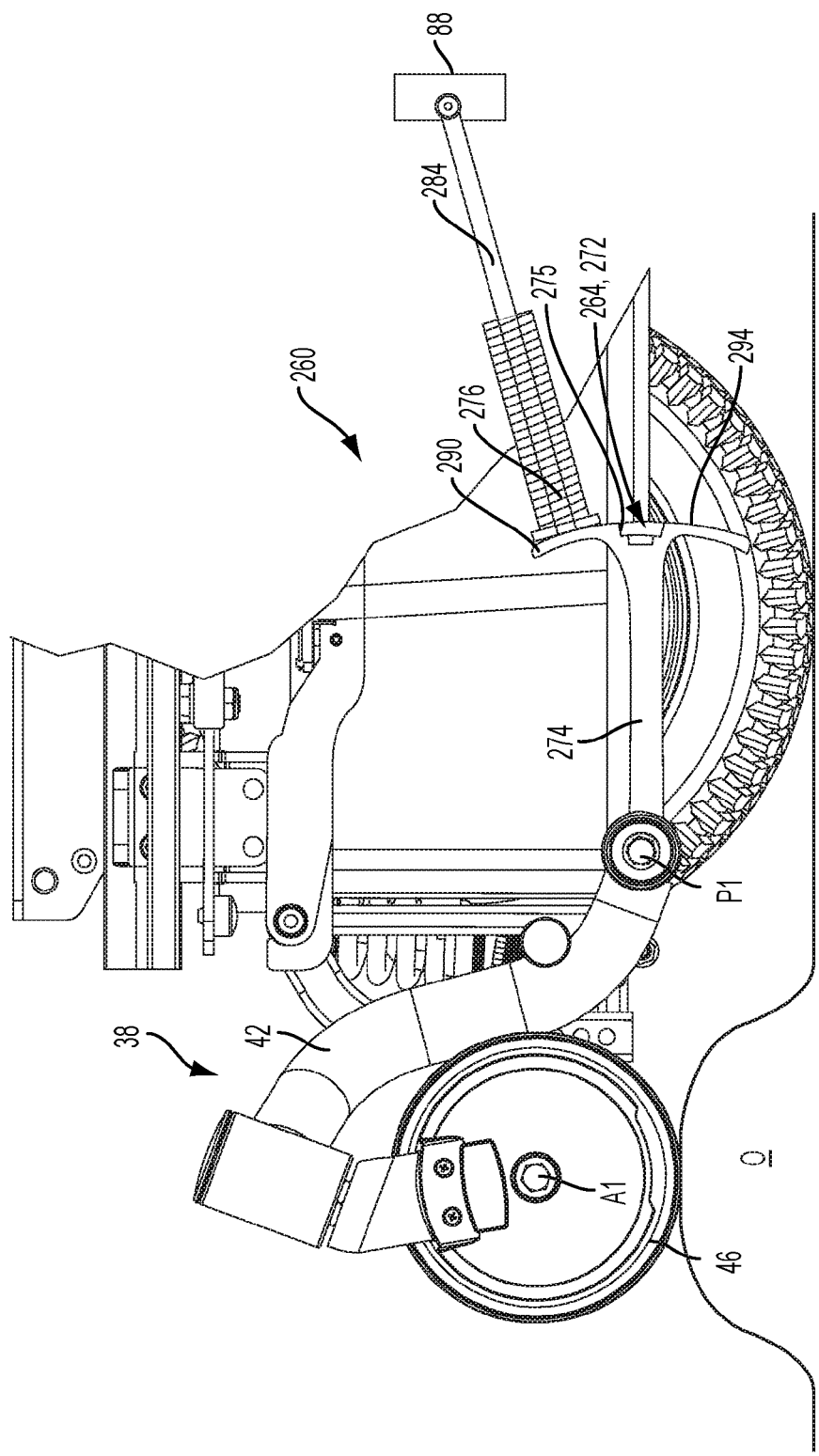

In accordance with the alternative embodiment, the powered wheelchair 210 includes a pair of arm limiter assemblies 260 configured to selectively engage the forward arm assemblies 38 so as to inhibit relative motion between the arm assemblies 38 and frame 14 in certain instances during operation of the wheelchair 210. As illustrated in FIGS. 10A-10C, the arm limiter assembly 260 includes a first mating member 264 supported by the arm assembly 38 and a second mating member 268 supported by the frame 14 that is configured to mate with the first mating member 264 only when the front wheel 46 and drive wheel 32 are on substantially flat, level ground, for instance when the arm member 42 is in the first position 40A (FIG. 10A, (similar to FIG. 3A).

Further, the arm limiter assembly 260 has a first or open configuration and a second or locked configuration. When the arm limiter assembly 160 is in the open configuration as shown in FIGS. 10B and 10C, the first and second mating members are not engaged and the arm assembly 38 can pivot through the first range of rotation. When the arm limiter assembly 260 is in the second or locked configuration as shown in FIG. 10A, the first and second mating members are engaged with each other and the arm assembly 38 is permitted to pivot through the second range of rotation that is less than the first range of rotation. In the locked configuration, the arm assembly 38 may still pivot to a limited extent, such as 4 degrees away from the first position 40A, because the mating member may be a slotted opening as explained more fully below. Alternatively, when the arm assembly 38 is in locked configuration, the arm assembly 38 may not pivot at all away from the first position 40A. In the illustrated embodiment, the first mating member 264 can be an aperture 272 and the second mating member 268 can be a pin 276 that is configured to be received by the aperture 272. It should be appreciated, however, that the pin 276 can be supported by the arm assembly 38 and the aperture 272 supported by the frame 14 as desired.

Continuing with FIGS. 10A-10D, the arm limiter assembly 260 includes an actuator 88, a linkage 284, and a pin assembly 286 coupled to linkage 284. The pin assembly 286 includes a projection in the form a pin 276. In the illustrated embodiment, the pin 276 is the first mating member 264. The arm limiter assembly 260 further includes a leg 274 fixed to the arm member 42 and a plate 290 directly or indirectly coupled to the leg 274. The actuator 88 is in the position to maintain the pin 276 in a retracted position when the seat 22 is in the lowered position as shown in FIG. 10B to enable standard mode operation of the wheelchair. The actuator 88 moves the pin 276 toward an engaged position whereby the pin 276 is received by the aperture 272 when the controller 92 receives an input to move the wheelchair 210 in the elevated motion mode and the seat 22 is in raised position as shown in FIG. 10A, or otherwise to lock the front arm assembly 38.

The leg 274 is coupled to the arm member 42 proximate the pivot axis P1. As the arm member 42 rotates about the pivot axis P1, the leg 274 and the plate 290 rotates about pivot axis P1. If the arm member 42 rotates in a first rotation direction B1, the plate 290 rotates in the second rotational direction B2 (FIG. 10B). The plate 290 includes a plate body 292, a first surface 293, a second surface 294 opposed to the first surface 293, and a thickness T (not shown) that extends from the first surface 293 to the second surface 294. The plate can define an upper edge 295 and a lower edge 296. The plate is curved as it extends from the upper edge 295 to the lower edge 296. In addition, the plate 290 defines at least one aperture 272 (FIG. 10C) that extends along a direction aligned or parallel to the thickness T. The aperture 272 is sized and configured to receive the pin 276. More specifically, the plate 290 defines an aperture edge 275. The aperture edge 275 defines the aperture 272. For instance, the aperture 272 can be an elongate slot elongate along a direction that is angularly offset with respect to the thickness either vertically with respect to forward-rearward direction. In other embodiments, the aperture can be circular, oval, or other shaped opening. Further, in alternative embodiments, the plate 290 is configured so that the pin 276 can ride along its surface until pin 276 extends beyond an edge of the plate 290, such as the aperture edge 275 or the lower edge in accordance with certain embodiments.

Continuing with FIGS. 10A-10D, in operation, controller 92 receives an input to operate wheelchair 210 with the seat 22 in the raised position. In response, the controller 92 the causes the actuator 88 move the pin 276 to move into an extended configuration toward the plate 290. As shown in FIG. 10A, when the plate 290 is in an aligned position whereby the aperture 272 is aligned with the pin 276, for example due to orientation of the arm member 42 along flat, level ground G, the pin 276 extends into the aperture 272. When the pin 276 extends along the edge 275 into the aperture 272, the arm limiter assembly 260 is in the locked configuration and movement of the arm member 42 is limited. If, however, the wheelchair 210 is traversing an obstacle O as shown in FIG. 10C and the seat 22 is in the lowered position, the arm member 42 is pivoted upwards in a first rotational direction B1 and the plate 290 moves downward toward the surface G. This in turn causes the plate 290 to slide along the pin 276 such that the pin 276 is disposed adjacent the surface 294 and positioned upward with respect to aperture edge 275. The plate 290 in this position blocks the pin 276 from extending into the engaged position. Because the pin 276 is prevented from moving into the engaged position in the aperture 272, the arm limiter assembly 260 is prevented from transitioning into the second or locked configuration. The wheelchair 210 operates similar in some respects as to how the wheelchair 10, 110 operates when the arm limiter assembly 60, 160 is prevented from the transitioning to the locked configuration. For instance, the controller 92 may prevent operation of one or more aspects of the wheelchair 210 in the elevated motion mode, for example, if the condition of the arm limiter being in the locking condition is not met. After the wheelchair 210 traverses the obstacle O, the arm member 42 pivots downwardly until the front wheel 46 and the drive wheels 32 are on flat, level ground as shown in FIGS. 10A and 10B. At this point, the plate 290 is moved upwardly sliding along the pin 276 until the pin 276 is aligned with the aperture 272. The pin 276, via the actuator as noted above, urges the pin 276 to extend along the aperture edge 275 into the aperture 272 placing the arm limiter assembly 260 in the locked configuration. In this regard, the plate 290 is configured as a sliding member.

The aperture 272 can be elongate along the direction the pin 276 slides along the plate 290. In such embodiments, the arm member 42 can pivot through the second range of rotation (less than the first range of rotation) when the arm limiter assembly 260 is in the locked configuration while pin 276 is located in slotted aperture 272. In this regard, the plate 290 is configured to permit the arm member 42 to pivot up to 4 or 5 degrees away from the its initial position 40A even when the arm limiter 260 is in the locked configuration. This particular embodiment permits the arm assembly 38 to traverse slight obstacles and prevent the arm assembly 38 and the arm limiter assembly 260 from locking out, and permits arm assembly 38 to be limited in its downward (direction B2) movement. It should be appreciated, however, that the aperture 272 can have a diameter or other dimension that is substantially equal to that of the pin 276 such that when the pin 276 is received by the aperture 272, the forward extending arm 42 is fixed relative to the frame 14 with little or no movement.

As illustrated, the aperture 272 is disposed between the upper and lower plate edges 295 and 296 such that the pin 276 can extend along the aperture edge 275. It should be appreciated, however, that plate 290 can be configured without an aperture that receives the pint 276. For instance, the lower edge 296 can define a surface along which the pin 276 extends along in order to transition the arm limiter assembly 260 into the second configuration. In other words, the plate 290 can be moved into the locked or an aligned position when pin 276 is moveable along the lower edge 296 into its engaged position.

Figure 11A:
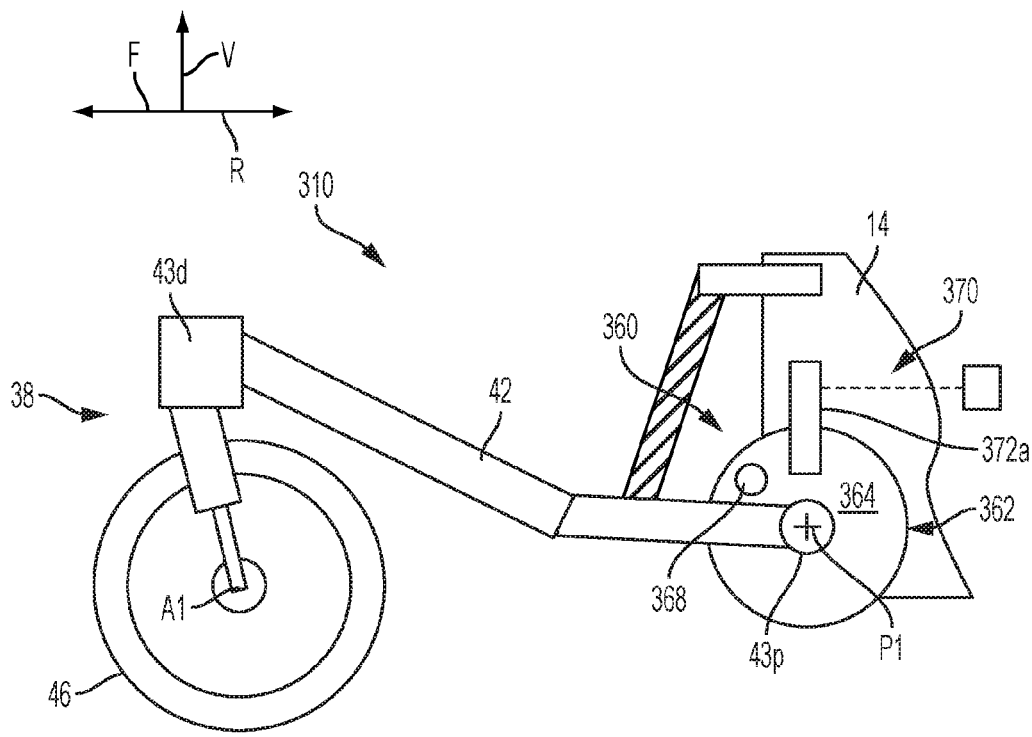
FIG. 11A is a schematic side elevation view of a powered wheelchair according to another embodiment of an aspect of the present disclosure, illustrating an arm limiter in the locked configuration.
Figure 11B:
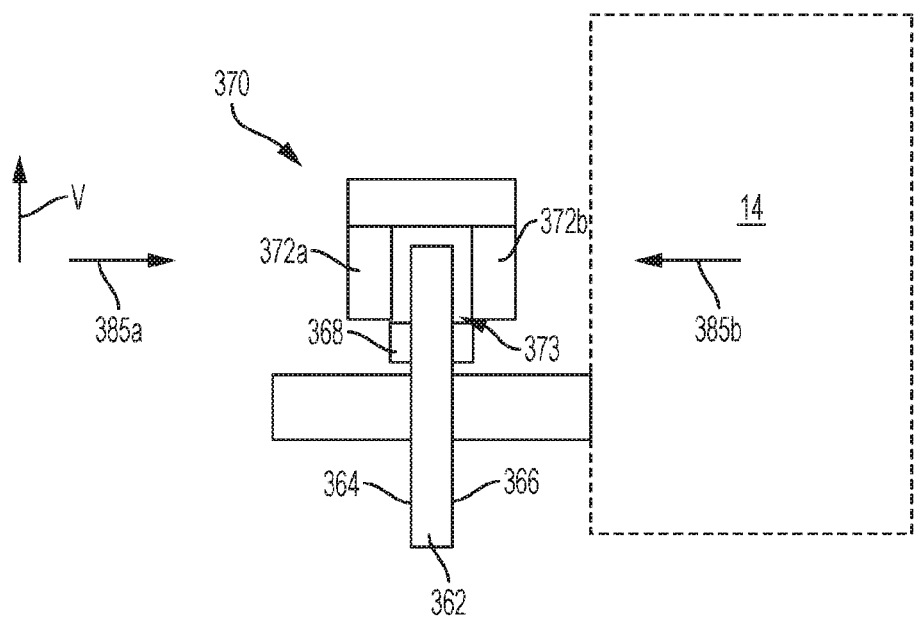
FIG. 11B is an end view of the arm limiter illustrated in FIG. 11A.

Turning to FIGS. 11A and 11B another embodiment of wheelchair 310 is schematically illustrated including an arm limiter assembly 360 according to yet another alternate embodiment of present disclosure. The powered wheelchair 310 according to an alternative embodiment of the present disclosure is configured similar to the powered wheelchair 10 described above. Accordingly, the description below regarding wheelchair 310 will use similar reference signs to identify elements common to wheelchair 10 and wheelchair 310, such as the frame 14, drive wheels 32 (not shown), forward arm assemblies 38, rear arm assemblies 48 (not shown), lift mechanism 18 (not shown), seat 22, and control system 90 and sensors.

Continuing with FIGS. 11A and 11B, the arm limiter assembly 360 can be used on any one of the wheelchairs 10, 110, or 210 described above. Further, the wheelchair incorporating arm limiter assembly 360 may include similar components and operation characteristics described above except as noted otherwise. The arm limiter assembly 360 includes a disc 362 or a segment of a disc that is supported by the frame 14 and operatively engaged with arm assembly 38, and in particular to the proximal end 43p of the arm member 42. The arm limiter assembly 260 includes a caliper or clamp 370 that is supported by the frame 14 of the wheelchair 310 (frame and wheelchair not shown in FIGS. 11A and 11B). The clamp 370 can have a pair of moveable pads 372a and 372b spaced apart with respect to each other to define a gap 373. The gap 373 is sized to receive a portion of the disc 362 therein such there is no contact or light contact between the pads 372a and 372b and the corresponding surfaces of disk 362. The clamp 370 is configured to selectively engage the disc 362 to thereby restrict movement of the disc 362 and the arm member 42. For instance, the clamp 370 can be coupled to the actuator 88 such that when the actuator 88 is activated, the moveable arms 372a, 372b move toward each other in directions 385a and 385b against opposite surfaces 364 and 366 of the disc 362. In a first or open configuration, the disc 362 is moveable in the gap 373 and the arm member 42 is moveable through the first range of rotation or motion. When the wheelchair 310 operates in an elevated motion mode, the actuator 88 closes the clamp 370 tightening against the disc 362. Because the disc 362 is thus fixed to the arm member 42, movement of the arm member 42 is stopped. In an alternative embodiment, the disc 326 can have a protrusion or stop 368 that is positioned to align between the clamp arms 372a, 372b in the gap 373 when the arm member 42 is rotationally different from the first position 40A by more than 4 or 5 degrees. In this position, the disc 362, via the stop 368 in the gap 373, prevent the clamp arms 372a, 372b from transitioning into the clamped configuration against the surface 364 and 366, which in turn prevents arm limiter assembly 360 from locking movement of the disc and arm member 42.

Figure 12A:
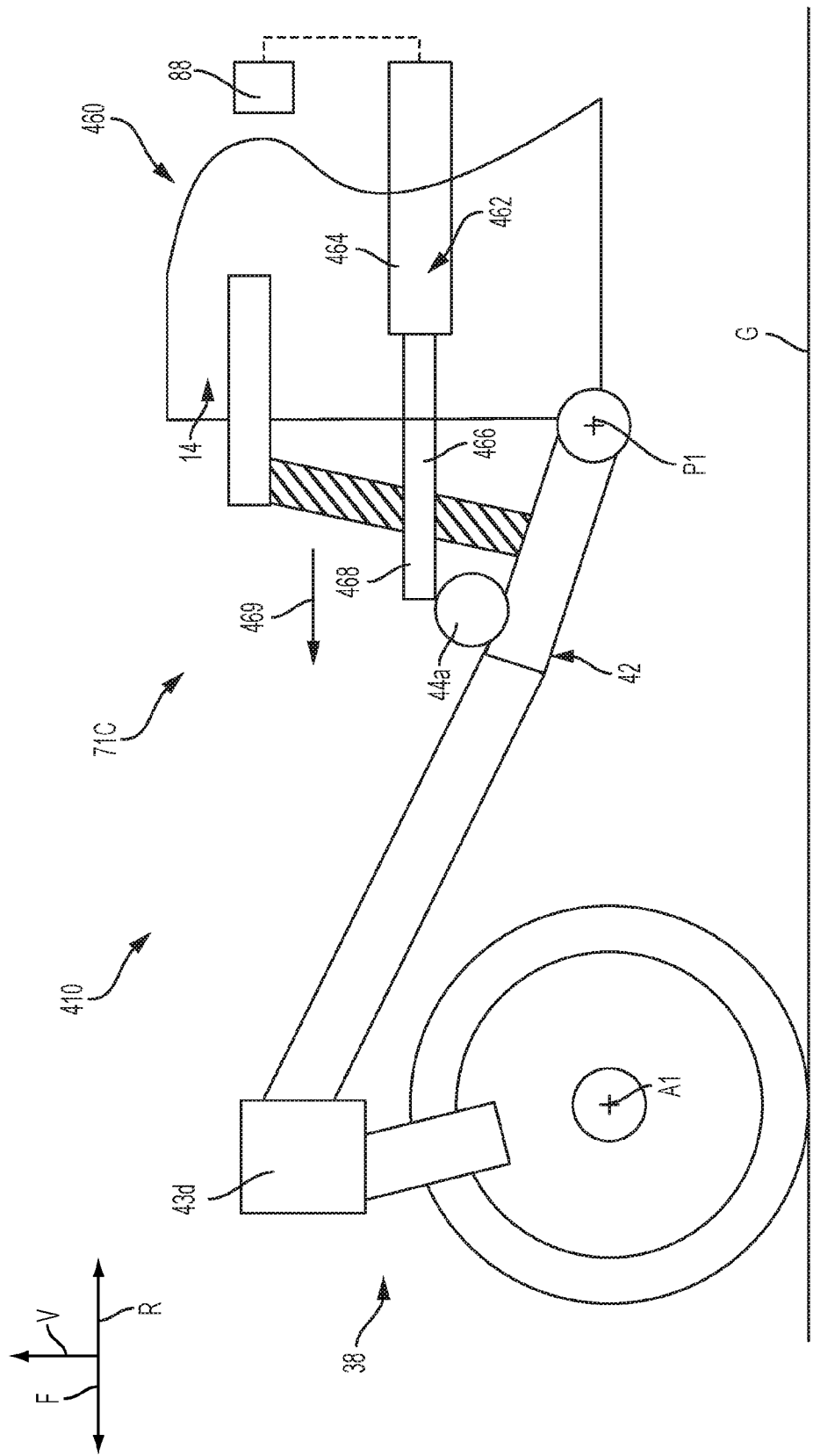
FIG. 12A is a schematic side elevation view of a powered wheelchair according to another embodiment of the present disclosure, illustrating the arm limiter in the locked configuration.
Figure 12B:
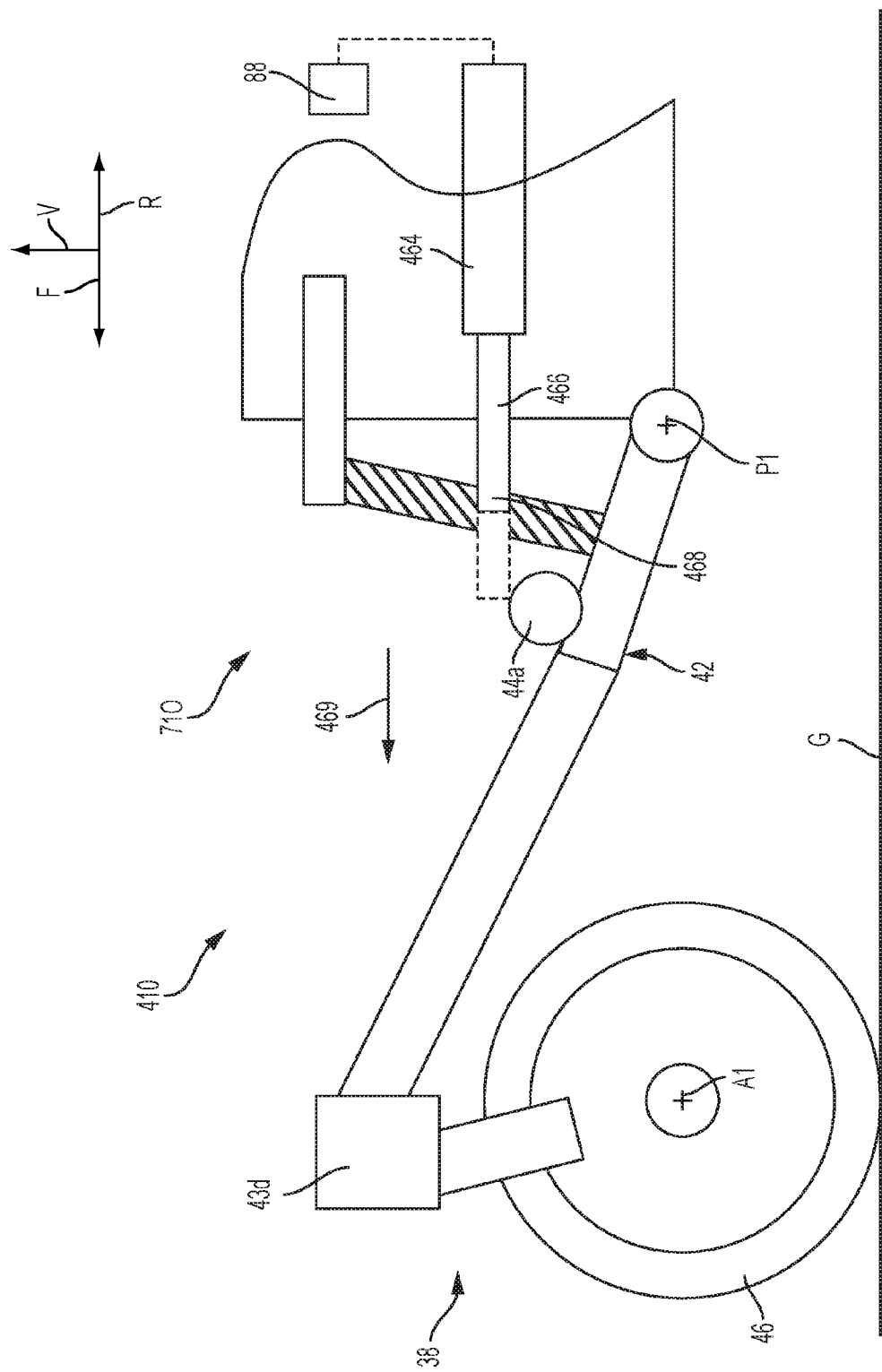
FIG. 12B is a side elevation view of a portion of the powered wheelchair shown in FIG. 12A, illustrating the arm limiter in an open configuration with a portion thereof retracted.
Figure 12C:
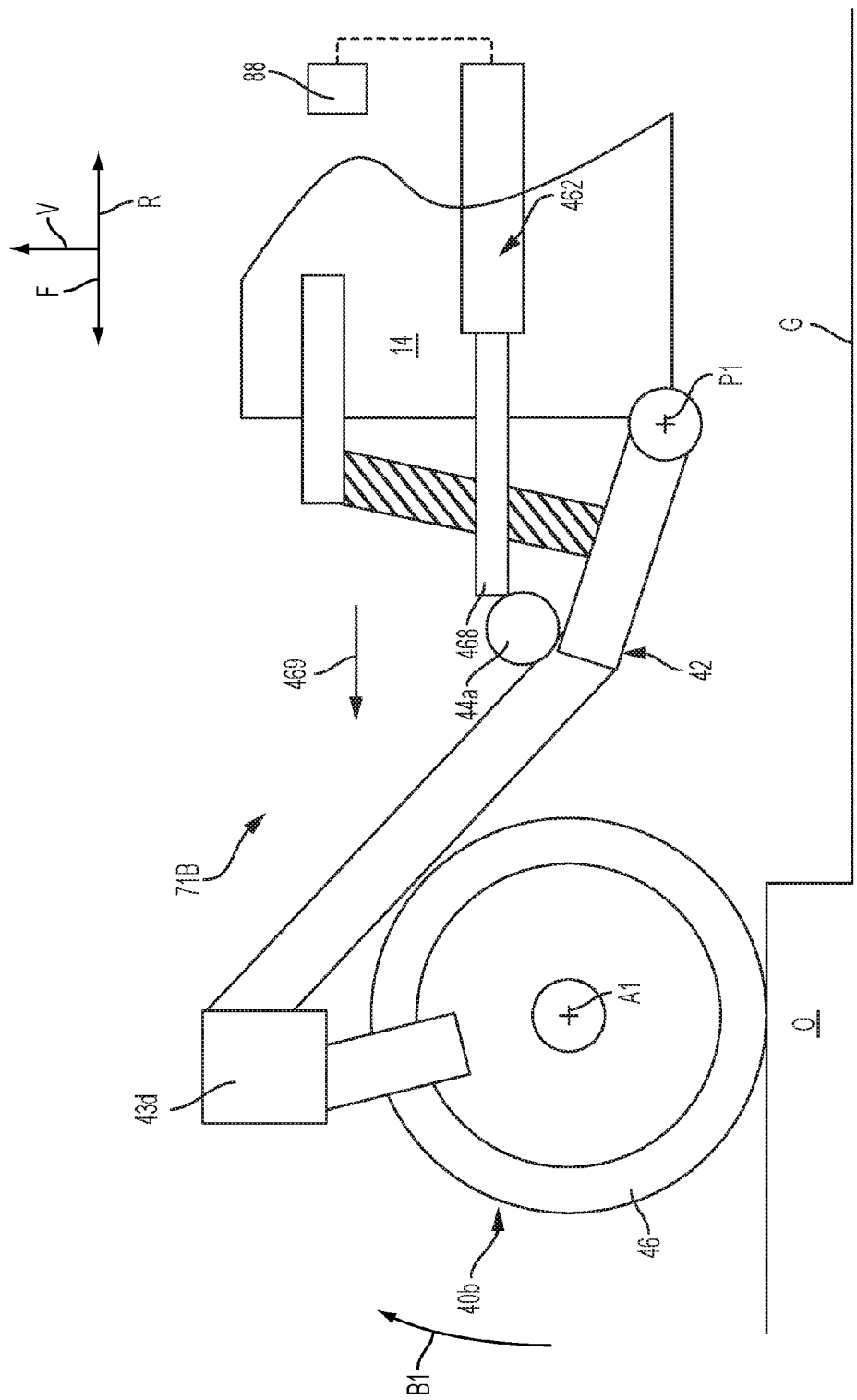
FIG. 12C is a side elevation view of a portion of the powered wheelchair shown in FIG. 12A, illustrating the arm limiter being inhibited from transitioning into the locked configuration as the powered wheelchair ascends an obstacle.

Turning to FIGS. 12A-12C, a wheelchair 410 is illustrated including an arm limiter assembly 460 according to yet another alternate embodiment. The powered wheelchair 410 is configured similar to the powered wheelchair 10 described above and illustrated in FIGS. 1-5. Accordingly, the description below regarding wheelchair 410 will use similar reference signs to identify elements common to wheelchair 10 and wheelchair 410, such as the frame 14, drive wheels 32 (not shown), forward arm assemblies 38, rear arm assemblies 48 (not shown), lift mechanism 18 (not shown), seat 22, and control system 90 and sensors. In the alternative embodiment, the arm limiter assembly 460 can be configured as rear-ward arm limiter assembly.

FIGS. 12A, 12B, 12C schematically illustrate the arm limiter assembly 460 in the locking configuration 71c (FIG. 12A), the open configuration 71o (FIG. 12B), and a blocked configuration 71o (FIG. 12C), whereby the arm member 42 is preventing transition of the arm limiter assembly 460 from the open configuration 71o into the locking configuration 71c. In the illustrated embodiment, the arm limiter assembly 460 can be configured as rearward arm limiter assembly. The arm limiter assembly 460 includes an actuatable unit 462 coupled between the frame 14 and the arm member 42. The actuatable unit 462 can have a housing 464 and an elongate member 466 in the form of a rod or bar that extends out from the housing 464 and is movable with respect to the housing 464. FIG. 12B shows the elongate member 466 in its retracted position. The extended position of elongate member 466 is shown in dashed lines in FIG. 12B. The elongate member 466 defines an end 468 spaced from the housing 464 along a direction 469 that is aligned with and parallel to the forward direction F of the wheelchair 410. The arm limiter assembly 460 has 1) a first or open configuration, whereby the elongate member 466 is retracted partially into the housing 464 such that the arm member 42 is pivotable through the first range of rotation as discussed above, 2) a second or locked configuration where the elongate member 466 abuts the stop 44a of the arm member 42, thereby preventing the arm member 42 from pivoting upwardly with respect to the frame 14, and 3) a blocked configuration where the arm limiter assembly is prevented from transitioning into the locked configuration. The actuatable unit 462 can be a hydraulic strut, magnetorhealogical strut, gas strut, or other device configured to allow one component to move relative to another component to selectively engage the arm member 42 as described herein.

Referring first to FIG. 12B, during normal operation and when the seat 22 is in the lowered position, the arm limiter assembly 460 is in the open configuration. The actuator 88 has been actuated to cause the elongate member 466 to retract into the open configuration. Turning to FIG. 12A, when wheelchair 10 is operated in an elevated mode—when the seat 22 is in the raised position—the arm limiter assembly 460 transitions into locked configuration such that elongate member 466 is extended to block upward movement of the arm member 42. Accordingly, as the seat 22 is elevated into the raised position, the forward arm member 42 will have a limited range of rotation such that the wheelchair 410 is not operable to ascend an obstacle O along the surface G. Referring now to FIG. 12C, if front wheel 46 is on uneven ground surface G relative to the drive wheels 32, such as when the wheelchair 410 begins ascent of the obstacle O, the arm member 42 is pivoted in an upward rotational direction B1 away from the first position 40A into the second position 40b that is rotationally different than the first position 40A. Because the arm member 42 is pivoted upwards, the stop member 44a abuts the forward end 468 of the elongate member 466, preventing further progression of the elongate member 466 into the locking configuration. Once wheelchair 410 has moved to a location on the surface G such that the front wheel 46 and the drive wheels 32 are on flat, level ground (i.e. the first position 40A), the actuatable unit 462 is configured to automatically urge the elongate member 466 into the locking configuration as shown in FIG. 12A.

Figure 13A:
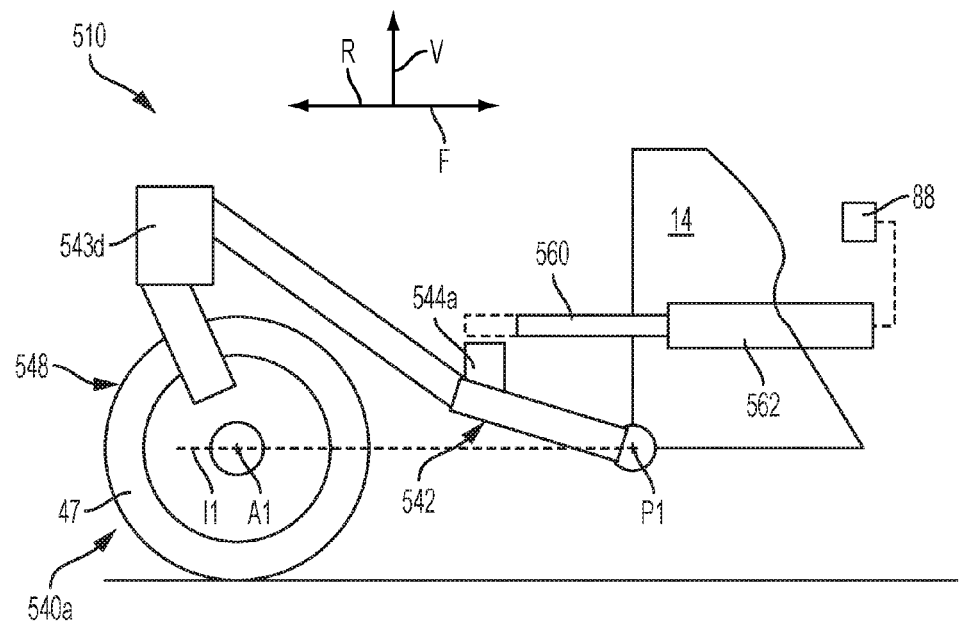
FIG. 13A is a schematic side elevation view of a portion of a powered wheelchair according to another embodiment of the present disclosure, illustrating a rear arm assembly and a rear arm limiter assembly in an open configuration.
Figure 13B:
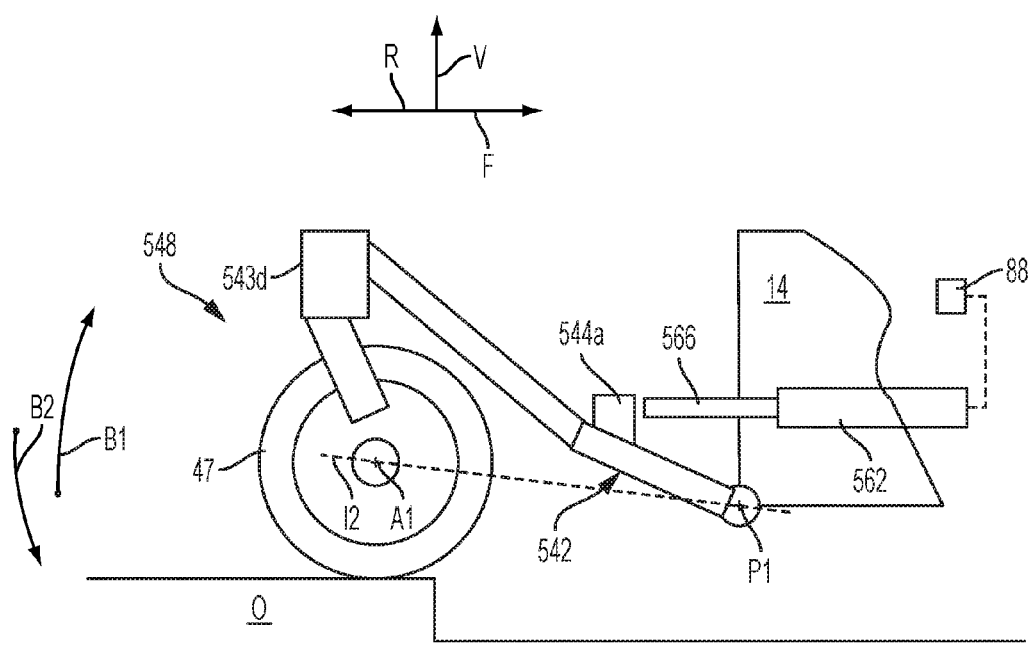
FIG. 13B is a side elevation view of a portion of the powered wheelchair shown in FIG. 13A, illustrating the rear arm limiter assembly being inhibited from transitioning into the locked configuration as the powered wheelchair descends an obstacle.

Turning to FIGS. 13A and 13B, a powered wheelchair 510 according to an alternative embodiment of the present disclosure is configured similar to the powered wheelchair 10 described above and illustrated in FIGS. 1-5. Accordingly, the description below regarding wheelchair 510 will use similar reference numerals to identify elements common to wheelchair 10 and wheelchair 510, such as the frame 14, drive wheels 32 (not shown), lift mechanism 18 (not shown), seat 22, and control system 90 and sensors. The forward arm assemblies 38 are as described above except for the stop member. In the alternate embodiment, the powered wheelchair 510 includes a pair of rearward arm assemblies 548 configured to pivot relative to the frame 14 between a first position 540A when the wheelchair is operating on flat, level ground, and any number of different positions depending on if the wheelchair 510 is ascending an obstacle or initiating a decent down an incline. The rearward arm assembly 548 is configured similar to the forward arm assembly 38 describe above with reference to FIGS. 1-5 and this paragraph, and includes an arm member 542, a rear wheel 47 coupled to the arm member 542. The arm member 542 can include a stop member 544a located in the same place on the arm member 542 as stop member 44a in powered wheelchair 10. The stop member 544a of the arm member 542 in the embodiment shown in FIGS. 13A and 13B is not rounded, but has a vertical contact face and a horizontal top surface. The rearward arm assembly 548 can move in a first rotational direction B1, e.g., upward, when the wheelchair 510 encounters an ascent, or a second rotational direction B1, e.g., downward, when the wheelchair 510 descends down an inclined surface.

The powered wheelchair 510 can be configured to limit relative movement of the rearward arm assembly 548 depending on the surface G the wheelchair 510 is operating along. For instance, the arm limiter assembly 560 has an open or first configuration in which the rearward arm assembly 548 is moveable relative to frame 14 through a first range of rotation relative to the pivot axis P1, and a second or locked configuration in which the rearward arm assembly 548 is prevented from moving relative to the frame 14 as needed. For instance, in the locked configuration, the arm limiter assembly 560 limits movement of the arm assembly 546 through a second range of rotation that is less than the first range of rotation. It should be appreciated that the second range of rotation can include the rearward arm assembly 548 being rotationally fixed relative to the frame 14. In the with the illustrated embodiment, the arm limiter assembly 560 shown in FIGS. 13A and 13B is configured similar to the actuatable unit type arm limiter assembly 460 described above with reference to FIGS. 12A-12C. For example, the arm limiter assembly 560 includes an actuatable unit 562 coupled between the frame 14 and the arm member 42. The actuatable unit 562 can have a housing 564 and an elongate member 566 in the form of a rod or bar that extends out from the housing 564 and is movable with respect to the housing 564. FIG. 13B shows the elongate member 566 in its retracted position. However, it should be appreciated that wheelchair 510 can include anyone of the arm limiter assemblies 60, 160, 260, and 360 as described above, or any arm limiter assembly 970 or 1470 described below.

Turning to FIGS. 14A and 14B, an alternative embodiments of a powered wheelchair 610, the arm assembly 638 can be configured such that the wheel 46 or wheel axis A1 is translatable from the first position 40A to the second position 40b. In the embodiment shown in FIGS. 14A and 14B, powered wheelchair 610 is configured similar to the powered wheelchair 10 described above and illustrated in FIGS. 1-5. Accordingly, the description below regarding wheelchair 610 will use similar reference numerals to identify elements common to wheelchair 10 and wheelchair 610, such as the frame 14, drive wheels 32 (not shown), lift mechanism 18 (not shown), seat 22, arm limiter assembly 60, control system 90 and sensors. In an alternate embodiment, the powered wheelchair 610 includes a pair of forward arm assemblies 638 moveably coupled to a track 650 that extends forwardly from the frame 14. The track 650 receives the proximal end 43p (shown in dashed lines in FIGS. 14A and 14B) of the arm member 42. As illustrated, the proximal end 43p is slidable within the track 650 via a bearing or roller mechanism (not shown) so that arm member 42 and wheel 46 are translatable along the track 650 upwardly or downwardly relative to the frame 14 in a linear direction C. The linear direction C can extend along the vertical direction V or may be angularly offset (as illustrated) with respect the vertical direction V. Accordingly, the arm assemblies 638 are coupled to the frame 14 such that the wheel 46 is translatable from between the first position 40A and the second position 40A depending on the obstacle the wheel 46 is traversing. As noted above, operation of the arm assembly 638 is similar to operation of the arm assembly as the 008 patent noted above. The disclosure of the 008 Patent is incorporated by reference herein for all purposes.

Continuing with FIGS. 14A and 14B, in alternative embodiments when the arm limiter assembly 60 is in the disengaged or open configuration the arm member 42 is translatable from the first position 40A through a first range of motion. When the arm limiter assembly 60 is in the engaged or locked configuration, the arm member 42 is translatable through a second range of motion that is less than the first range of motion. While arm member 42 is translatable along the linear direction C, the positional difference of the wheel 46 in the first and second positions 40A and 40b can have an angular component. The first position 40A in FIG. 14A can be defined by first reference and second lines (not shown) that intersect the front wheel axis A1 and a forward-most point (651) located on the bottom 14b of the frame 14. When the arm assembly 638 translates the wheel 46 from the first position 40A to the second position 40b, the second reference line defines an angle α1 (not shown) with the first reference line (not shown). Accordingly, the range of motion as described with respect to wheelchair 10 can correspond to range of rotation described with respect to the wheelchair 10.

FIGS. 8A-8D schematically illustrate various alternate embodiments of the translating member 176. As noted above, the translating member can define any particular shape and/or surface profile to engage the arm member 42 during operation of the wheelchair. For instance, the translating member 192a (FIG. 8A) defines first and second distal surfaces 19a and 198a. The first surface 19a is inclined at an oblique angle with respect to the axis 71 and the transverse direction 6, the second surface 198a is normal to the axis 71. Translating member 192b (FIG. 8B) defines a distal surface 198b that is slightly curved with respect to the axis 71 and is inclined along the transverse direction 6. Translating member 192c (FIG. 8C) defines a distal surface 198c that is curved with respect to the axis 71 and the surface extends from the intersection of the axis 71 and surface 198c toward edges 175a and 175b. The leading surfaces 192a, 192b, and 192c provide a ramp or cam surface for engaging stop member 44a. Translating member 192d shown in FIG. 8D defines a distal surface 198d that inclines toward the rearward side 175b of the rotatable member 170.

Turning to FIGS. 10A-10D, a powered wheelchair 210 according to an alternative embodiment of the present disclosure is configured similar to the powered wheelchair 10,110 described above and illustrated in FIGS. 1-5 and 9A-9B. For instance, the powered wheelchair 210 includes a frame 14, drive wheels 32 coupled to the frame 14, a pair of forward arm assemblies 38, a pair of rear arm assemblies 48, and a lift mechanism 18 mounted to the frame 14 and configured to move the seat 22 between the lowered and raised positions 5R. The powered wheelchair 210 includes control system 90 and sensors 96a, 96b, 96c similar to the wheelchair 10 described above. Accordingly, the description below regarding wheelchair 210 will use similar reference signs to identify elements common to wheelchair 10 and wheelchair 210.

In accordance with the alternative embodiment, the powered wheelchair 210 includes a pair of arm limiter assemblies 260 configured to selectively engage the forward arm assemblies 38 so as to inhibit relative motion between the arm assemblies 38 and frame 14 in certain instances during operation of the wheelchair 210. As illustrated in FIGS. 10A-10C, the arm limiter assembly 260 includes a first mating member 264 supported by the arm assembly 38 and a second mating member 268 supported by the frame 14 that is configured to mate with the first mating member 264 only when the front wheel 46 and drive wheel 32 are on substantially flat, level ground, for instance when the arm member 42 is in the first position 40A (FIG. 10A, (similar to FIG. 3A).

Further, the arm limiter assembly 260 has a first or open configuration and a second or locked configuration. When the arm limiter assembly 160 is in the open configuration as shown in FIGS. 10B and 10C, the first and second mating members are not engaged and the arm assembly 38 can pivot through the first range of rotation. When the arm limiter assembly 260 is in the second or locked configuration as shown in FIG. 10A, the first and second mating members are engaged with each other and the arm assembly 38 is permitted to pivot through the second range of rotation that is less than the first range of rotation. In the locked configuration, the arm assembly 38 may still pivot to a limited extent, such as about 4 degrees or more (or less) away from the first position 40A, because the mating member may be a slotted opening as explained more fully below. Alternatively, when the arm assembly 38 is in locked configuration, the arm assembly 38 may not pivot at all away from the first position 40A. In the illustrated embodiment, the first mating member 264 can be an aperture 272 and the second mating member 268 can be a pin 276 that is configured to be received by the aperture 272. It should be appreciated, however, that the pin 276 can be supported by the arm assembly 38 and the aperture 272 supported by the frame 14 as desired.

Continuing with FIGS. 10A-10D, the arm limiter assembly 260 includes an actuator 88, a linkage 284, and a pin assembly 286 coupled to linkage 284. The pin assembly 286 includes a projection in the form a pin 276. In the illustrated embodiment, the pin 276 is the first mating member 264. The arm limiter assembly 260 further includes a leg 274 fixed to the arm member 42 and a plate 290 directly or indirectly coupled to the leg 274. The actuator 88 is in the position to maintain the pin 276 in a retracted position when the seat 22 is in the lowered position as shown in FIG. 10B to enable standard mode operation of the wheelchair. The actuator 88 moves the pin 276 toward an engaged position whereby the pin 276 is received by the aperture 272 when the controller 92 receives an input to move the wheelchair 210 in the elevated motion mode and the seat 22 is in raised position as shown in FIG. 10A, or otherwise to lock the front arm assembly 38.

The leg 274 is coupled to the arm member 42 proximate the pivot axis P1. As the arm member 42 rotates about the pivot axis P1, the leg 274 and the plate 290 rotates about pivot axis P1. If the arm member 42 rotates in a first rotation direction B1, the plate 290 rotates in the second rotational direction B2 (FIG. 10B). The plate 290 includes a plate body 292, a first surface 293, a second surface 294 opposed to the first surface 293, and a thickness T (not shown) that extends from the first surface 293 to the second surface 294. The plate can define an upper edge 295 and a lower edge 296. The plate is curved as it extends from the upper edge 295 to the lower edge 296. In addition, the plate 290 defines at least one aperture 272 (FIG. 10C) that extends along a direction aligned or parallel to the thickness T. The aperture 272 is sized and configured to receive the pin 276. More specifically, the plate 290 defines an aperture edge 275. The aperture edge 275 defines the aperture 272. For instance, the aperture 272 can be an elongate slot elongate along a direction that is angularly offset with respect to the thickness either vertically with respect to forward-rearward direction. In other embodiments, the aperture can be circular, oval, or other shaped opening. Further, in alternative embodiments, the plate 290 is configured so that the pin 276 can ride along its surface until pin 276 extends beyond an edge of the plate 290, such as the aperture edge 275 or the lower edge in accordance with certain embodiments.

Continuing with FIGS. 10A-10D, in operation, controller 92 receives an input to operate wheelchair 210 with the seat 22 in the raised position. In response, the controller 92 the causes the actuator 88 move the pin 276 to move into an extended configuration toward the plate 290. As shown in FIG. 10A, when the plate 290 is in an aligned position whereby the aperture 272 is aligned with the pin 276, for example due to orientation of the arm member 42 along flat, level ground G, the pin 276 extends into the aperture 272. When the pin 276 extends along the edge 275 into the aperture 272, the arm limiter assembly 260 is in the locked configuration and movement of the arm member 42 is limited. If, however, the wheelchair 210 is traversing an obstacle O as shown in FIG. 10C and the seat 22 is in the lowered position, the arm member 42 is pivoted upwards in a first rotational direction B1 and the plate 290 moves downward toward the surface G. This in turn causes the plate 290 to slide along the pin 276 such that the pin 276 is disposed adjacent the surface 294 and positioned upward with respect to aperture edge 275. The plate 290 in this position blocks the pin 276 from extending into the engaged position. Because the pin 276 is prevented from moving into the engaged position in the aperture 272, the arm limiter assembly 260 is prevented from transitioning into the second or locked configuration. The wheelchair 210 operates similar in some respects as to how the wheelchair 10, 110 operates when the arm limiter assembly 60, 160 is prevented from the transitioning to the locked configuration. For instance, the controller 92 may prevent operation of one or more aspects of the wheelchair 210 in the elevated motion mode, for example, if the condition of the arm limiter being in the locking condition is not met. After the wheelchair 210 traverses the obstacle O, the arm member 42 pivots downwardly until the front wheel 46 and the drive wheels 32 are on flat, level ground as shown in FIGS. 10A and 10B. At this point, the plate 290 is moved upwardly sliding along the pin 276 until the pin 276 is aligned with the aperture 272. The pin 276, via the actuator as noted above, urges the pin 276 to extend along the aperture edge 275 into the aperture 272 placing the arm limiter assembly 260 in the locked configuration. In this regard, the plate 290 is configured as a sliding member.

The aperture 272 can be elongate along the direction the pin 276 slides along the plate 290. In such embodiments, the arm member 42 can pivot through the second range of rotation (less than the first range of rotation) when the arm limiter assembly 260 is in the locked configuration while pin 276 is located in slotted aperture 272. In this regard, the plate 290 is configured to permit the arm member 42 to pivot up to 4 or 5 degrees away from the its initial position 40A even when the arm limiter 260 is in the locked configuration. This particular embodiment permits the arm assembly 38 to traverse slight obstacles and prevent the arm assembly 38 and the arm limiter assembly 260 from locking out, and permits arm assembly 38 to be limited in its downward (direction B2) movement. It should be appreciated, however, that the aperture 272 can have a diameter or other dimension that is substantially equal to that of the pin 276 such that when the pin 276 is received by the aperture 272, the forward extending arm 42 is fixed relative to the frame 14 with little or no movement.

As illustrated, the aperture 272 is disposed between the upper and lower plate edges 295 and 296 such that the pin 276 can extend along the aperture edge 275. It should be appreciated, however, that plate 290 can be configured without an aperture that receives the pint 276. For instance, the lower edge 296 can define a surface along which the pin 276 extends along in order to transition the arm limiter assembly 260 into the second configuration. In other words, the plate 290 can be moved into the locked or an aligned position when pin 276 is moveable along the lower edge 296 into its engaged position.

Turning to FIGS. 11A and 11B another embodiment of wheelchair 310 is schematically illustrated including an arm limiter assembly 360 according to yet another alternate embodiment of present disclosure. The powered wheelchair 310 according to an alternative embodiment of the present disclosure is configured similar to the powered wheelchair 10 described above. Accordingly, the description below regarding wheelchair 310 will use similar reference signs to identify elements common to wheelchair 10 and wheelchair 310, such as the frame 14, drive wheels 32 (not shown), forward arm assemblies 38, rear arm assemblies 48 (not shown), lift mechanism 18 (not shown), seat 22, and control system 90 and sensors.

Continuing with FIGS. 11A and 11B, the arm limiter assembly 360 can be used on any one of the wheelchairs 10, 110, or 210 described above. Further, the wheelchair incorporating arm limiter assembly 360 may include similar components and operation characteristics described above except as noted otherwise. The arm limiter assembly 360 includes a disc 362 or a segment of a disc that is supported by the frame 14 and operatively engaged with arm assembly 38, and in particular to the proximal end 43p of the arm member 42. The arm limiter assembly 260 includes a caliper or clamp 370 that is supported by the frame 14 of the wheelchair 310 (frame and wheelchair not shown in FIGS. 11A and 11B). The clamp 370 can have a pair of moveable pads 372a and 372b spaced apart with respect to each other to define a gap 373. The gap 373 is sized to receive a portion of the disc 362 therein such there is no contact or light contact between the pads 372a and 372b and the corresponding surfaces of disk 362. The clamp 370 is configured to selectively engage the disc 362 to thereby restrict movement of the disc 362 and the arm member 42. For instance, the clamp 370 can be coupled to the actuator 88 such that when the actuator 88 is activated, the moveable arms 372a, 372b move toward each other in directions 385a and 385b against opposite surfaces 364 and 366 of the disc 362. In a first or open configuration, the disc 362 is moveable in the gap 373 and the arm member 42 is moveable through the first range of rotation or motion. When the wheelchair 310 operates in an elevated motion mode, the actuator 88 closes the clamp 370 tightening against the disc 362. Because the disc 362 is thus fixed to the arm member 42, movement of the arm member 42 is stopped. In an alternative embodiment, the disc 326 can have a protrusion or stop 368 that is positioned to align between the clamp arms 372a, 372b in the gap 373 when the arm member 42 is rotationally different from the first position 40A by more than 4 or 5 degrees. In this position, the disc 362, via the stop 368 in the gap 373, prevent the clamp arms 372a, 372b from transitioning into the clamped configuration against the surface 364 and 366, which in turn prevents arm limiter assembly 360 from locking movement of the disc and arm member 42.

Turning to FIGS. 12A-12C, a wheelchair 410 is illustrated including an arm limiter assembly 460 according to yet another alternate embodiment. The powered wheelchair 410 is configured similar to the powered wheelchair 10 described above and illustrated in FIGS. 1-5. Accordingly, the description below regarding wheelchair 410 will use similar reference signs to identify elements common to wheelchair 10 and wheelchair 410, such as the frame 14, drive wheels 32 (not shown), forward arm assemblies 38, rear arm assemblies 48 (not shown), lift mechanism 18 (not shown), seat 22, and control system 90 and sensors. In the alternative embodiment, the arm limiter assembly 460 can be configured as rear-ward arm limiter assembly.

FIGS. 12A, 12B, 12C schematically illustrate the arm limiter assembly 460 in the locking configuration 71c (FIG. 12A), the open configuration 71o (FIG. 12B), and a blocked configuration 71o (FIG. 12C), whereby the arm member 42 is preventing transition of the arm limiter assembly 460 from the open configuration 71o into the locking configuration 71c. In the illustrated embodiment, the arm limiter assembly 460 can be configured as rearward arm limiter assembly. The arm limiter assembly 460 includes an actuatable unit 462 coupled between the frame 14 and the arm member 42. The actuatable unit 462 can have a housing 464 and an elongate member 466 in the form of a rod or bar that extends out from the housing 464 and is movable with respect to the housing 464. FIG. 12B shows the elongate member 466 in its retracted position. The extended position of elongate member 466 is shown in dashed lines in FIG. 12B. The elongate member 466 defines an end 468 spaced from the housing 464 along a direction 469 that is aligned with and parallel to the forward direction F of the wheelchair 410. The arm limiter assembly 460 has 1) a first or open configuration, whereby the elongate member 466 is retracted partially into the housing 464 such that the arm member 42 is pivotable through the first range of rotation as discussed above, 2) a second or locked configuration where the elongate member 466 abuts the stop 44a of the arm member 42, thereby preventing the arm member 42 from pivoting upwardly with respect to the frame 14, and 3) a blocked configuration where the arm limiter assembly is prevented from transitioning into the locked configuration. The actuatable unit 462 can be a hydraulic strut, magnetorheological strut, gas strut, or other device configured to allow one component to move relative to another component to selectively engage the arm member 42 as described herein.

Referring first to FIG. 12B, during normal operation and when the seat 22 is in the lowered position, the arm limiter assembly 460 is in the open configuration. The actuator 88 has been actuated to cause the elongate member 466 to retract into the open configuration. Turning to FIG. 12A, when wheelchair 10 is operated in an elevated mode—when the seat 22 is in the raised position—the arm limiter assembly 460 transitions into locked configuration such that elongate member 466 is extended to block upward movement of the arm member 42. Accordingly, as the seat 22 is elevated into the raised position, the forward arm member 42 will have a limited range of rotation such that the wheelchair 410 is not operable to ascend an obstacle O along the surface G. Referring now to FIG. 12C, if front wheel 46 is on uneven ground surface G relative to the drive wheels 32, such as when the wheelchair 410 begins ascent of the obstacle O, the arm member 42 is pivoted in an upward rotational direction B1 away from the first position 40A into the second position 40b that is rotationally different than the first position 40A. Because the arm member 42 is pivoted upwards, the stop member 44a abuts the forward end 468 of the elongate member 466, preventing further progression of the elongate member 466 into the locking configuration. Once wheelchair 410 has moved to a location on the surface G such that the front wheel 46 and the drive wheels 32 are on flat, level ground (i.e. the first position 40A), the actuatable unit 462 is configured to automatically urge the elongate member 466 into the locking configuration as shown in FIG. 12A.

Turning to FIGS. 13A and 13B, a powered wheelchair 510 according to an alternative embodiment of the present disclosure is configured similar to the powered wheelchair 10 described above and illustrated in FIGS. 1-5. Accordingly, the description below regarding wheelchair 510 will use similar reference numerals to identify elements common to wheelchair 10 and wheelchair 510, such as the frame 14, drive wheels 32 (not shown), lift mechanism 18 (not shown), seat 22, and control system 90 and sensors. The forward arm assemblies 38 are as described above except for the stop member. In the alternate embodiment, the powered wheelchair 510 includes a pair of rearward arm assemblies 548 configured to pivot relative to the frame 14 between a first position 540A when the wheelchair is operating on flat, level ground, and any number of different positions depending on if the wheelchair 510 is ascending an obstacle or initiating a decent down an incline. The rearward arm assembly 548 is configured similar to the forward arm assembly 38 describe above with reference to FIGS. 1-5 and this paragraph, and includes an arm member 542, a rear wheel 47 coupled to the arm member 542. The arm member 542 can include a stop member 544a located in the same place on the arm member 542 as stop member 44a in powered wheelchair 10. The stop member 544a of the arm member 542 in the embodiment shown in FIGS. 13A and 13B is not rounded, but has a vertical contact face and a horizontal top surface. The rearward arm assembly 548 can move in a first rotational direction B1, e.g., upward, when the wheelchair 510 encounters an ascent, or a second rotational direction B1, e.g., downward, when the wheelchair 510 descends down an inclined surface.

The powered wheelchair 510 can be configured to limit relative movement of the rearward arm assembly 548 depending on the surface G the wheelchair 510 is operating along. For instance, the arm limiter assembly 560 has an open or first configuration in which the rearward arm assembly 548 is moveable relative to frame 14 through a first range of rotation relative to the pivot axis P1, and a second or locked configuration in which the rearward arm assembly 548 is prevented from moving relative to the frame 14 as needed. For instance, in the locked configuration, the arm limiter assembly 560 limits movement of the arm assembly 546 through a second range of rotation that is less than the first range of rotation. It should be appreciated that the second range of rotation can include the rearward arm assembly 548 being rotationally fixed relative to the frame 14. In the with the illustrated embodiment, the arm limiter assembly 560 shown in FIGS. 13A and 13B is configured similar to the actuatable unit type arm limiter assembly 460 described above with reference to FIGS. 12A-12C. For example, the arm limiter assembly 560 includes an actuatable unit 562 coupled between the frame 14 and the arm member 42. The actuatable unit 562 can have a housing 564 and an elongate member 566 in the form of a rod or bar that extends out from the housing 564 and is movable with respect to the housing 564. FIG. 13B shows the elongate member 566 in its retracted position. However, it should be appreciated that wheelchair 510 can include anyone of the arm limiter assemblies 60, 160, 260, and 360 as described above, or the arm limiter assemblies 660, 760, 860, or 760 described below.

Turning to FIGS. 14A and 14B, a wheelchair 710 is illustrated including an arm limiter assembly 760 according to yet another alternate embodiment. The powered wheelchair 710 is configured similar to the powered wheelchair 10 described above and illustrated in FIGS. 1-5. Accordingly, the description below regarding wheelchair 710 will use similar reference signs to identify elements common to wheelchair 10 and wheelchair 710, such as the frame 14, drive wheels 32 (not shown), forward arm assemblies 38, rear arm assemblies 48 (not shown), lift mechanism 18 (not shown), seat 22, and control system 90 and sensors. In accordance with the alternative embodiment, the arm limiter assembly 760 can be configured as rear-ward arm or forward arm limiter assembly as noted above.

FIGS. 14A and 14B schematically illustrates operation of the arm limiter assembly 760. The arm limiter assembly 760 can have a first or open configuration where the arm member 42 has a first range of rotation, and a second or locked configuration where the arm member has a second range of rotation that is smaller than the first range of rotation. The arm limiter assembly 760 can include an actuatable unit 770 and an actuator 88. The wheelchair 710 can further include one or more the arm position sensors described above to detect the position of the arm member 42 relative the frame 14. The actuatable unit 770 is coupled to the frame 14 and the arm member 42.

Continuing with FIGS. 14A and 14B, the actuatable unit 770 can be configured as a strut and may include a first component or housing 772 and a second component or piston 774 moveably coupled to the first component 772. The second component includes a rod or bar that extends out from the housing 772 and is movable with respect to the housing 772. The strut 770 includes proximal end (not numbered) and a distal end (not numbered) spaced from the proximal end along the axis 71. The proximal end of the strut 770 is pivotably coupled to frame 14 via connector 776. The distal end of the strut 770 is pivotably coupled to arm member 42 via connector 778. The pivotable connections between the actuatable unit 770 and the arm member 42 and frame 14 account for the pivotable connection of the arm member 42 to the frame 14 as illustrated. For translating type arm members (See FIGS. 15A and 15B), it should be appreciated that the actuatable unit 770 may be pivotably connected to the frame 14 only. Further, the actuatable unit 770 defines a length 780 that extends from a point defined by connector 776 to the point (not shown) defined by connector 778. As the arm member 42 pivots upwardly away from the first position 40A (FIG. 14A) into the second position 40b (FIG. 14B), the length 780 decreases to a second, shorter length 780'. If the arm member 42 pivots downwardly away from the position 40A, the length 780 will increase. During normal operation when the seat is in the lowered position, the actuatable unit 770 is in the first or open configuration such that its length 780 can be adjusted to account for movement of the arm member 42 in an upward and downward direction. When the seat is moved into the raised configuration, the actuator 88 can cause the strut to lock or increase resistance to length adjustment, thereby inhibiting the ability of the actuatable unit 770 to compress or retract based on the position of the arm member 42. The actuatable unit 770 can be a hydraulic strut, magnetorhealogical strut, gas strut, or other device configured to allow one component to move relative to another component to selectively engage the arm member as described herein.

Figure 15A:
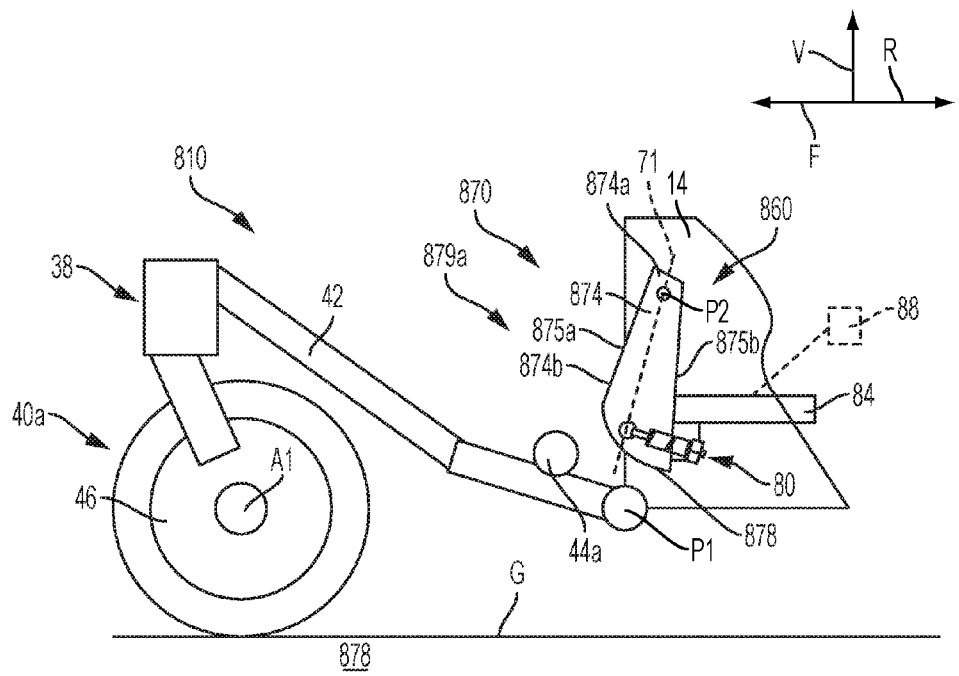
FIG. 15A is a schematic side elevation view of a portion of a powered wheelchair according to another embodiment of an aspect of the present disclosure, illustrating an arm limiter assembly in an open configuration.
Figure 15B:
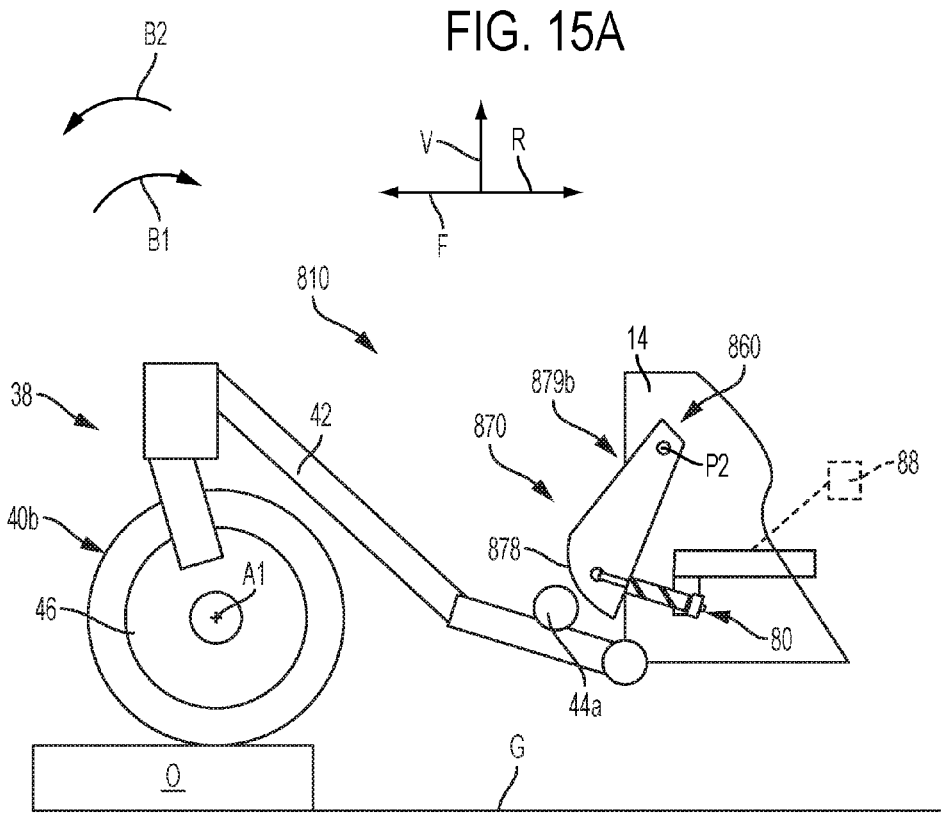
FIG. 15B is a side elevation view a portion of the powered wheelchair shown in FIG. 15A, illustrating the arm assembly ascending an obstacle and the arm limiter in a locked configuration.
Figure 15C:
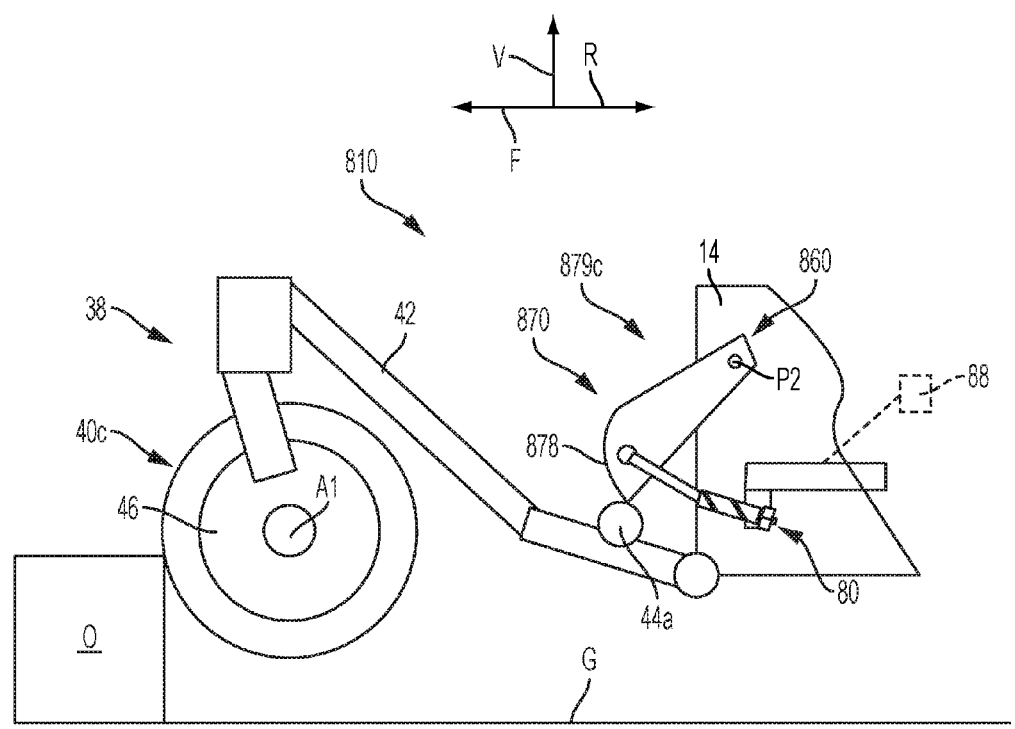
FIG. 15C is a side elevation view a portion of the powered wheelchair shown in FIG. 15A, illustrating the arm attempting to ascend an obstacle and with arm limiter in another locked configuration.

Turning to FIGS. 15A-15C, an alternative embodiments of a powered wheelchair 810. In the embodiment shown in FIGS. 15A-15C, powered wheelchair 810 is configured similar to the powered wheelchair 10 described above and illustrated in FIGS. 1-5. Accordingly, the description below regarding wheelchair 610 will use similar reference numerals to identify elements common to wheelchair 10 and wheelchair 810, such as the frame 14, drive wheels 32 (not shown), lift mechanism 18 (not shown), seat 22, arm assembly 38, control system 90 and sensors. In the illustrated embodiments, the powered wheelchair includes an arm limiter assembly 860 configured to progressive restrict the range of rotation which the arm member 42 and wheel axis A1. The arm limiter assembly 860 includes a rotatable member 870 rotatably mounted to the frame 14, an actuator 88, a transfer linkage 84 coupled to actuator 88, and a biasing member, such as spring 80 operably connected to the linkage 84 and the rotatable member 870. The actuator 88 is operable to cause movement of the transfer linkage 84, which in turn causes movement of the rotatable member 870 similar to the embodiment of the arm limiter assembly 60 described above.

Continuing with FIG. 15A, the rotatable member 870 is configured as a cam and defines a body 874 having a proximal end 874a rotatably coupled to the frame 14 at pivot axis P2, and a distal end 874b opposed to proximal end 874a along an axis 71. The proximal end 874a is rotatably coupled to the frame 14 at pivot axis P2. The body 874 includes a forward edge 875a and a rearward edge 875b opposed to the forward edge 875a. The body 874 defines a curved distal edge 878. As illustrated, the curved distal edge 878 includes a surface that is curved with respect to the axis 71 as it extends from the forward edge 875a to the rearward edge 875b. The curved distal edge 878 is configured to selectively engage the stop member 44a depending on the rotational position of the rotatable member 870 about pivot axis P1 and the position of the arm member 42.

As illustrated, the curved distal edge 878 progressively restricts the range of rotation (or motion) which the arm member 42 can move relative to the frame 14. For instance, when the rotatable member 870 is in a first orientation 879a, the rotatable member 870 permits the arm member 42 to move through a first range of rotation that is equivalent to full range of movement of the arm member 42 and wheel axis A1 relative to the frame 14. As shown in FIG. 15A, the distal contact edge 878 is disengaged from the arm member 42 when the rotatable member 870 is in the first orientation 879a.

As shown in FIG. 15B, when the rotatable member 870 is in a second rotational orientation 879b that is slightly offset in a rotational direction (e.g. clockwise in FIGS. 3A-4D) with respect to the first rotational orientation 879a, the distal contact surface 878 is advanced forward to engage the stop member 44a when the arm member 42 is in a select positioned that may or may not be the first position 40A as described above. In the second rotational orientation 879b, the rotatable member 870 permits the arm member 42 to move through a second range of rotation that is less than the first range of rotation. As shown in FIG. 15C, when the rotatable member 870 is in a third rotational orientation 879c that is further offset clockwise with respect to the second rotational orientation 897b, the rotatable member 870 permits the arm member 42 to move through a third range of rotation that is less than the second range of rotation. In the third orientation, the distal contact surface 878 is further advance so that the portion of the contact surface rearward of the axis 71 abuts the stop member 44a. As shown comparing FIGS. 15A and 15B, the orientation of the rotatable member can limit the ability of the arm assembly to ascend an obstacles of difference elevations. The actuator 88 and biasing member 80 can control orientation of the rotatable member 870. For instance, if the controller receives an instruction to raise the seat, a control signal is sent the actuator 88. In response the control signal, the actuator 88 urges the rotatable member 870 into a desired orientation.

Figure 16A:
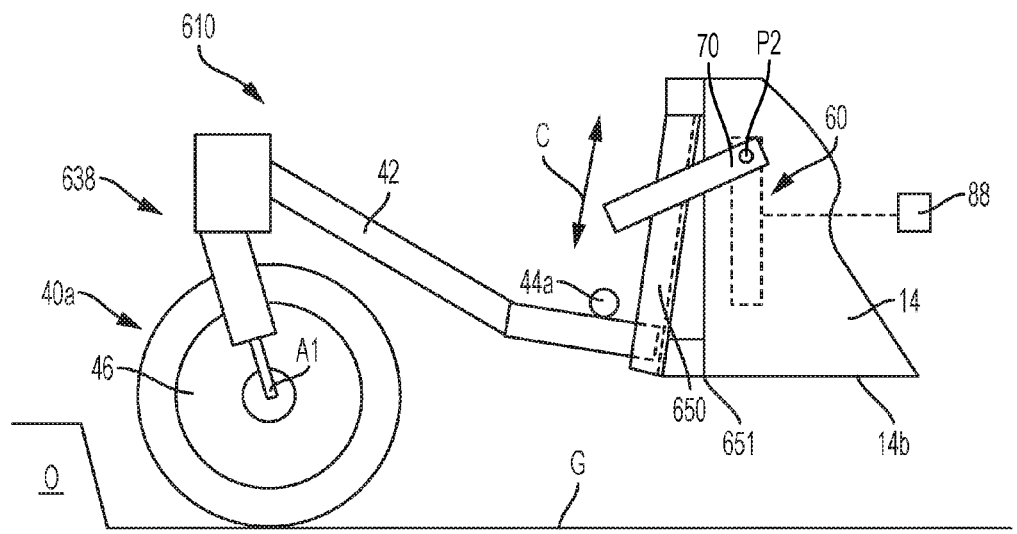
FIG. 16A is a schematic side elevation view of a portion of a powered wheelchair according to another embodiment of an aspect of the present disclosure, illustrating the arm limiter in the locked configuration.
Figure 16B:
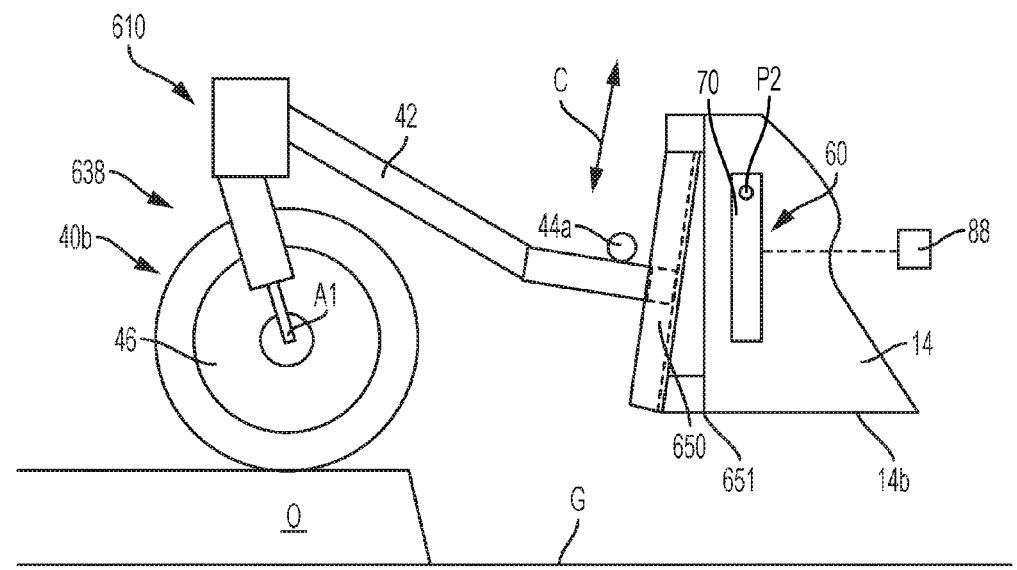
FIG. 16B is a side elevation view a portion of the powered wheelchair shown in FIG. 15A, illustrating the arm assembly translated upwardly as the powered wheelchair ascends an obstacle.

Turning to FIGS. 16A and 16B, an alternative embodiments of a powered wheelchair 610, the arm assembly 638 can be configured such that the arm member 42 and wheel axis A1 is translatable from the first position 40A to the second position 40b. In the embodiment shown in FIGS. 16A and 16B, powered wheelchair 610 is configured similar to the powered wheelchair 10 described above and illustrated in FIGS. 1-5. Accordingly, the description below regarding wheelchair 610 will use similar reference numerals to identify elements common to wheelchair 10 and wheelchair 610, such as the frame 14, drive wheels 32 (not shown), lift mechanism 18 (not shown), seat 22, arm limiter assembly 60, control system 90 and sensors. In the alternate embodiment, the powered wheelchair 610 includes a pair of forward arm assemblies 638 moveably coupled to a track 650 that extends forwardly from the frame 14. The track 650 receives the proximal end 43p (shown in dashed lines in FIGS. 16A and 16B) of the arm member 42. As illustrated, the proximal end 43p is slidable within the track 650 via a bearing or roller mechanism (not shown) so that arm member 42 and wheel 46 are translatable along the track 650 upwardly or downwardly relative to the frame 14 in a linear direction C. The linear direction C can extend along the vertical direction V or may be angularly offset (as illustrated) with respect the vertical direction V. Accordingly, the arm assemblies 638 are coupled to the frame 14 such that the wheel 46 is translatable from between the first position 40A and the second position 40A depending on the obstacle the wheel 46 is traversing. As noted above, operation of the arm assembly 638 is similar to operation of the arm assembly as the 008 patent noted above. The disclosure of the 008 Patent is incorporated by reference herein for all purposes.

Continuing with FIGS. 16A and 16B, in alternative embodiments when the arm limiter assembly 60 is in the disengaged or open configuration the arm member 42 is translatable from the first position 40A through a first range of motion. When the arm limiter assembly 60 is in the engaged or locked configuration, the arm member 42 is translatable through a second range of motion that is less than the first range of motion. While arm member 42 is translatable along the linear direction C, the positional difference of the wheel 46 in the first and second positions 40A and 40b can have an angular component. The first position 40A in FIG. 16A can be defined by first reference and second lines (not shown) that intersect the front wheel axis A1 and a forward-most point (651) located on the bottom 14b of the frame 14. When the arm assembly 638 translates the wheel 46 from the first position 40A to the second position 40b, the second reference line defines an angle α1 (not shown) with the first reference line (not shown). Accordingly, the range of motion as described with respect to wheelchair 10 can correspond to range of rotation described with respect to the wheelchair 10.

FIGS. 17-43 illustrate alternative embodiments of the wheelchair configured to selectively engage the anti-tip arms based on the position of the anti-tip arm assemblies, position and/or configuration of the arm limiter assemblies and seat position, such as raised, lowered, titled, etc. In the embodiments illustrated in FIGS. 17-43, arm limiter assemblies an transition between the locked configurations where the movement of the anti-tip arm is limited, and an open configuration where operation of the anti-tip arm assembly is not inhibited. Further, embodiments described below use downward forces of the seat moving into a lowered position to urge arm limiter assemblies into specific configurations, such as an open configuration.

Figure 17:
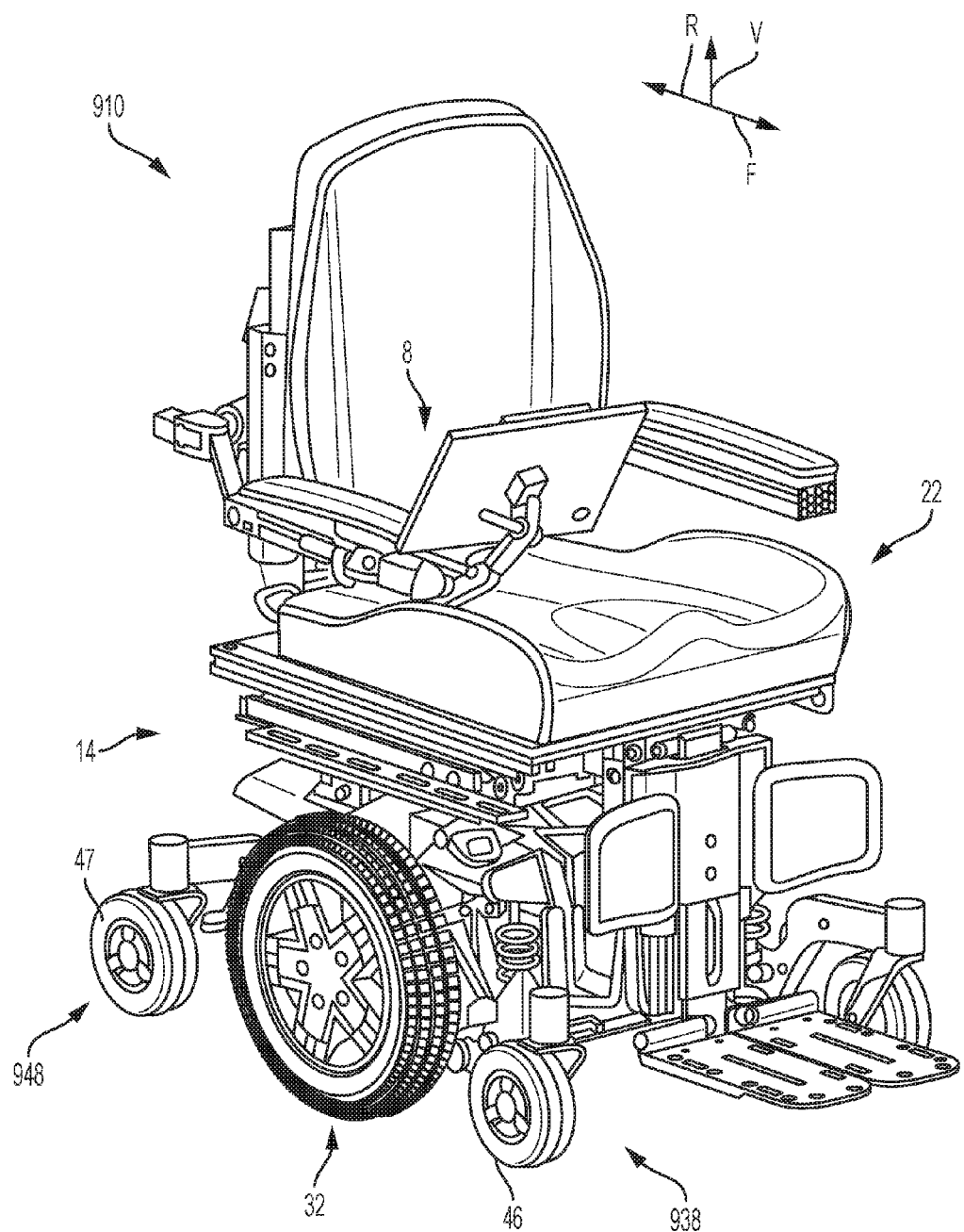
FIG. 17 is a top perspective view of a powered wheelchair in accordance with an embodiment of the present disclosure.
Figure 18A:
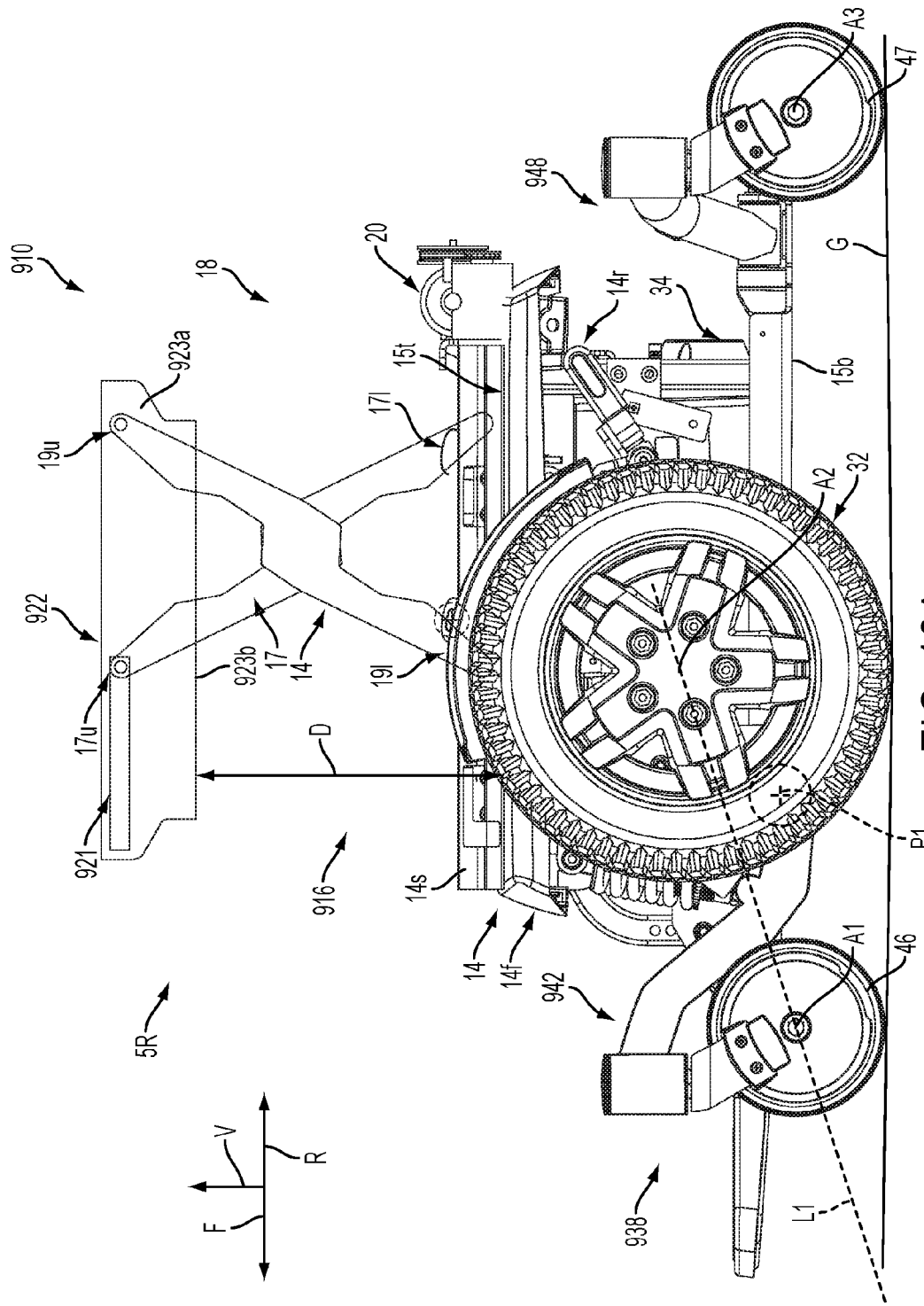
FIG. 18A is a side elevation view of the powered wheelchair shown in FIG. 17, illustrating a seat in a raised position.
Figure 18B:
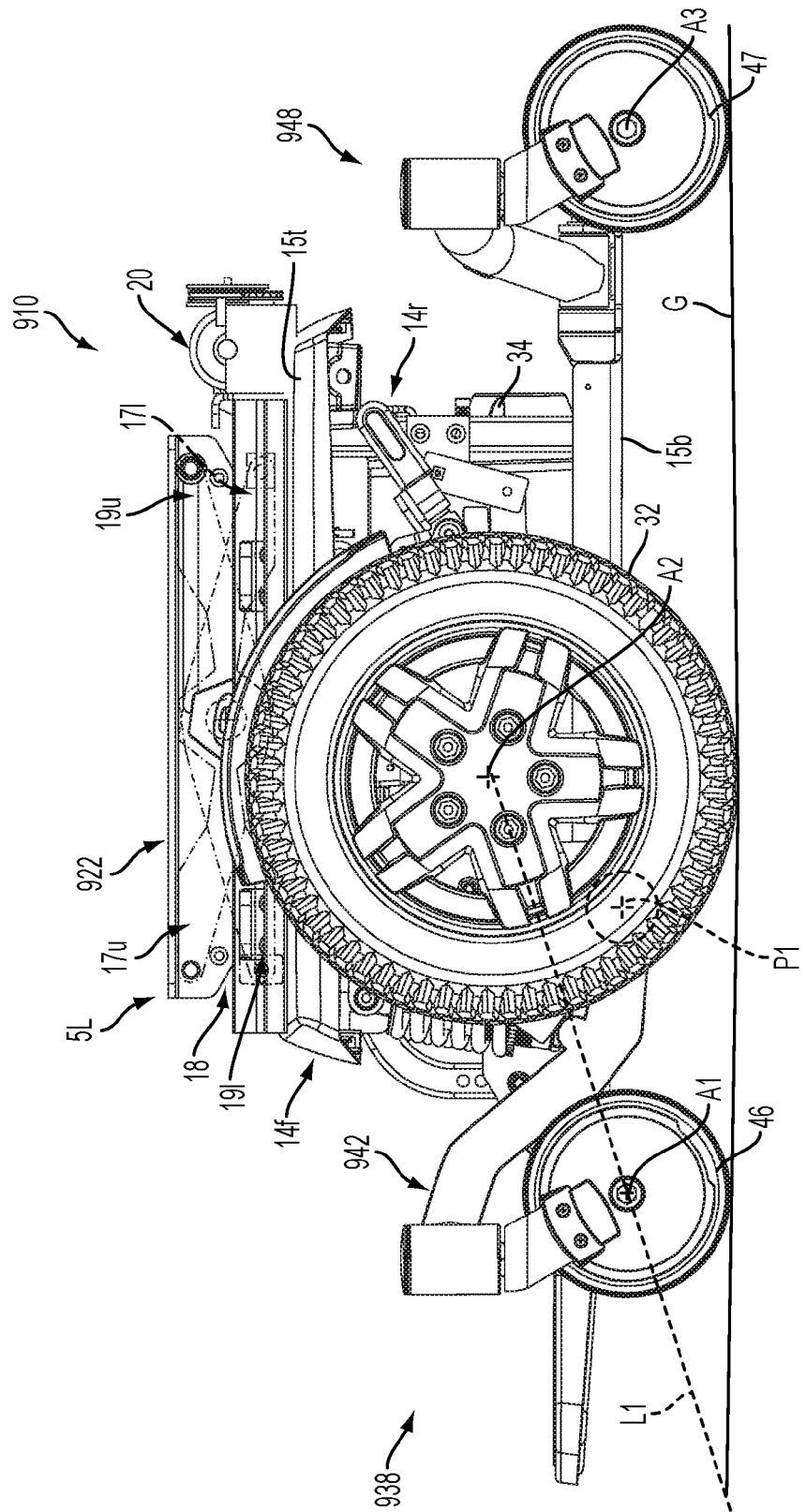
FIG. 18B is a side elevation view of the powered wheelchair shown in FIG. 18A, showing the seat in a lowered position.

Turning to FIGS. 17-18B, a powered wheelchair 910 according to another embodiment of the present disclosure is similar to the powered wheelchair 10 described above and illustrated in FIGS. 1-5. Accordingly, the description below regarding wheelchair 910 will use similar reference numerals to identify elements common to wheelchair 10 and wheelchair 910, such as the frame 14, drive wheels 32, control system 90 and sensors, input device 8, and lift mechanism 18.

Figure 20:
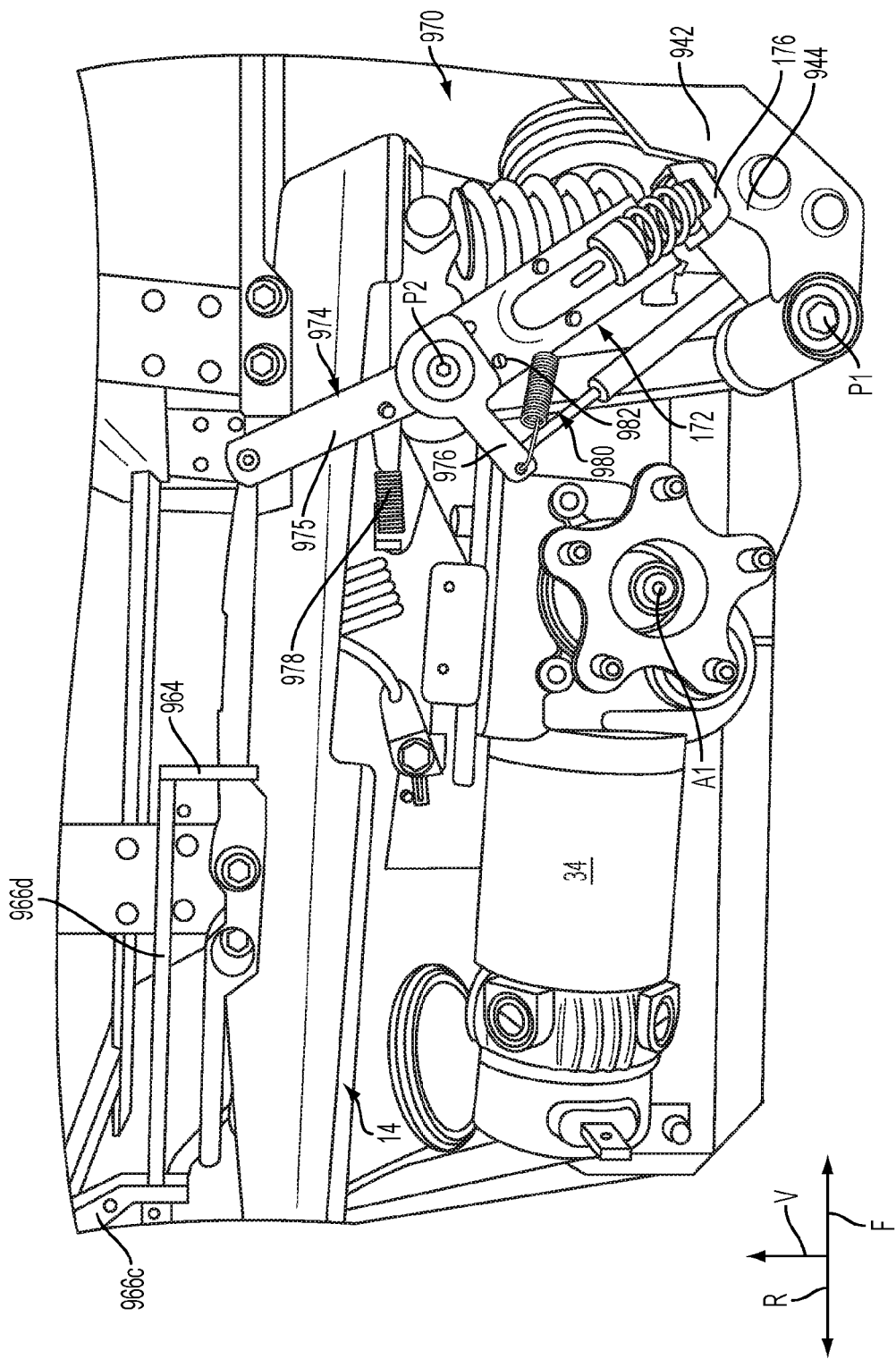
FIG. 20 is a partial side perspective view of the powered wheelchair shown in FIG. 3, showing the linkage assembly retracted and the arm limiter assembly in a locking configuration.
Figure 21:
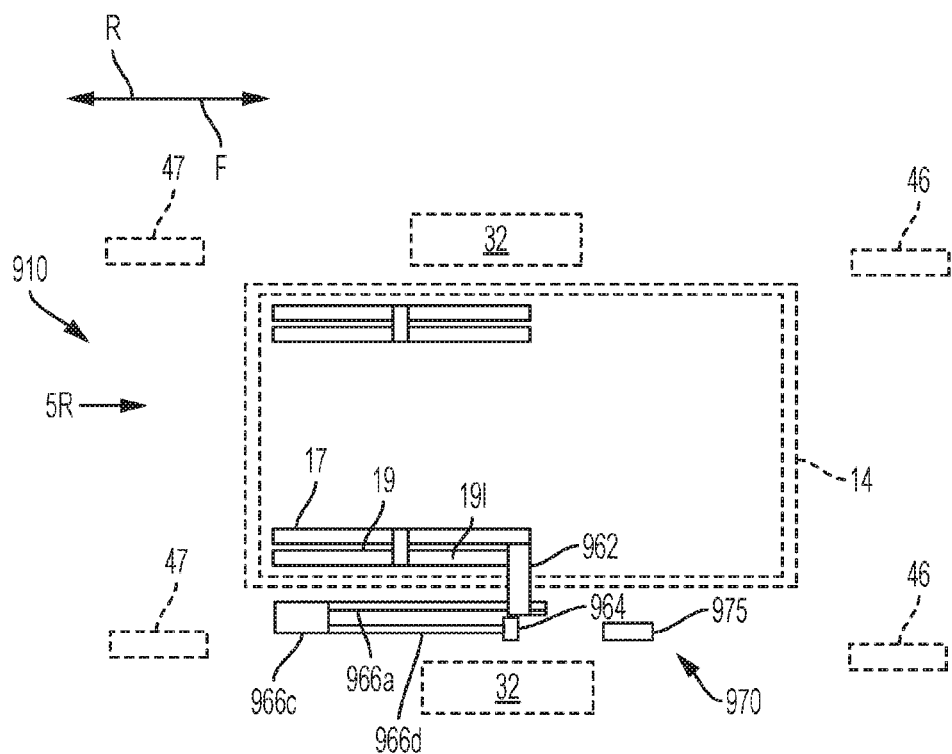
FIGS. 21 and 22 are schematic top views of the powered wheelchair illustrated in FIGS. 17-20 with the seat removed and illustrating the linkage assembly causing transition of the arm limiter assembly from the locked configuration into the open configuration, respectively.

With reference to FIGS. 19 and 20, in some embodiments powered wheel chair 910 also includes a linkage assembly 950 operably coupled to the lift mechanism 18 and to one or more arm limiter assemblies 970. The arm limiter assemblies 970, also referred to as limiters, are coupled to the frame 14 and configured to selectively engage the anti-tip assemblies 938 so as to inhibit relative motion between wheels 946 of the anti-tip assemblies 938 and the frame 14 in certain modes of operation. Each arm limiter assembly 970 may include a crank 974, and elongate member 972, a stop 982 and resilient members 978 and 980. Inhibiting relative motion between wheel 46 of the anti-tip assemblies 938 and the frame 14 can limit certain operations of the wheelchair 10 in order to improve stability and occupant safety as described above. Additionally or alternatively, operation of the limiter assembly 970 may be limited, impaired or delayed when the wheelchair 910 is in certain conditions. For example, the limiter assembly 970 may be configured to transition between the disengaged configuration and the engaged or locking configuration based on a first position or spatial location of the wheel 46 (or 47), and may be prevented from transitioning from the disengaged position to the locking configuration when the wheel 46 is a second position or spatial location that is different than the first spatial location or position be predetermined amount. Further, operation of the limiter assembly 970 may be dependent upon or linked to the position of the seat (e.g., the position of the seat relative to the frame 14 or a ground surface upon which the wheelchair is sitting). In some embodiments, the limiter assembly 970 is configured to automatically restrict movement of the arm member 942 and wheel axis A1 when the seat is in a raised position. For example, a rod assembly and/or cable assembly may operably the arm limiter assembly 970 to the seat 22. The arm limiter assembly 970 and linkage assembly 950 will be further described below.

Turning to FIGS. 18A-18B, the wheelchair frame 14 supports the drive wheels 32, anti-tip assemblies 938, rear assemblies 948, the lift mechanism 18 and seat 22. As illustrated, the frame 14 includes a front end 14f, a rear end 14r spaced from the front end 14f in rearward direction R, a bottom 15b, and a top 15t spaced from the bottom 15b in the vertical direction V. The frame 14 further supports one or more batteries 36a and 36b, the drive motors 34, and various control modules that are used to operate the powered wheelchair 10. The frame also supports, directly or indirectly, the arm limiter assemblies 970 described below.

The powered wheelchair 910, in some embodiments, includes a lift mechanism 18 with left and right scissor assemblies 916 according to another embodiment. The scissor assembly 916 is similar to the scissor assembly 16 described above. For example, the scissor assembly 916 is operatively connected to frame 14, a lift motor 20, and a lift control system that can be used to boost lifting force and lift rate. Like scissor assembly 16, the scissor assembly 916 illustrated in FIGS. 18A-18B includes first and second scissor bars 17 and 19 that extend between the seat 22 and the frame 14 and are rotatably coupled to each other. The first scissor bar 17 has an upper end 17u moveably coupled to the seat 922 and a lower end 17l that is rotatably fixed to a support rack 14s that is attached to or forms a monolithic extension of the top 15t of the frame 14. As illustrated, the upper end 17u extends partly into an elongate slot 921 defined in the seat frame 923a a generally forward location along the seat frame 923a (as compared to seat frame 23a in FIG. 2A). The slot 921 accommodates forward-rearward movement of the upper end 17u as the scissor assembly collapses and the seat 922 is lowered. The second scissor bar 19 includes an upper end 19u that is rotatably fixed to the seat 922. The lower end 19l of the scissor bar 19 is moveably coupled to the frame 14 via the support rack 14s so as to move along the support rack 14s in a similar manner as 17u moves along the slot 921. As described above with respect the wheelchair 10, the motor 20 causes the lower end 19l to translate along the frame 14 as the upper end 17u of the second scissor bar 17 translates along the elongated slot 921, which lowers the seat 22 toward the frame 14. The seat 922 includes a base (not shown) situated in the seat frame 923a and a seat back (not shown). The seat frame 923a defines a seat bottom 923b that faces the top 15t of frame 14 and is spaced apart a distance D from the top 15t. As noted above, the lift mechanism is not limited to scissor type mechanisms or the use of screw-type actuators as described above.

Figure 8A:
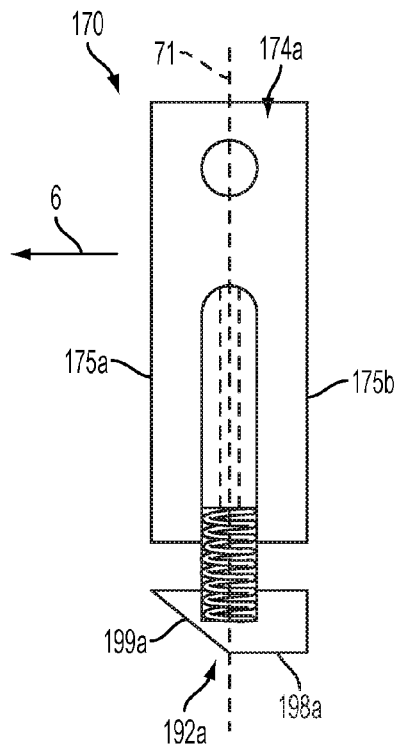
FIGS. 8A-8D are sides views of rotatable members according to alternative embodiments of aspects of the present disclosure.
Figure 8B:
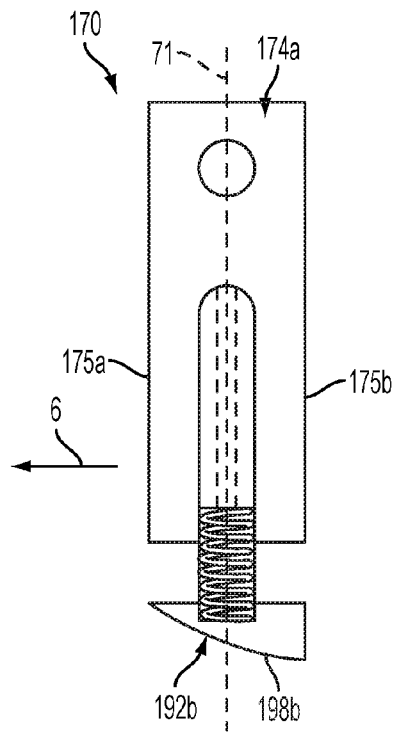
Figure 8C:
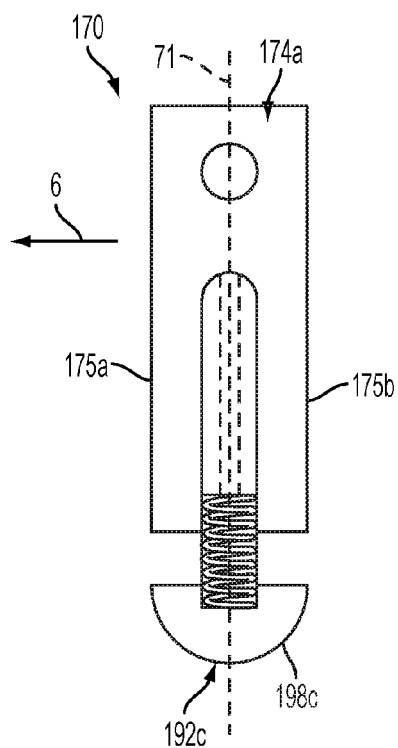
Figure 8D:
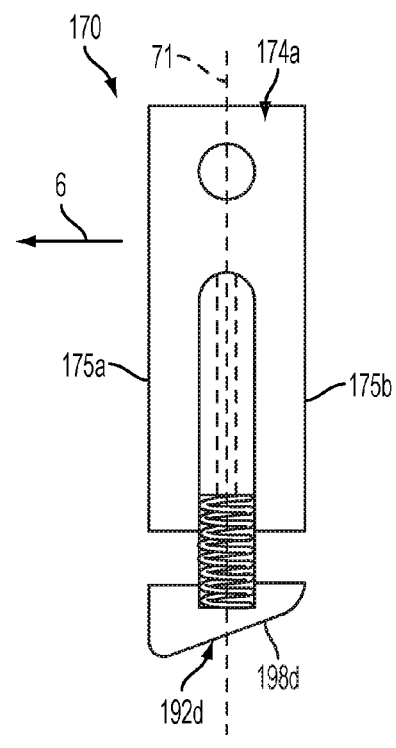
Figure 18D:
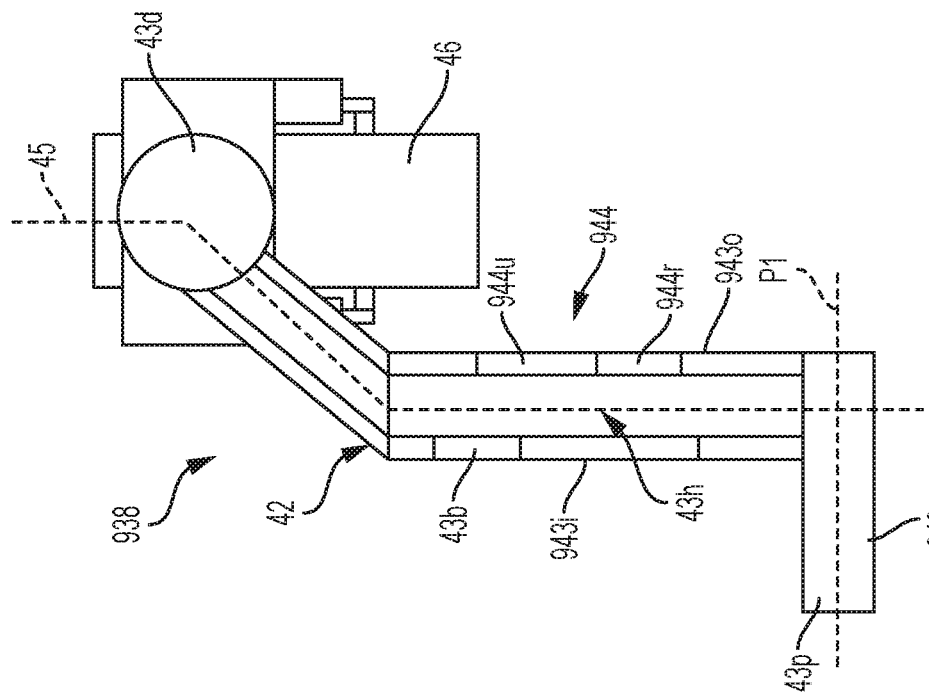
FIGS. 18C and 18D are schematic side and top views of an anti-tip arm of the wheelchair illustrated in FIGS. 17-18B.
Figure 18C:
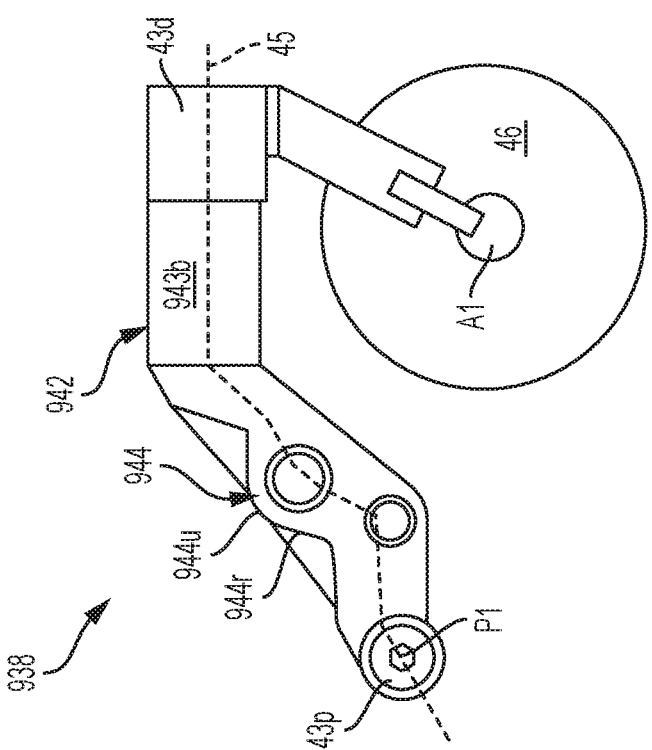
Figure 23:
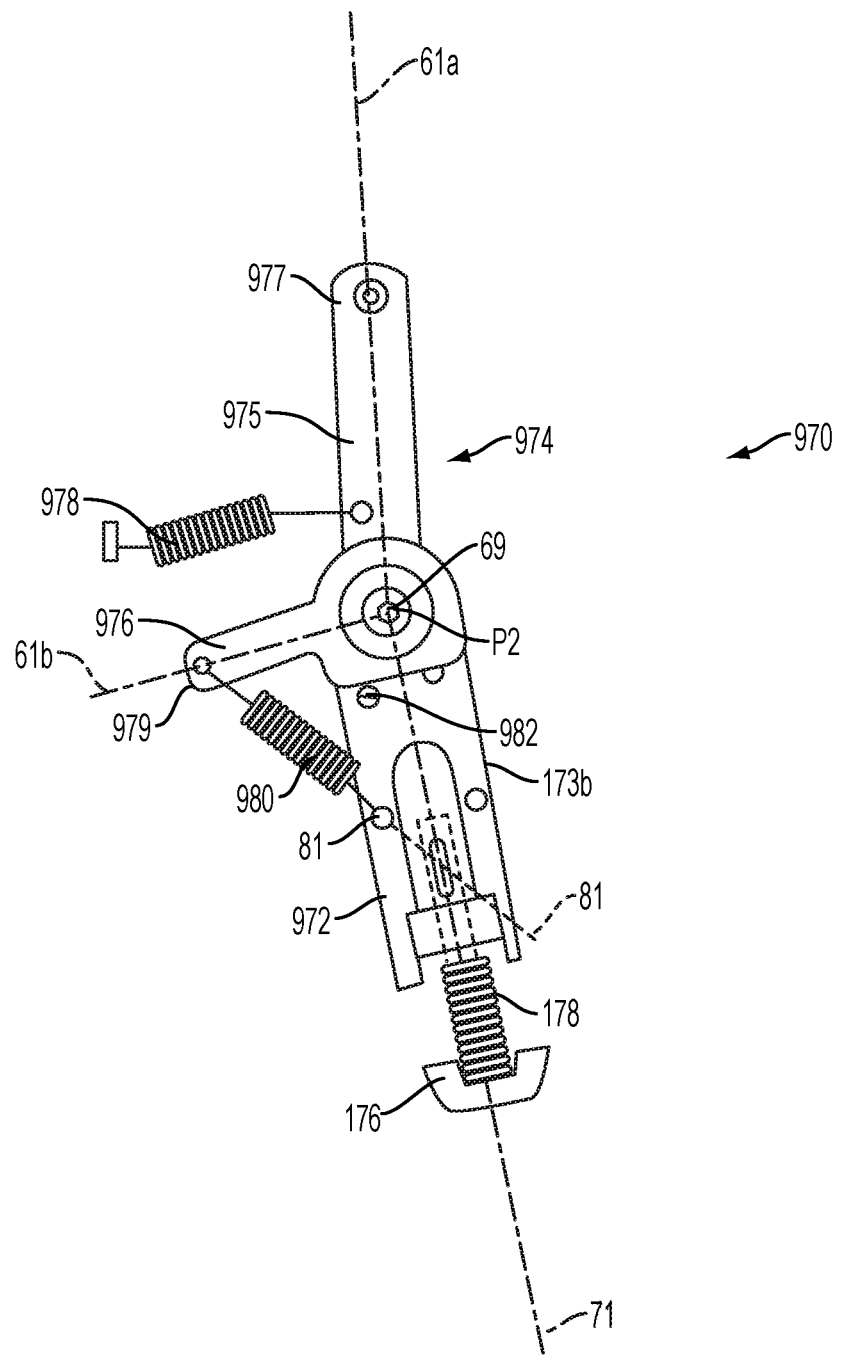
FIG. 23 is a side view of the crank of the arm limiter assembly illustrated in FIGS. 17-20.

The powered wheelchair 910 includes at least one and generally a pair of anti-tip arm assemblies 938 according to an alternative embodiment and is illustrated in some detail in FIGS. 18C and 8D. FIG. 23 illustrates a side view of the anti-tip arm assembly 938. The anti-tip arm assembly 938, sometimes referred to as an arm assembly, includes an arm member 942 coupled to the frame 14, a front wheel 46 coupled to a distal end 43d of arm member 942, and at least one stop member 944 positioned along an upper side of the arm member 942. As will other embodiments of the stop member, such as stop member 44a, the stop member 944 illustrated in FIGS. 18C and 18D engages with the arm limiter assembly 970 based on the positions of assembly 970 and arm assembly 938 during operation of the wheelchair 910. The anti-tip arm assembly 938 is coupled to the frame 14 so as to permit upward (or downward) movement of the wheel 46 along both the vertical direction V and the forward-rearward direction F-R when the wheel 946 encounters an obstacle.

Continuing with FIGS. 18C and 18D, the arm member 942 can be configured similar to the arm member 42 described above. For ease of illustration, features common to arm member 42 and 942 will use similar reference signs. In the illustrated embodiment, the arm member 942 has a proximal end 43p and a distal end 43d spaced from the proximal end 43p along an axis 45. The arm member 942 further includes an inner side plate 943i, an outer side plate 943o, and a plate 943h extending from the side plate 943i to the side plate 943o. The plates 943i, 943o, and 943h define a channel. The side plates 943i and 943o are connected to a proximal housing 43m. The inner side plate 943i has an upper side or surface that is contoured or stepped to selective engage the arm limiter assembly 970. The outward side plate 943o includes the stop member 944, configured as contoured stop surface. The illustrated arm member 942 with pair of side plates 943i and 943o is exemplary only. The front wheel 46 is coupled to the distal end 43d of the arm member 942 and may be rotatable about the front wheel axis A1. As illustrated, for example in FIG. 18A, when the wheel chair is on level ground, the front wheel 46 is generally in contact with ground or surface G during normal operation. It should be appreciated that the front wheel 46 can be an anti-tip wheel that is raised or otherwise spaced from the ground or surface G during normal operation in a configuration that does not include a caster. Further, the wheelchair 910 can be considered a "low pivot" axis wheelchair, such as that disclosed the 992 Patent and incorporated by reference into this disclosure. However, the wheelchair 910 is not required to be a low-pivot axis wheelchair.

Turning to FIGS. 18A and 18B, the arm assembly 938 is moveably coupled to the frame 14 such that the spatial location of the arm member 42 and wheel axis A1 is repositionable relative to the frame 14 upon encountering an obstacle. In the embodiment illustrated, the arm assembly 938 is pivotably coupled to the frame 14 such that wheel 46 pivots about a pivot axis P1. Pivotable coupling of the arm member 942 to frame 14 is exemplary only. The arm member 942 can be coupled to frame 14 in other ways in order to permit translation of the wheel 46 upward (or downward) relative to frame 14 as described above. For example, arm member 942 can be coupled to the frame 14 such that the wheel 46 translates relative to the frame 14 along a linear direction that is aligned with or angularly offset with respect to the vertical direction V and forward-rearward direction F-R.

Figure 24:
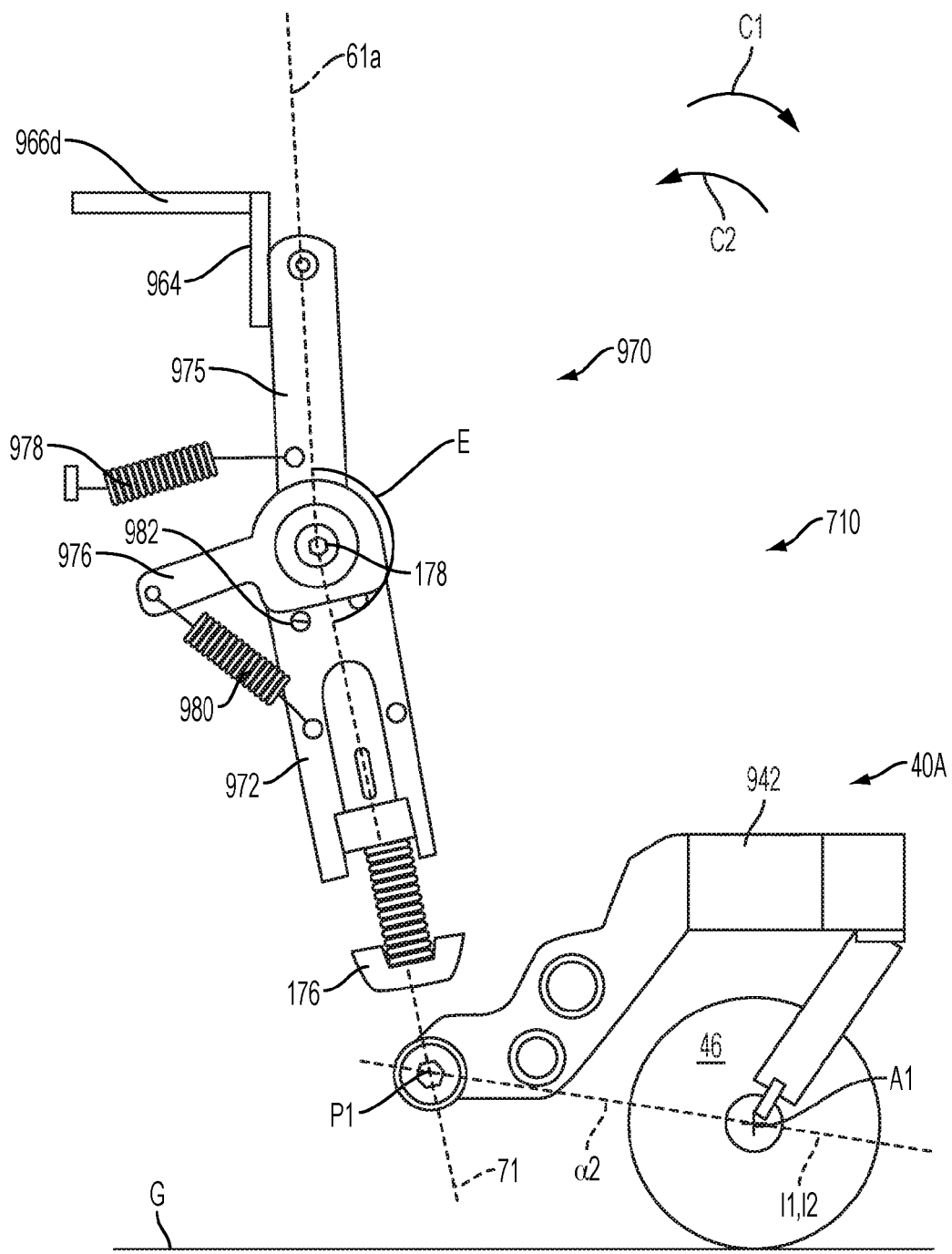
FIG. 24 is a side schematic view a portion of the powered wheelchair shown in FIG. 17, illustrating an open configuration of the arm limiter assembly and the linkage assembly when the seat is in a lowered position and the wheelchair is operating on flat, level ground.

As shown FIGS. 18A, 18B and 24, the arm assembly 938 is coupled to frame 14 such that the arm member 942 (or wheel 46) is pivotable about the axis P1 along a rotational direction C1-C2 through a predetermined range of rotation or motion. As shown in FIG. 24, the arm assembly 38 is configured so that arm assembly 938 and wheel axis A1 are repositionable from the first position 40A relative to the frame 14 when the wheelchair is operating on flat, level ground, to a second position 40B (FIGS. 27 and 28) that is different that the first position 40A along the vertical direction V and forward-rearward direction F-R, as described in detail above. When the wheelchair 10 encounters an obstacle O (FIG. 27), the arm member 942 pivots upwardly about axis P1 in a first rotational direction C2 and when the front wheel 46 encounters a descent, the arm member 942 pivots downwardly about the axis P1 in a second rotational direction C1. When viewing FIGS. 24 and 27, the first rotational direction C2 is counterclockwise and the second rotational direction C1 is clockwise. The extent that the arm member 942 pivots or is allowed to pivot about the pivot axis P1 is referred to herein as the range of rotation as described above.

Each arm assembly 938 has a range of rotation or motion that is the extent the arm member 942 is capable of repositioning the wheel 46 when encountering an obstacle. The first range of motion is typically the full extent the arm member 942 can move relative to the frame 14. The second range of motion is the extent the arm member 942 can move relative the frame 14 when inhibited or prevented from moving by the arm limiter assembly 970. The lines I1 and I2 illustrated in FIGS. 24 and 27 define an angle α2 that is about zero (0) degrees when the arm assembly 38 is in the first position 40A. The second range of rotation of the arm member 942 is generally defined and constrained to be less than the first range of rotation.

Continuing with FIGS. 18C and 18D and as described above, the arm member 942 includes at least one stop member 944. The stop member 944 is located on the outer side 943*i* or is part of the arm member 942 so as to selectively engage the arm limiter assembly 970, as further detailed below. The stop member 944 includes a first or upper engagement surface 944*u* on a portion of the outer side of the arm member 942. The upper engagement surface 944*u* faces upwardly opposite the ground surface G when the arm member 942 is in the first position 40A (FIG. 24). The stop member 944 also includes a second or rear surface 944*r* on a rearward side of stop member 944 located on the outer side 943*i*. The rear surface 944*r* faces the rearward direction R toward the pivot P1 when the arm member 942 is in the first position 40A (FIG. 24). The stop member 944 is shown as part of a curved or contoured surface of the arm member 942. In other embodiments, the surface need not be curved or contoured but may be generally flat with protrusions that define positions with which the arm limiter engages with the anti-tip arm, as described. Further, the stop member 944 can be a projection or part attached to one or both sides 943*i* and 943*o* of the arm member 942.

Figure 25:
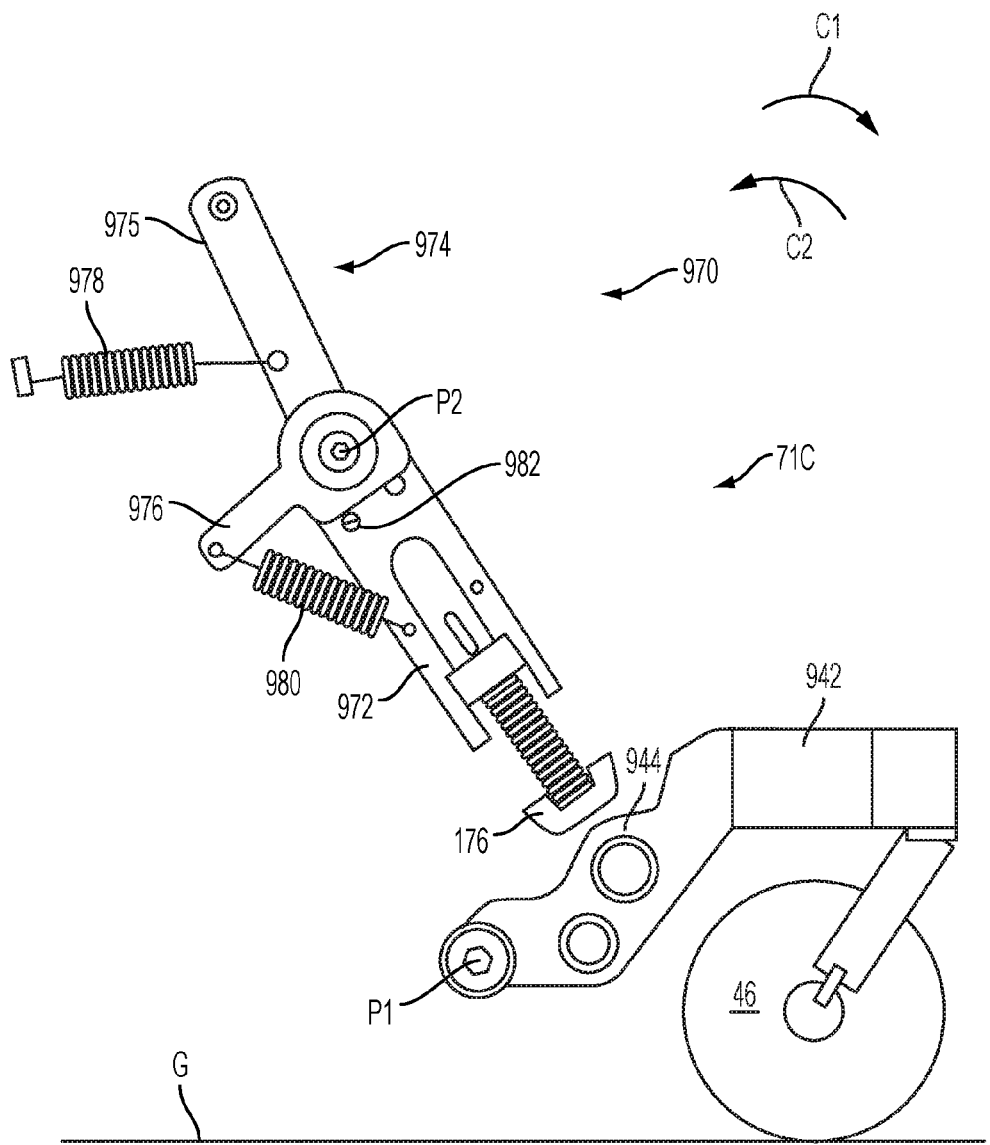
FIG. 25 is a schematic side view of the portion of the powered wheelchair shown in FIG. 24, illustrating the locking configuration of the arm limiter assembly when the seat is in a raised position and the wheelchair is operating on flat, level ground.
Figure 26:
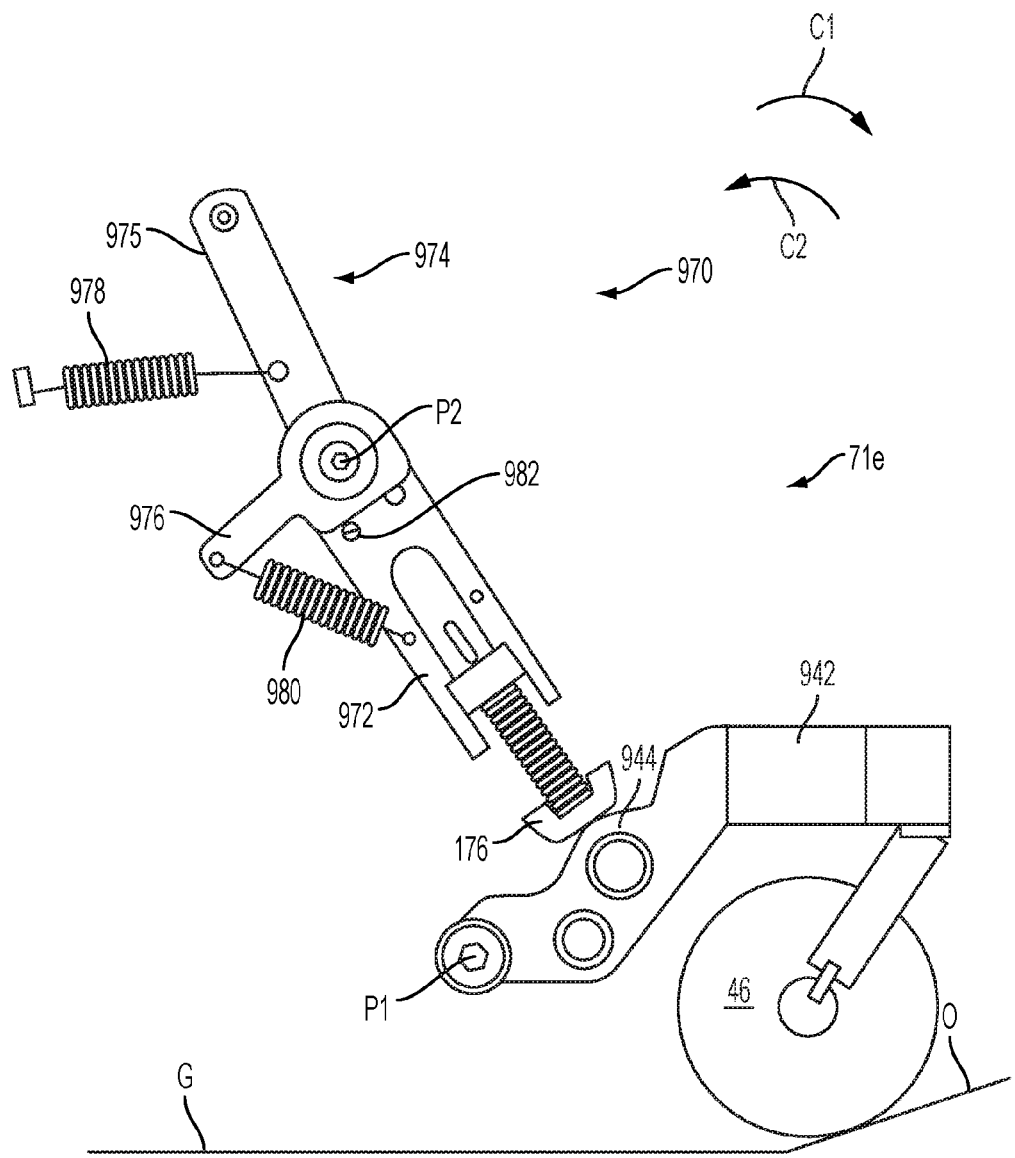
FIG. 26 is a schematic side view of the portion of the powered wheelchair shown in FIG. 24, illustrating the locking configuration when the seat is in a raised position when the seat is in a raised position and the wheelchair is encountering an obstacle.

The arm limiter assembly 970 illustrated in configured to transition between an open configuration and a locking configuration depending on the elevation of the seat. Turning to FIGS. 19, 20, and 24-26, the arm limiter assembly 970 has a first or open or disengaged configuration as shown FIGS. 19 and 24, in which the arm member 942 and wheel axis A1 are movable from the first position 40A to a second position 40B through the first range of motion. The second or engaged or locked configuration as shown in FIGS. 20 and 25-26, in which the arm member 942 is moveable through the second range of motion that is smaller than the first range of rotation. In the particular examples illustrated, when the arm limiter assembly 970 is in the locked configuration, the arm member 942 can only rotate about its pivot axis P1 through a smaller range of rotation before it contacts, and is stopped, by the arm limiter assembly 970. Because of small obstacles or uneven surfaces, it may be desirable in some embodiments to allow the limiter assembly 970 to move to the engaged configuration even when the arm member 942 is slightly raised. The arm limiter assembly 970 may be shorter than the distance provided for the arm limiter assembly 970 when the wheelchair is on a flat level ground surface. In one exemplary embodiment, the arm limiter assembly 970 is prevented from transitioning into the second configuration when the position of the wheel 46 is different from the first position 40A relative to the frame 14 by more than four (4) degrees, for instance. In one embodiment, limiter assembly 970 is prevented from transitioning into the second configuration when the position of the arm member 942 and wheel axis A1 is different from the first position 40A relative to the frame 14 by more than one degree. In one embodiment, limiter assembly 970 is prevented from transitioning into the second configuration when the position of the arm member 942 and wheel axis A1 is different from the first position 40A relative to the frame 14 by more than two degrees. In one embodiment, limiter assembly 970 is prevented from transitioning into the second configuration when the position of the arm member 942 and wheel axis A1 is different from the first position 40A relative to the frame 14 by more than three degrees. In other exemplary embodiments, the arm limiter assembly 970 is inhibited from transitioning into the second configuration when the position of the arm assembly is rotationally different from the first position 40A relative to the frame 14 by less than four (4) degrees.

Referring to FIGS. 7, 19, 20, and 23, the arm limiter assembly 970 includes a crank 974 and an elongate member 972, both of which are rotatably coupled to the frame 14 at a rotation point 69 (also designated as pivot axis P2). The elongate member 972 is similar to the rotatable member 170 described above and shown in FIG. 7. Similar reference signs will be refer to features common to elongate member 972 and elongate member 972. The arm limiter assembly 970 also includes a first resilient member 978 that couples the crank 974 to the frame 14 and a second resilient member 980 attached between the crank 974 and the elongate lever 972. Each component of the arm limiter assembly 970 will described next. As shown in FIG. 24 a portion of the crank 94 is elongate along an axis 61*a* and the elongate member 972 is elongate along an axis 71. In the illustrated embodiment, the axes 61*a* and 71 intersect at a rotation point 69, which can define the pivot axis P2. The axis 61*a* and axis 71 can define angle E with represents a relative position of the crank 974 and elongate member 972 as the arm limiter transitions between the open and locked configurations, as will be further detailed below.

The crank 974 is configured to engage linkage assembly 950 and rotate about pivot axis P2 in response to that engagement. Referring to FIG. 23, the crank 974 includes a first leg 975 and a second leg 976 fixed to the leg 975 so that both legs 975 and 976 rotate together about pivot axis P2. In this case, legs 975 and 976 can be formed as a monolithic piece and is exemplary only. The first and second legs can be separate legs coupled to each other in any manner so the legs 975 and 976 rotate together. As illustrated, the first and second legs 975 and 976 are elongate along respective leg axes 61*a* and 61*b*. The first leg 975 has a free end 77 opposite to the rotation point 69 along the axis 61*a*. The first leg 975, in particular free end 77, is configured to be engaged by the contact head 964 of the linkage assembly 950 as will be further detailed below. The second leg 976 includes a free end 979 opposite the rotation point 69 along the axis 61*b*.

Continuing with reference to FIGS. 7 and 23, the elongate member 972 is configured to selectively contact the arm member 942. The elongate member 972 includes a body 173*b* (FIG. 7), a mechanical stop 982 (FIG. 23), a translating member 176 moveably coupled to the body 173*b*, and a biasing member 178 disposed between the translating member 176 and the body 173*b*. As illustrated, the translating member 176 is moveable along the axis 71 in response to upward movements of the arm member 942. The biasing member 178 is illustrated as a spring 170*c* as noted above. The elongate lever body 173*b* has a proximal end 174*a*, a forward side 175*a*, and a rearward side 175*b* opposed to the forward side 175*a*. The proximal end 174*a* of body 173*b* is coupled to the frame 14 at the connection point 69. A lower end the crank 974 overlies a proximal end 177*a* of the body 173*b*.

The elongate lever 972 carries the mechanical stop 982. The mechanical stop 982 can be positioned along the body 173*b* proximate the rotation point 69 to restrict the extent of relative rotation of the elongate lever 972 to the crank 974. The stop member 982 protrudes from lever 972 and is positioned to abut a lower end (not numbered) of the crank 974. As illustrated, the stop 982 is disposed toward the forward side 175*a* (FIG. 7) and spaced from axis 71 of body 173*b*. The stop 982 limits rotation of the elongate lever 972 relative to the crank 974 in the rotational direction C1 when the stop 982 abuts the crank 974. Further, the stop 982 along with second resilient member 980 causes the elongate lever 972 to rotate with the crank 974 about pivot axis P2 in the rotational direction C1 in response to forces applied to crank leg 975. The stop member 982 can be a projection, pin, bolt, or any device that can restrict rotation of the lever 972 relative to crank 974. When the linkage assembly 950 engages crank leg 975, rotation of crank 974 in rotation direction C1 causes rotation of the lever 972 in rotational direction C1.

As noted above, the arm limiter assembly 970 includes first and second resilient members 978 and 980, configured as springs, that can maintain the relative positions of the crank 974 and elongate lever 972 during operation of the wheelchair, such as when the seat changes elevation. As shown in FIG. 24, the first resilient member 978 connects the first crank leg 975 to the frame 14, placing a biasing force on the crank 974 and elongate lever 972 in rotational direction C2. The first resilient member 978 is attached to the first leg 975 at a location between the rotation point 69 and free end 977. While the attachment location is proximate the rotation point 69, the specific location where resilient member 978 is attached to the leg 975 can be adjusted to modify the biasing characteristics of the arm limiter assembly 970. For instance, attaching the spring 978 closer toward the free end 977 may permit a smaller sized, or less stiff spring to be used at that location. Attaching the resilient member 798 closer toward the rotation point may permit a larger sized and stiffer spring to be used.

The second resilient member 980 attaches to the crank leg 976 to elongate lever 972. As illustrated, the second resilient member 980 is attached to leg 976 at a first attachment point (not numbered) and to the elongate lever 972 at a second attachment point (not numbered). The first and second attachment points are aligned along an axis 81 (FIG. 23) that intersects the axis 71 of the elongate lever 972. The second resilient member 80 biases the lever 972 toward the leg 976 at least partly along the axis 81, urging the mechanical stop 982 into abutting relation against the crank 974 when the arm limiter assembly 970 is rotating in rotational direction B2.

In the illustrated embodiment, preferably the first resilient member 978 applies a first biasing force between the frame 14 and crank 974 and the second resilient member 980 applies a second biasing force between the leg 976 and elongate lever 972 that is greater than the first biasing force. The magnitude of the second biasing force relative to the first biasing force maintains the relative positions of the crank 974 and elongate lever 972 as the crank 974 and elongate lever 972 rotate along the rotational direction C1 about pivot axis P2. More specifically, the second resilient member 80 urges the stop member 982 against the crank 974 so that the crank 974 and elongate lever 972 rotate together along rotational direction C1.

Figure 22:
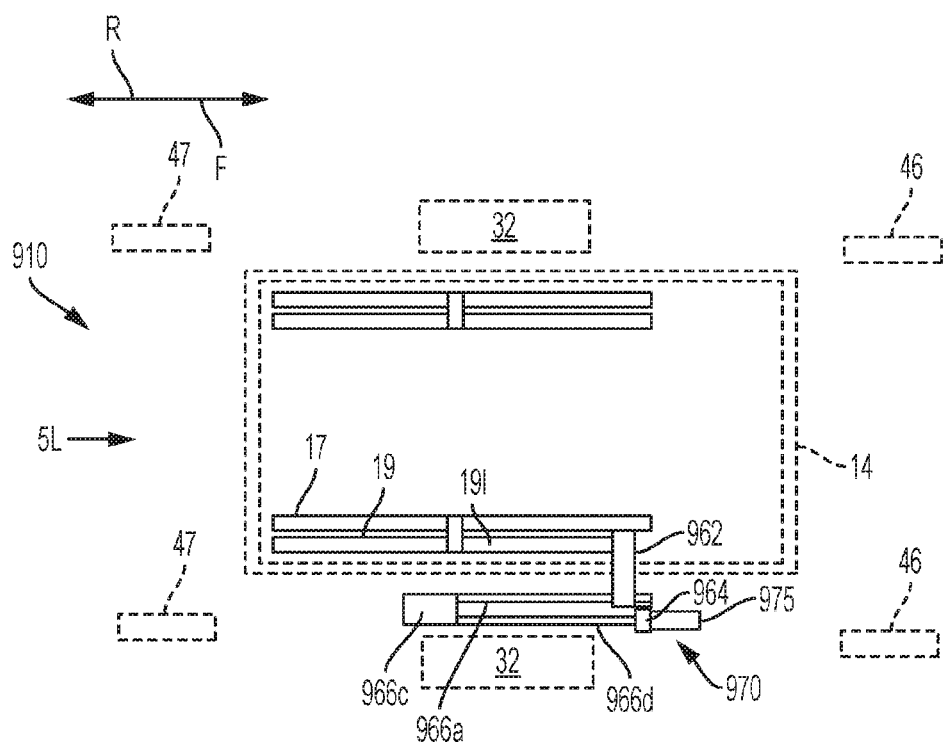

Turning to FIGS. 19-22, the wheelchair 910 can further include a linkage assembly 950 that causes the arm limiter assembly 970 to transition between the open and locked configurations dependent at least in part on the elevation of the seat 922. FIG. 19 illustrates the wheelchair with the seat and seat frame removed. FIGS. 22 and 23 are schematic plan views of the wheelchair 910 with the frame 14, drive wheels 32, front wheels 46, and rear wheels 47 shown in dashed lines to better illustrate operation of the linkage assembly 950. The wheelchair 10 can include at least one, such as a pair of linkage assemblies 950 associated with the pair of limiter assemblies 970. Only one linkage assembly 950 and arm limiter assembly 970 will be described and illustrated, it being understood that the companion assemblies on the other side of the wheelchair are the same.

The linkage assembly 950 includes an engagement member 962 coupled to the scissor or lift bar 19, a first or upper elongate rod 966*a* coupled to the engagement member 962, an extension plate 966*c*, and a second or lower elongate rod 966*d* that carries an engagement or contact head 94. The lower elongate rod 966*d* is connected to the extension plate 966*c* and terminates at the contact head 964. As illustrated, the upper and lower elongate rods 696*a* and 966*d* are substantially parallel to and extend substantially along a forward-rearward direction F-R. The linkage assembly 950 also includes track 966*b* (shown FIG. 3) attached to, or shaped within, frame 14 that receives elongate rod 966*a*. Upper rod 966*a* is slidable within the track 966*b*. As the lift mechanism 18 raises the seat, the lower end 191 of the scissor bar 19 moves in the rearward direction R toward the fixed end 17*l* of the scissor bar 17 so that the engagement member 62 is actuated to urge upper rod 966*a* rearward along the track 966*b*. The extension plate 966*c* pulls the lower elongate rod 966*d* in the rearward direction R pulling the contact head 964 out of engagement with the arm limiter assembly 970 (see FIG. 21).

Comparing FIG. 19 to FIG. 20, and FIG. 22 to FIG. 21, it is seen that actuation of the lift mechanism into the raised position causes rearward movement of the linkage assembly 950 so that the contact head 964 is no longer engaged with and forcing the top leg 975 of arm limiter assembly 970 in the first direction C1. Disengagement between contact head 964 and crank leg 975 permits the arm limiter assembly 970 to rotate in direction B2 (FIG. 19) about pivot axis P2 into the locked configuration through the action of spring 978. Conversely, as the seat is lowered (FIGS. 19 and 22), the lower end 191 of the scissor bar 19 is moved along the frame 14 in the forward direction F, causing the engagement member 962, the first elongate rod 966*a*, the extension 966*c*, second elongate rod 966*d* and contact head 964 to move in the forward direction F, such that the contact head 964 abuts the arm limiter assembly 970.

Accordingly, the linkage assembly 950 operatively connects the lift mechanism 18 to the arm limiter assembly 970 such that as the lift mechanism moves the seat 922 between the lowered position and the raised position, the arm limiter assembly 970 transitions between the open configuration and locking configuration, respectively. More specifically, as noted above the arm limiter assembly 970 is biased into the locked or engaged configuration (FIG. 19) when the seat is raised. When the lift mechanism 18 moves the seat 922 from the raised position to the lower position, the contact head 964 abuts the arm limiter assembly 790 causing it to transition into the open configuration (see FIG. 19). When the seat is moved from the lowered position to the raised position, the contact head 964 withdraws from contact with the arm limiter assembly 970 such that the arm limiter assembly 970 is permitted to transition back into the locked configuration (FIG. 20), by the retracting action of resilient member 978. FIGS. 19-22 illustrate just one embodiment of the linkage assembly 950 and interaction with arm limiter assembly 970. Any linkage assembly, particularly one that is actuated by the lifting mechanism and, in turn, actuates an arm limiter based on the lift position, can be used.

FIGS. 24-28 illustrate the arm limiter assembly 970 in various configurations: In the open configuration 71*o* (FIG. 24), the locking configuration 71*c* (FIG. 25), a locked and engaged configuration 71*e*, and a blocked configuration (FIGS. 27 and 27) whereby the arm member 942 prevents transition of the arm limiter assembly 970 from the open configuration into the locking configuration.

Referring first to FIG. 24, during normal operation and when the seat 922 is in the lowered position, the arm limiter assembly 970 is in the open configuration. Because the seat is lowered, the linkage assembly 950 moves the contact head 964 into engagement with leg 975 of the arm limiter assembly 970. Because the lift mechanism urges the contact head 964 forward, the contact head 964 advances the leg 975 and overcomes the biasing force of the first resilient member 978 between frame 14 and crank 974. As noted above, the second resilient member 80 biases the elongate lever 972 toward the leg 976 in rotational direction C1 (clockwise when viewing FIG. 24) so that stop 982 abuts lower end of crank 974. Because the first resilient member 978 is generally stiffer (or has a higher spring constant) than the second resilient member 80, both the crank 974 and the elongate lever 972 rotate about pivot axis P2 along direction C1 into the open configuration as illustrated in FIG. 24. In the open configuration, the anti-tip arm member 942 is rotatable through its greater range of motion. The arm 942 can pivot upwards until limited by some structure of the wheelchair or possibly element 176 of the elongate lever 972. As such, the wheelchair 910 is freely operable to traverse an obstacle O or begin a descent along the surface G.

Turning to FIGS. 25 and 26, when wheelchair 10 is operated in an elevated mode and the seat 922 is in the raised position, the contact head 964 of linkage assembly 950 is out of engagement with leg 975 (or crank 974) of the arm limiter assembly 970. The biasing force applied by first resilient member 978 to crank 974 biases the arm limiter assembly 970 into the locking configuration. Because the elongate lever 972 has pivoted with crank 974 about pivot P2 into the locking configuration, the distal surface 179*d* (Figure) of translating member 176 of the arm limiter assembly 970 is proximate the stop member 944 of the surface of the anti-tip arm 942, thus allowing relatively less upward rotational movement of the anti-tip arm 942 compared to when the arm limiter is the open configuration as described above. Accordingly, as the seat 922 is elevated into the raised position, the forward arm member 942 will have a limited range of rotation such that the wheelchair 10 is not operable to ascend an obstacle, such as a standard size curb along ground surface G. If the chair ascends or slight obstacle as shown in FIG. 26, the stop member 944 abuts end 176 of arm limiter assembly 970. The wheelchair 10 may require operational transition into the standard mode when the seat 922 is lowered before the full range of motion to the arm assembly 938 is restored and the obstacle can be safely traversed. When seat 922 is moved into lowered position (FIG. 24), the arm limiter assembly 970 is transitioned back into the open configuration due to the contact head 964 of linkage assembly 950 abutting the crank 974 and advancing the crank leg 975 and overcoming the biasing force of first resilient member 978 as noted above. The greater range of motion of the arm member 942 is thereby restored when the seat is in the lowered position.

Figure 27:
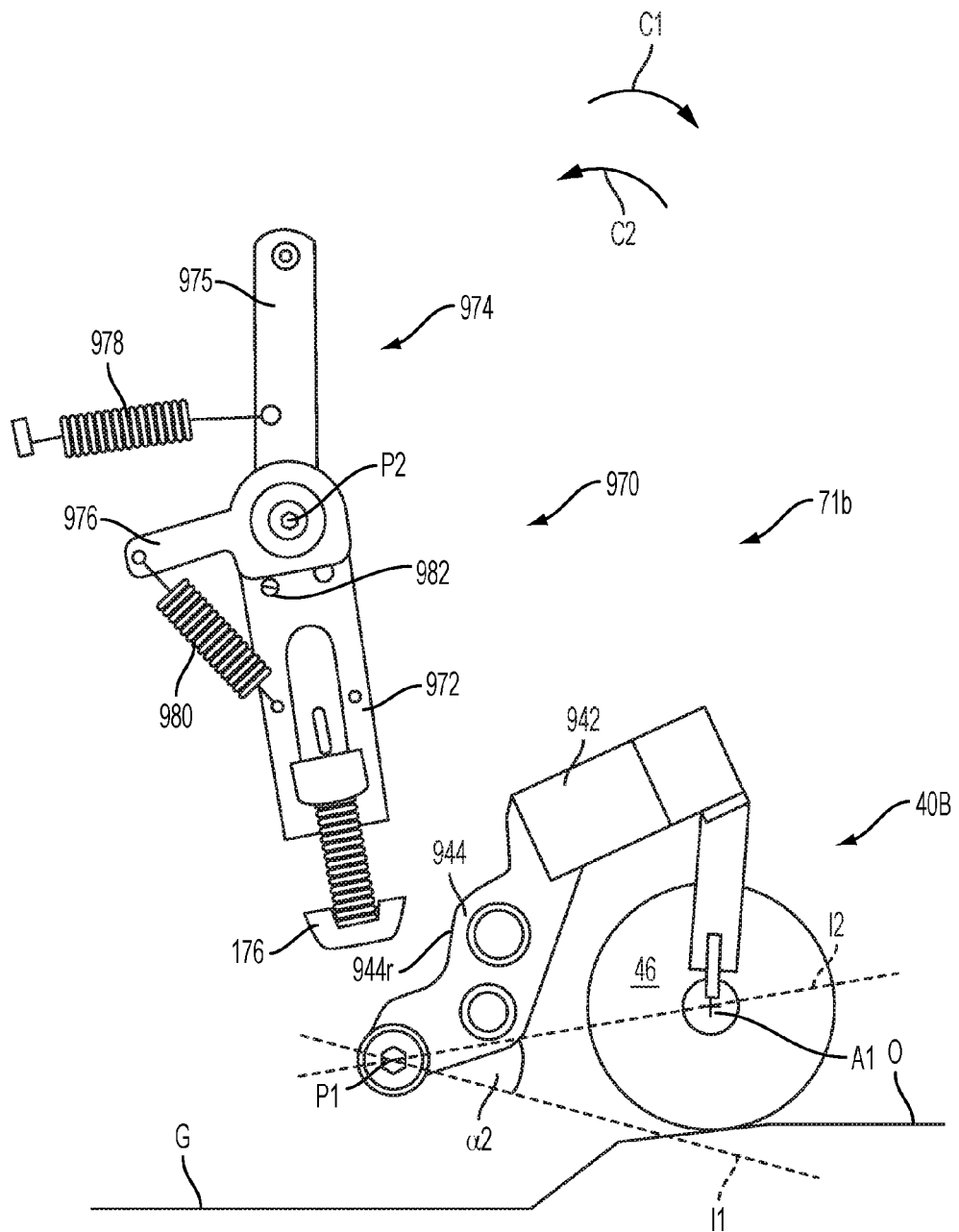
FIGS. 27 and 28 are schematic side views of the portion of the powered wheelchair shown in FIG. 24, illustrating the arm limiter assembly prevented from transitioning into the locked configuration when the seat is in a raised position and the wheelchair is encountering an obstacle.
Figure 28:
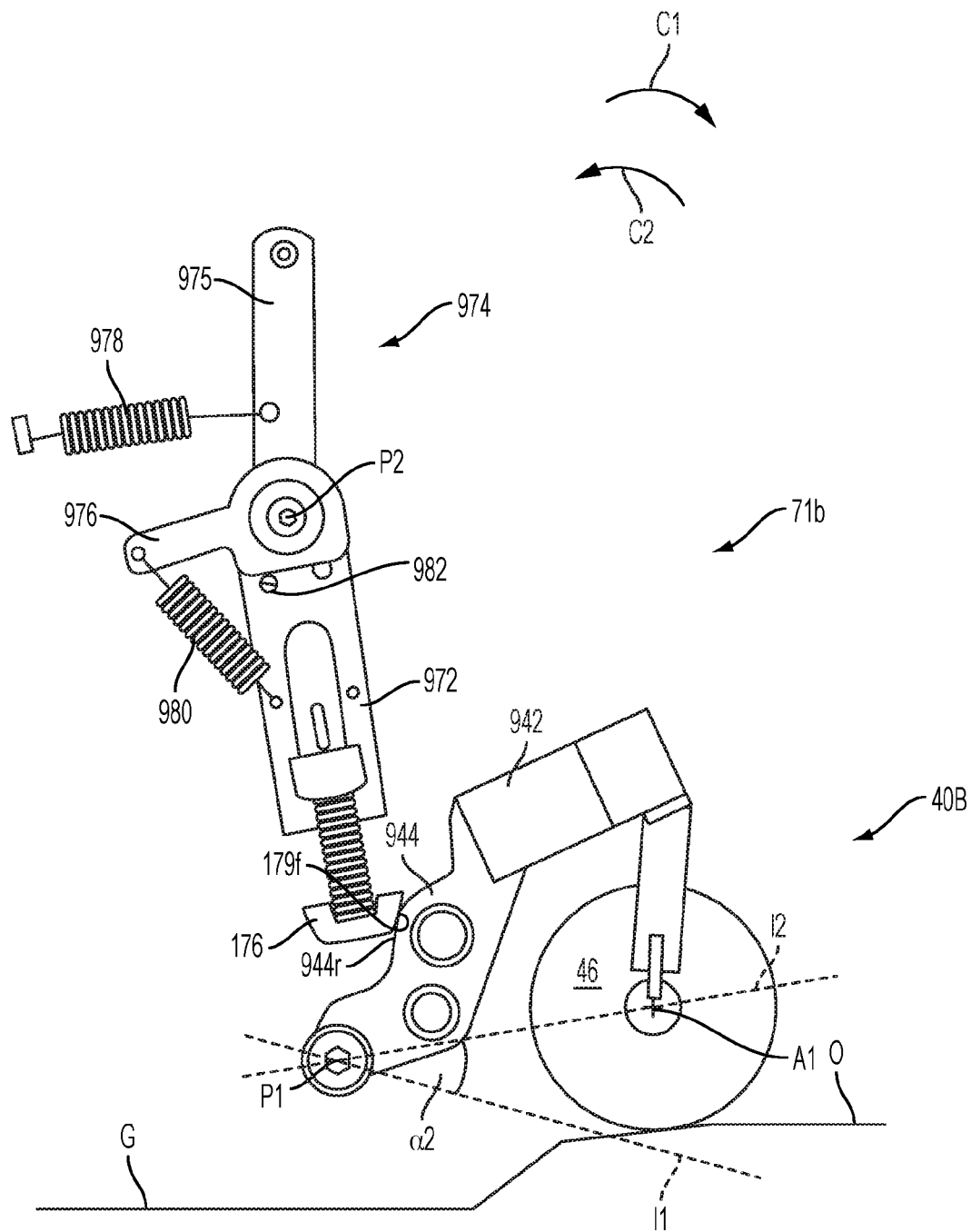

The blocking configuration 71*o* shown in FIGS. 27 and 28 is another stability feature of the wheelchair 910 of the present disclosure and will now be explained. When the wheelchair 910 is operating in normal mode with the seat lowered, there may be times when one or both anti-tip arms members 942 are raised relative to their first position 40A, such as when the wheels 46 are encountering a raised obstacle or are on an incline. Under such circumstances, the wheelchair 10 may be disabled from restricting the range of motion of the anti-tip arms 942, even if the seat is being raised. If front wheel 46 is on uneven ground G relative to the drive wheels 32, the arm member 942 moves in rotational direction C2 into position 40B that is different from the first position 40A. For example, in position 40B as illustrated in FIG. 27, front arm member 942 has been rotated upward to a point where the pivot of the wheel 46 defines a line I2 with the pivot P1 of the anti-tip arm. Lower dashed line I1 indicates the relative position of the line between these points—first position 40A—when the wheelchair 10 is on flat, level ground as described above. (See, for example, FIG. 24). The angle α2 depicted in FIGS. 27 and 28 is the rotational difference of the wheel 46 from its first position 40A. As can be seen in FIGS. 27 and 28, when the arm member 942 is pivoted upward from its first position, the rear surface 44*r* of the stop member 944 is positioned to engage lateral surface 179*f* (FIG. 7) of translating member 176 before preventing the elongate lever 972 and thus the arm limiter assembly 970 from transitioning completely into the locking configuration. FIGS. 27 and 28 depicts one way to prevent the arm limiter assembly 970 from transitioning into the locking configuration according to an embodiment of the present invention. Other mechanically based variations, such as other interfering structure associated with the anti-tip arm and/or the limiter, are possible. Sensor-controlled lock actuators, such as one controlled by an inclination sensor, are also possible. Whatever inhibiting means are chosen, when the position of the arm member 942 is substantially rotationally different from its first position 40A to a degree that could engender a tipping or instability risk, the arm limiter assembly 970 can be prevented from transitioning into locking configuration until the wheelchair 910 operating on flat, level ground.

Preferably, according to some embodiments, the arm limiter assembly is prevented from transitioning to the locking configuration when the anti-tip arm member or wheel 46 is rotationally different from its first position by a predetermined angle. The predetermined angle can be about 4 degrees or more, at least 4 degrees or more, equal to 4 degrees. For example, the second position 40*b* illustrated in FIG. 4C can be when the arm member 42 is rotationally different from the first position 40A by a predetermined angle. In some embodiments the predetermined angle is by at least six (6) degrees, at least (5) degrees, at least four (4) degrees, at least three (3) degrees or at least two (2) degrees. In other embodiments, the predetermined angle is at least about six (6) degrees, at least about five (5) degrees, at least about four (4) degrees, at least about three (3) degrees or at least about two (2) degrees. As illustrated, the angle α2 between the first line I1 and the fixed line I2 is about 4 degrees.

In another embodiment, the elongate lever 972 is constructed so that its length is adjustable, such as by constructing it of two interlocking and telescoping pieces. In this manner, the longitudinal extent of the lever 972 and final longitudinal positioning of its translating member 176 can be adjusted so that the spatial constraint on the transitioning of the arm limiter is likewise adjustable.

Figure 29:
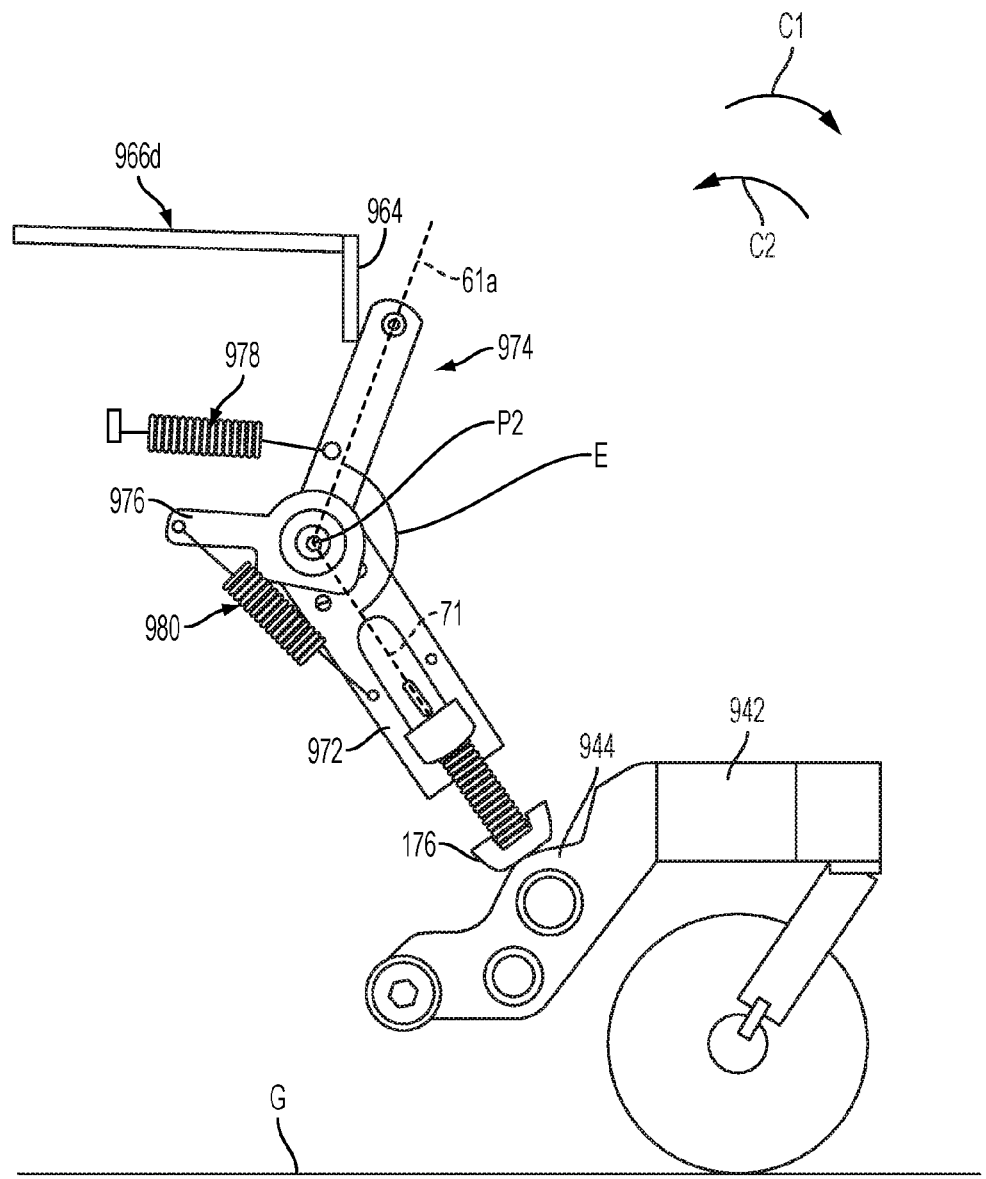
FIG. 29 is a schematic side view of the portion of the powered wheelchair shown in FIG. 24, illustrating the linkage assembly engaged and the arm limiter assembly in the locking configuration as the seat is lowered from a raised position to a lowered positioned while the wheelchair is encountering an obstacle.
Figure 30:
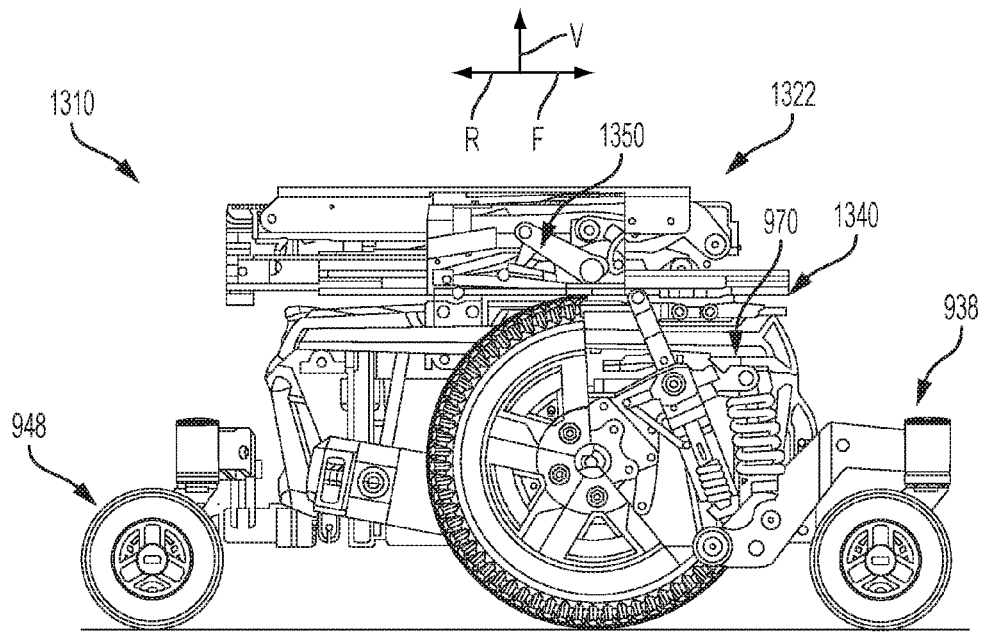
FIG. 30 is a side elevation view of the powered wheelchair according to another embodiment of the present disclosure, with a portion of the seat removed and illustrating the seat in a lowered position, a linkage assembly and arm limiter assembly.
Figure 31:
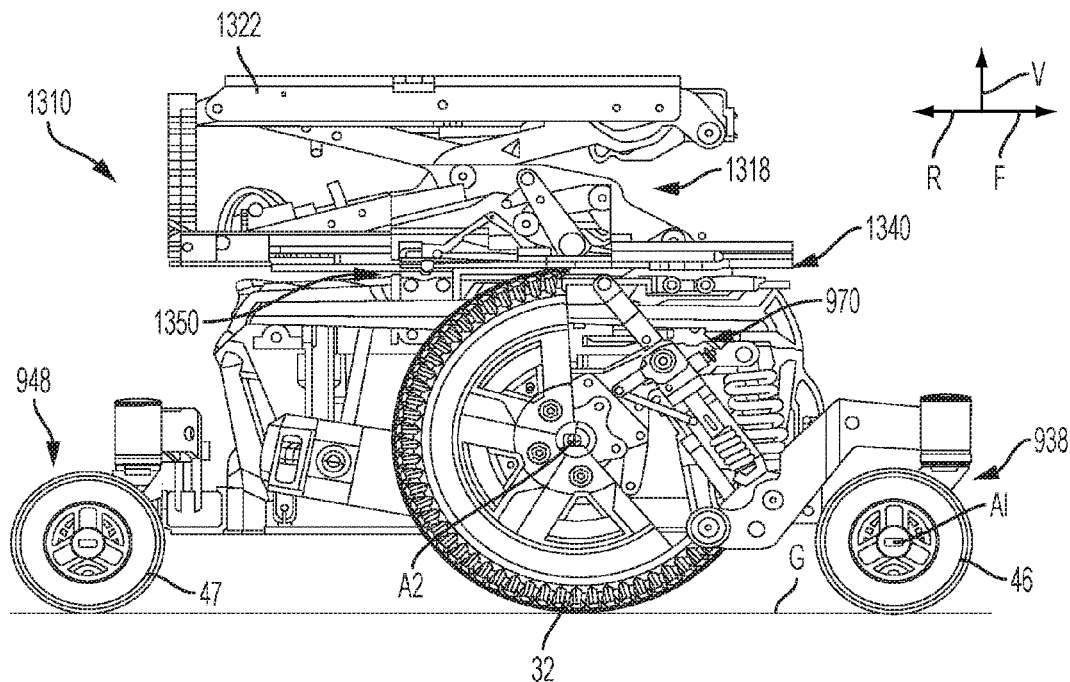
FIG. 31 is a side elevation view of the powered wheelchair shown in FIG. 30, with a portion of the seat removed and illustrating the seat in a raised position.

FIG. 29 depicts a circumstance of operation that occurs when 1) the seat is raised, 2) the arm limiter assembly 970 is in the second, locked configuration, and 3) the anti-tip arm 942 encounters a small obstacle (not shown) and is pushed upward, into actual or near contact (as illustrated) with the arm limiter assembly 970. If the occupant attempts to lower the seat in that circumstance, the contact head 964 of linkage assembly 950 would come back into contact with the leg 975 of the crank 974 and apply a force that exceeds the biasing forces of both resilient members 978 and 980. The result is that the crank 974 rotates relative to the elongate lever 972 in rotational direction C1 even though the lever 972 is spatially constrained to stay in the locked position while the anti-tip arm is raised for the obstacle O. This prevents the arm limiter assembly and lift mechanism from locking out during operation. As soon as the obstacle is traversed and the anti-tip arm lowers, resilient member 80 pulls crank 974 toward the stop 982 to the first position as shown in FIG. 24.

FIGS. 30-39 illustrates an alternative embodiment of the powered wheelchair 1310. The powered wheelchair 1310 is similar to the powered wheelchair 10 and 910 described above and illustrated in FIGS. 1-29. The description below regarding wheelchair 1310 will use similar reference signs to identify elements common to wheelchairs 10 and/or 910 and wheelchair 1310. As illustrated, the powered wheelchair 1310 includes an alternative embodiment of the linkage assembly. The powered wheelchair 1310 of FIG. 30, like the previous embodiments, includes a frame 14, drive wheels 32 coupled to the frame 14, a pair of forward arm assemblies 938 with front wheels 46, a pair of rear arm assemblies 948 with rear wheels 47, and an arm limiter assembly 970. The powered wheelchair 1310 also includes control system and sensors 96a, 96b, 96c, similar to the wheelchair 10 described above. In accordance with this alternative embodiment, the wheelchair 1310 includes alternative lift mechanism 1318 mounted to the frame 14 and configured to move the seat 1322 between the lowered and raised positions. An alternative linkage assembly 1340 operatively connects the lift mechanism 118 to the arm limiter assembly 970 such that as the seat 1322 is moved between the lowered position and the raised position, the arm limiter assembly 970 transitions between the open configuration and locking configuration.

Figure 32A:
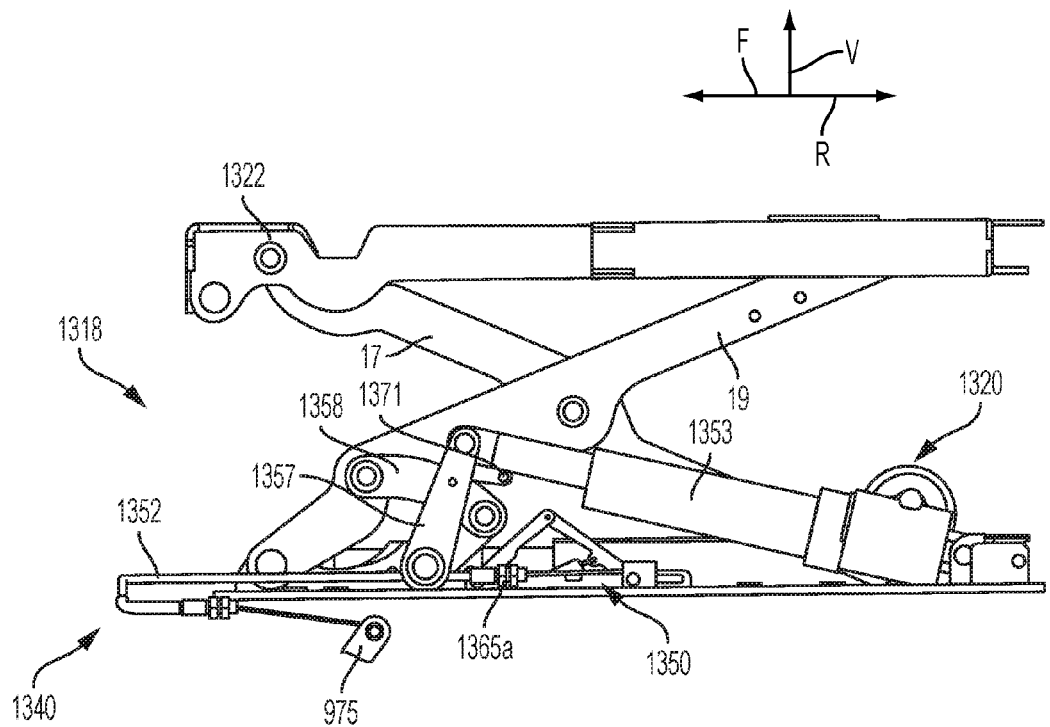
FIGS. 32A and 32B are side views of a portion of the powered wheelchair illustrated in FIGS. 30-31, illustrating a lift mechanism according to another embodiment of the present disclosure showing raised and lowered position, respectively.
Figure 32B:
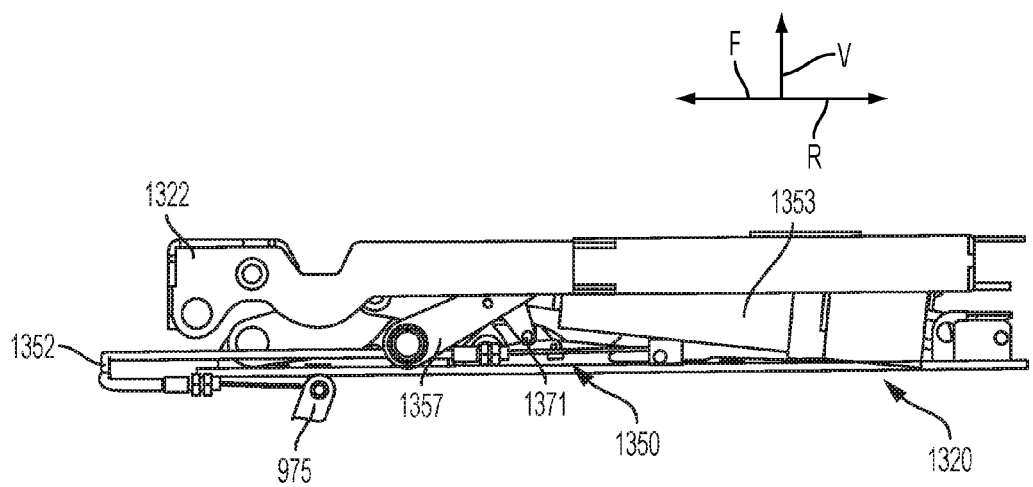

FIGS. 32A and 32B illustrate partial views of the wheelchair showing the lift mechanism 1318 and linkage assembly 1340. The lift mechanism 1318 includes lift arms 17 and 19 and a lift actuator 1320. The lift actuator 1320 is operatively connected to the lift arm 19 (or 17) and the linkage assembly 1340 so that changes in seat position relative to the frame 14, e.g., as the seat 1322 is raised or lowered relative to frame 14 along a vertical direction V, causes actuation of the linkage assembly 1340 as further detailed below. As shown in FIGS. 32A and 32B, the actuator 1320 includes a strut 1353, a pivot lever 1357, and contact arm 1371. One end of the strut 1353 is pivotably coupled to the pivot lever 1357. The pivot lever 1357 includes a lever pin (not shown) that extends into an elongate slot (not shown) defined by a curved plate 1358. The curved plate 1358 is coupled to the lift arm 19. As lift mechanism 1318 raises the seat 1322 from the lowered position (FIG. 32B) to a raised position (FIG. 32A) the strut 1353 causes the lever 1357 to pivot upwardly. The lever pin rides along slot in the curved plate 1358 to aid in initiating a lift sequence of the seat 1322. As lift mechanism lowers the seat 1322 from the raised position (FIG. 32A) to the lowered position (FIG. 32B), the strut 1353 causes the lever 1357 to pivot toward the frame 14. As the lever 1357 pivots, the contact arm 1371 pivots into engagement with the linkage assembly 1340.

Figure 34A:
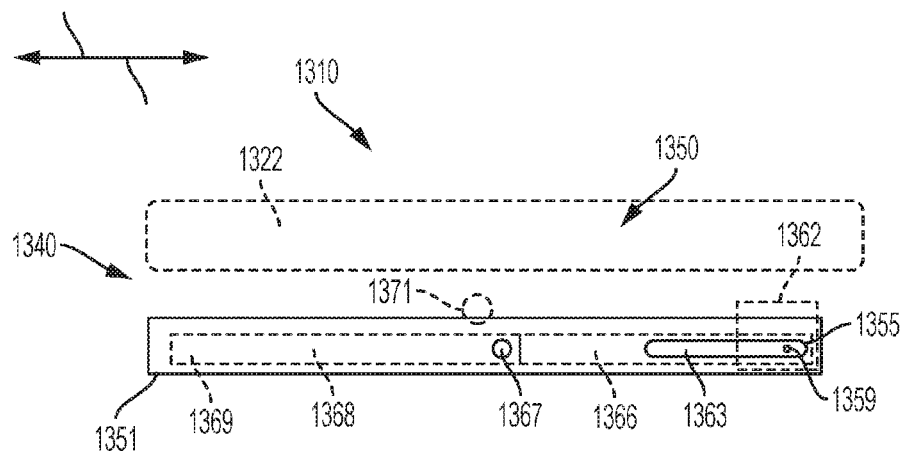
FIGS. 34A and 34B are schematic side and top views, respectively, of the powered wheelchair illustrated in FIGS. 30-33, illustrating the linkage assembly and with the seat in a lowered position.
Figure 34B:
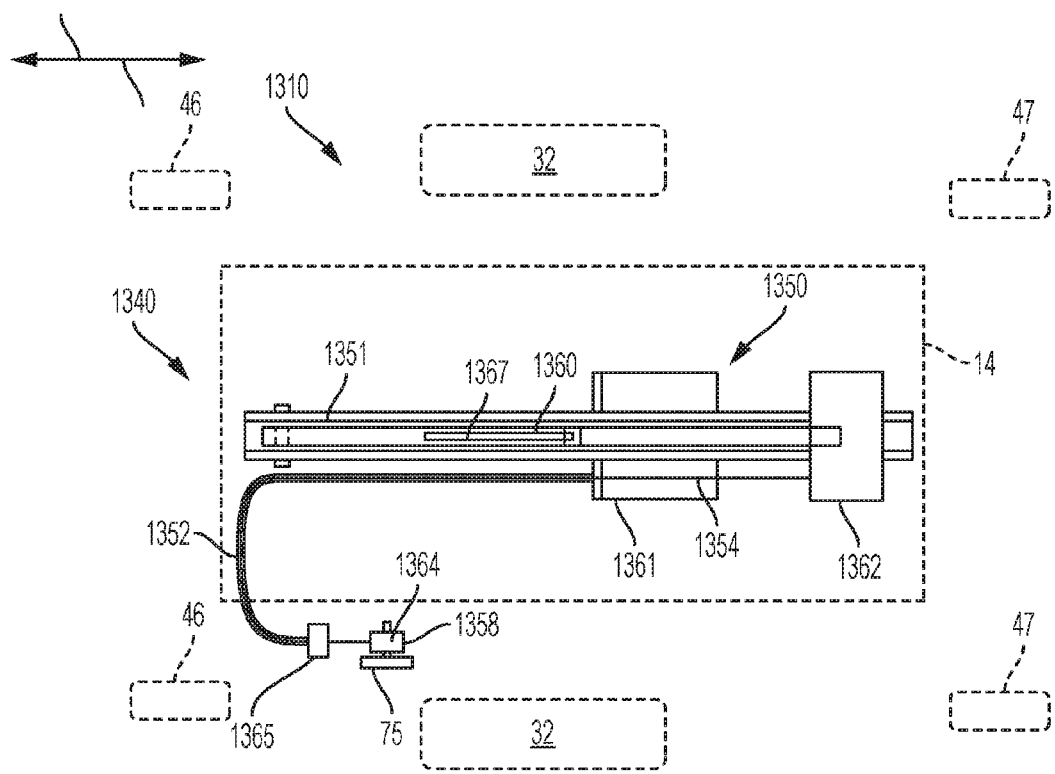
Figure 34C:
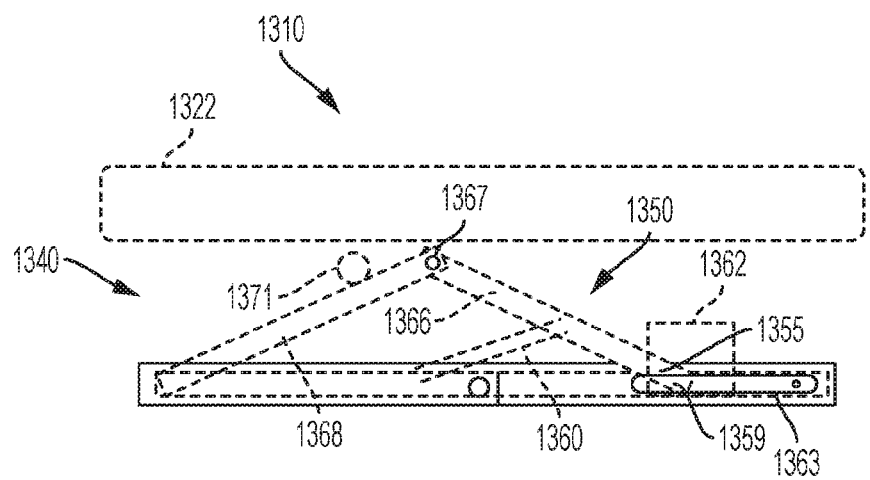
FIGS. 34C and 34D are schematic side and top views, respectively, of a portion of the linkage assembly shown in FIGS. 34A and 34B, illustrating engagement between the linkage assembly and the seat in a raised position.

FIGS. 34A-34B illustrate a schematic of the wheelchair 1310 with the seat and seat frame removed and the frame 14, drive wheels 32, and forward wheels 46 and rear wheels 47 shown in dashed lines to better illustrate operation of the linkage assembly 340. The linkage assembly 340 is configured so that when the seat 22 is lowered as illustrated in FIGS. 32A and 32B (seat 1322 not shown in FIG. 32A), the arm limiter assembly 970 is in the first or open configuration. When the seat 1322 is raised as illustrated in FIGS. 34C and 34D, the arm limiter assembly 970 transitions into the second or locked configuration.

Figure 33:
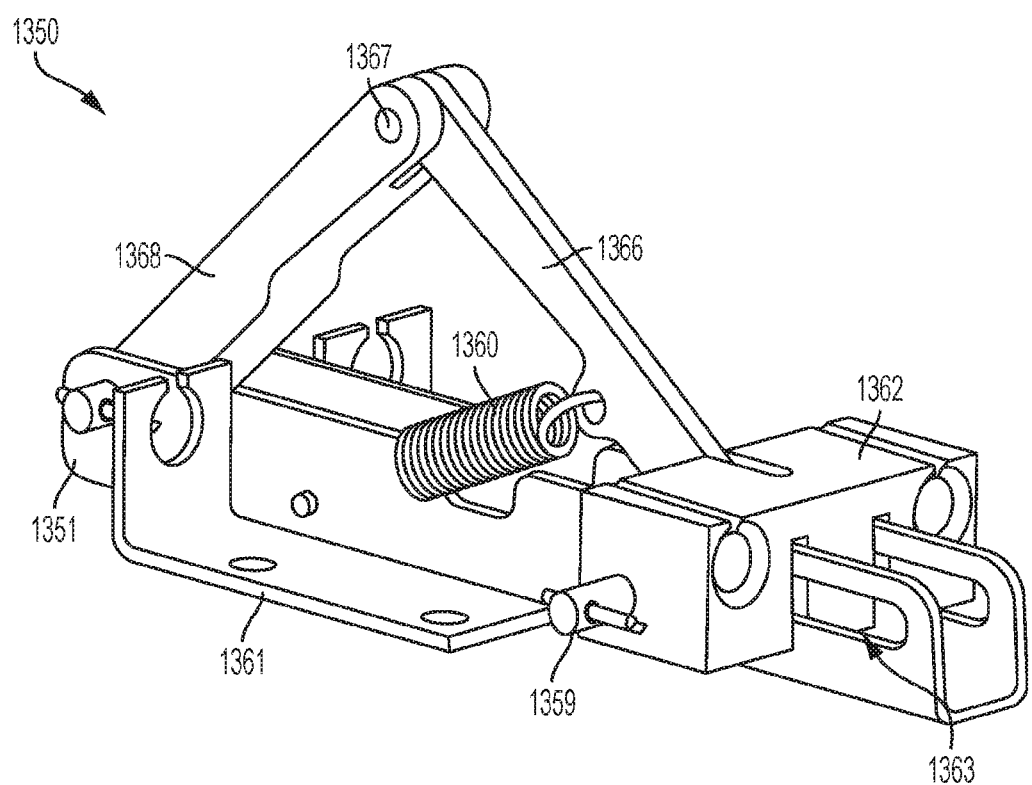
FIG. 33 is a perspective view of an actuator of the linkage assembly shown in FIGS. 30-32B.
Figure 34D:
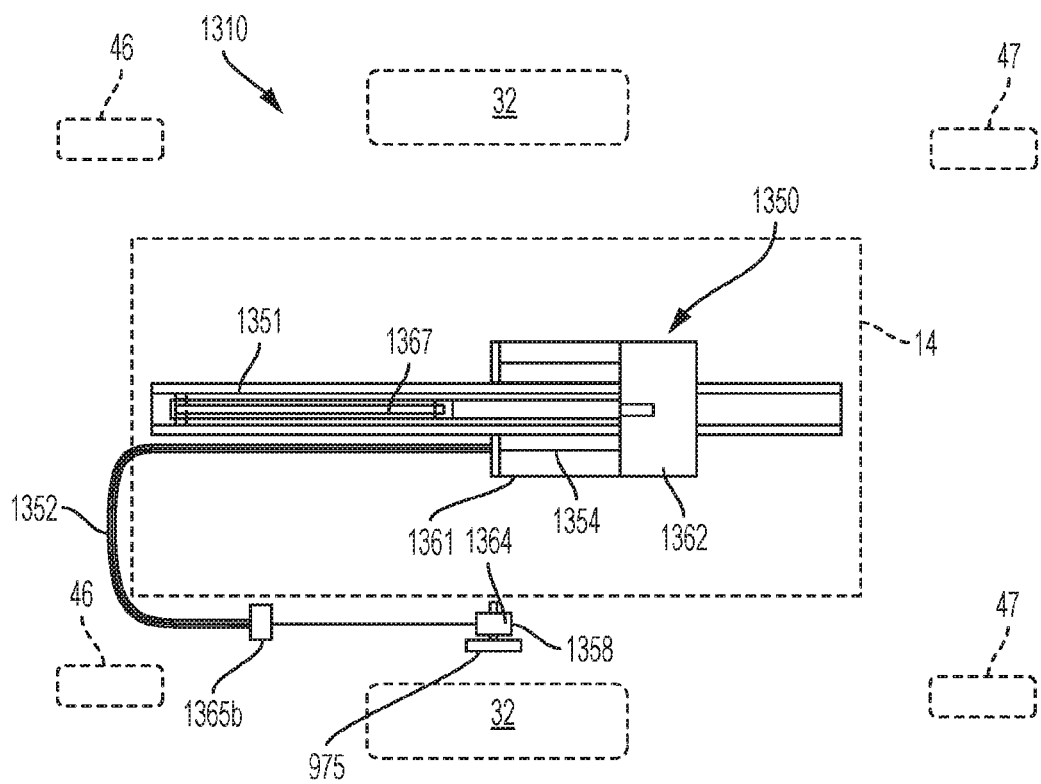

Referring to FIGS. 33-34D, the linkage assembly 340 includes a linkage actuator 1350, sometimes referred to as bridge or bridge assembly, and a cable assembly 1352. The linkage actuator 1350 is supported by the frame 14 and positioned between left and right scissor assemblies (not numbered) of the lift mechanism 1318. The linkage actuator 1350 is coupled to the lift mechanism 318 and the cable assembly 1352. The cable assembly 1352 is in turn coupled to the arm limiter assembly 970, in particular the first leg 975 of the arm limiter assembly 970.

As shown in FIG. 33, the linkage actuator 1350 includes a support member 1351, a first rod 1366 having an end 1355 moveably coupled to the support member 1351 (see FIG. 34A, a second rod 1368 having an end 1369 that is fixed to the support member 1351 via pivot connector (not numbered), and a biasing member 1360 coupled between the support member 1351 and first rod 1366. The linkage actuator 1350 also includes a coupling head 1362 slidable along the support member 1351 and fixed to the first rod end 1355 via connector pin 1359 (FIG. 34A). The first and second rods 1366 and 1368 are pivotably coupled to each other via pivot connector 1367. The support member 1351 is an elongate track that is sized to at least partially receive the first and second rods 1366 and 1368. The support member 1351 further has slot 1363 extending therethrough along a direction perpendicular the elongate direction of the support member 1351. The first coupling head 1362 is coupled to the movable end 1355 of the first rod 1366 via a connector pin 1359. The connecter pin 1359 extends through the slot 1363 of the support member 1351 and a slot (not numbered) of the first rod 1366.

The cable assembly 1352 includes a sleeve, a cable member 1354 positioned at least partially within the sleeve, and cable supports 1365a (not shown) and 1365b. The cable member 1354 includes first and second opposed ends 1356 and 1358 fixed to first and second coupling heads 1362 and 1364. The coupling head 1364 is fixed to the leg 975. The sleeve is flexible and can bend as needed to extend from the actuator 1350 to the arm limiter assembly 970. Cable support 1365a is attached to the plate 1361 to position the cable 1354 in-line with the coupling head 1362. Cable support 1365b fixes the sleeve end to frame 14 forward of the arm limiter leg 975. Only one cable assembly 352 is shown in FIGS. 34A and 34B, the other cable assembly for the other side of the chair 1310 is similar. The linkage actuator 1350 is coupled to the first coupling head 1362 and one end 1356 of the cable member 1354. The second coupling head 1364 is fixed to the arm limiter assembly 970, for instance to the first leg 975 of the crank 974 (crank 974 not in FIGS. 32A-34D), via the second coupling head 1364.

The biasing member 1360, which can be a spring, is coupled to support member 1351 and the first rod 1366 and is configured to bias the end 1355 (FIG. 34A) of the first rod 1366 toward the fixed end 1369 of the second rod 1368 and urge the pivot point 1367 upwardly. Because the first coupling head 1362 is coupled to the end 1355 of the rod 1366, when the seat 22 is raised the first coupling head 1362 is biased into a retracted position and the cable member 354 slides through the sleeve. Thus, the pivot point 1367 moves from a raised position relative to the frame 14 to the lowered position relative to frame 14 as lift mechanism 18 moves the seat 1322 from the raised position to the lowered position.

When the seat is lowered from a raised position to a lowered position, the contact leg 1371 abuts the second rod 1368, urging the first and second rods 1366 and 1368 into a linear, elongated configuration, advancing the moveable end 1355 of the first rod 1366 along support member 1351, as shown in FIG. 34B. Advancement of the end 1355 advances the first coupling head 1362 into a position, which pulls the cable member 1354 and the leg 975 of arm limiter 970 into the open configuration. Movement of the seat 22 to the raised position causes the first coupling head 1362 to move into the retracted position (FIG. 34D). The biasing member 360 also pulls the first coupling head 362 into the retracted position, which allows the arm limiter assembly 970, by action of the biasing member 978 (FIG. 23), to transition from the first or open configuration into the second or locked configuration, again in a manner similar to depicted in the earlier embodiment. To reduce stress on the linkage assembly 1340, in some embodiments, when the actuator 1350 is tied to the seat position, the biasing member 1360 (along with biasing member 978) is configured to urge the arm limiter 970 toward the locking configuration position when the actuator 350 is in a first condition, e.g. when the coupling head 1362 is in a retracted position. The actuator 1350 is configured to urge the limiter 970 toward the disengaged position when the actuator 1350 is in a second condition, e.g. when the coupling head 1362 is in an extended position.

FIGS. 35-39 depict operation the linkage assembly 1340 and arm limiter assembly 970 in various configurations: The open configuration 71*o* (FIG. 35), the locking configuration 71*c* (FIG. 36), a locked and engaged configuration 71*e* (FIG. 37), and a blocked configuration (FIG. 38) whereby the arm member 942 prevents transition of the arm limiter assembly 970 from the open configuration into the locking configuration.

Figure 35:
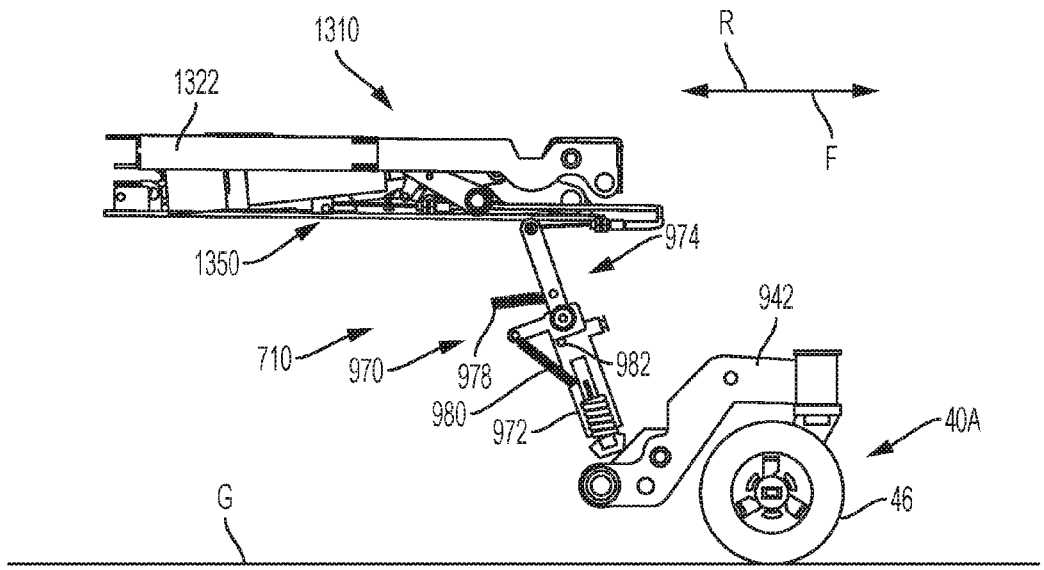
FIG. 35 is a side schematic view a portion of the powered wheelchair shown in FIGS. 30 and 31, illustrating an open configuration of the arm limiter assembly and the linkage assembly when the seat is in a lowered position and the wheelchair is operating on flat, level ground.
Figure 36:
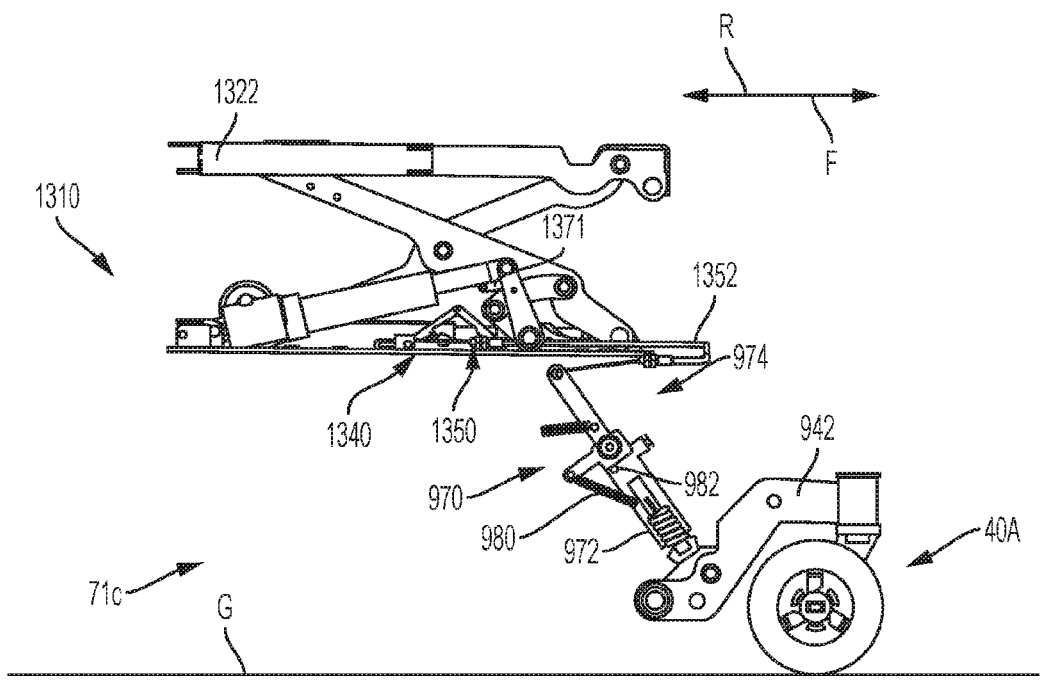
FIG. 36 is a schematic side view of the portion of the powered wheelchair shown in FIG. 24, illustrating the locking configuration of the arm limiter assembly when the seat is in a raised position and the wheelchair is operating on flat, level ground.
Figure 37:
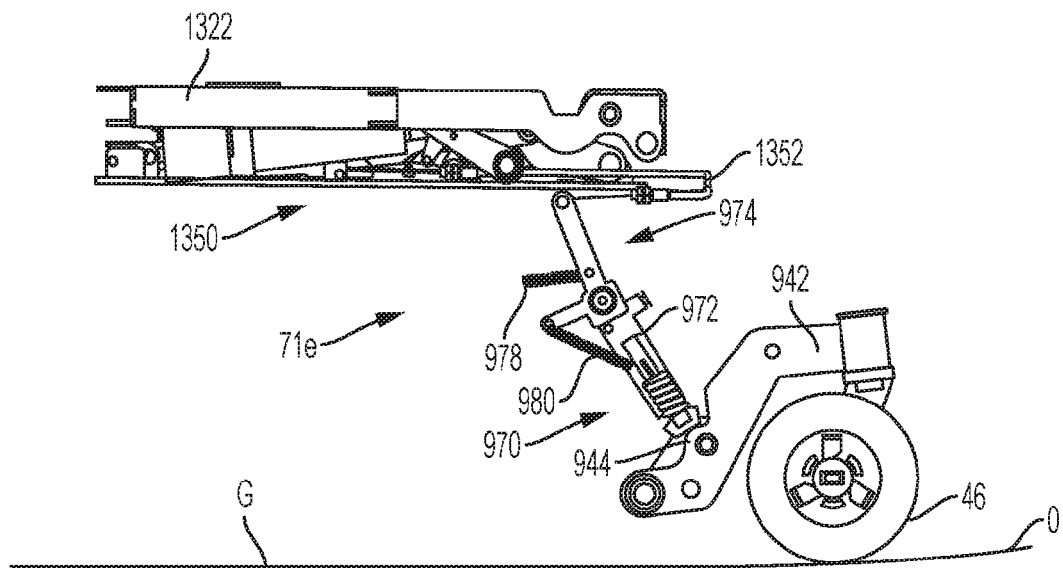
FIG. 37 is a schematic side view of the portion of the powered wheelchair shown in FIG. 24, illustrating the locking configuration when the seat is in a raised position when the seat is in a raised position and the wheelchair is encountering an obstacle.
Figure 38:
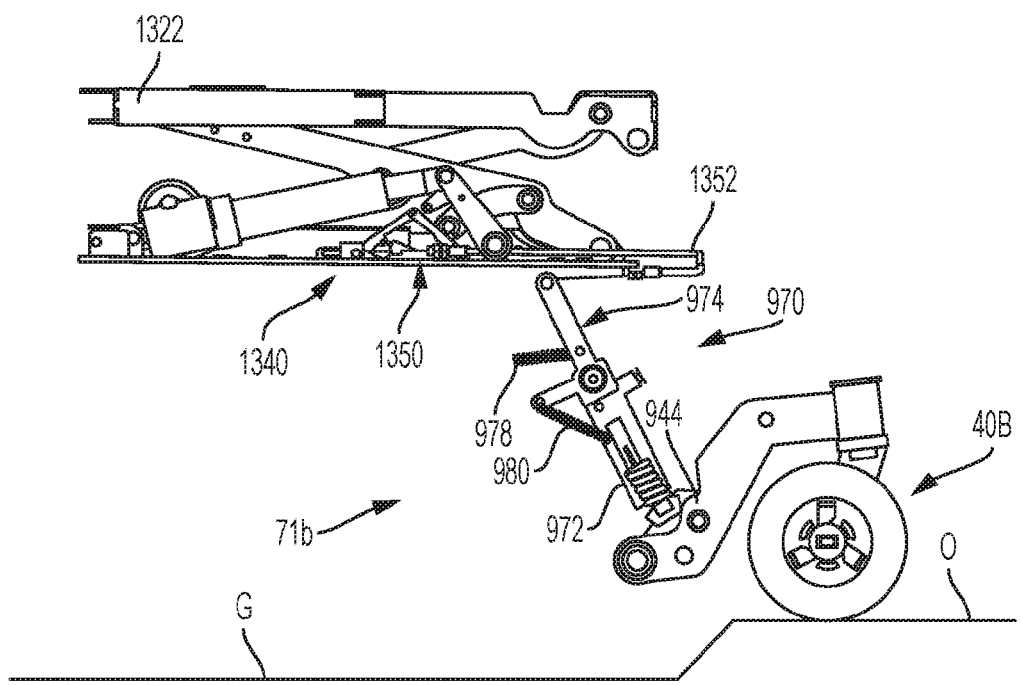
FIG. 38 is a schematic side view of the portion of the powered wheelchair shown in FIG. 24, illustrating the arm limiter assembly prevented from transitioning into the locked configuration when the seat is in a raised position and the wheelchair is encountering an obstacle.
Figure 39:
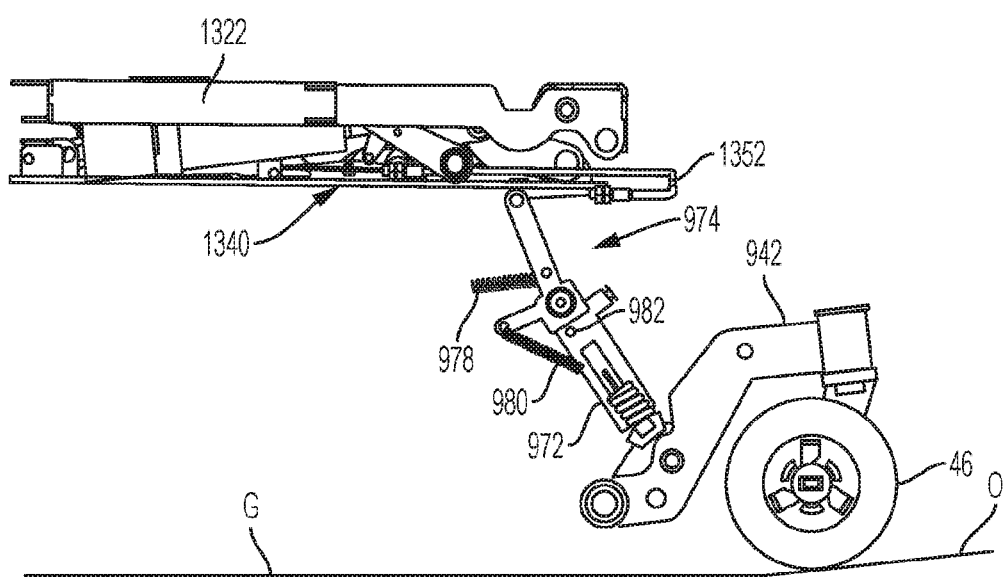
FIG. 39 is a schematic side view of the portion of the powered wheelchair shown in FIG. 24, illustrating the linkage assembly engaged and the arm limiter assembly in the locking configuration as the seat is lowered from a raised position to a lowered positioned while the wheelchair is encountering an obstacle.

Referring first to FIG. 35, during normal operation and when the seat 1322 is in the lowered position, the arm limiter assembly 970 is in the open configuration 71*o*. As shown in FIG. 36, movement of the seat 22 to the raised position causes the first coupling head 1362 to move into the retracted position in a forward direction F, which gives some slack the cable member 1352 so that that spring 978 and 980 rotates the crank 974 and elongate member 972 into the locking configuration 71*c*. In FIG. 37, when the wheel chair 1310 approaches a slight obstacle, the spatial location of the wheel 46 and wheel axis A1 shifts and the stop 944 abuts the limiter assembly 970 in an engaged configuration 71*e*. As shown in FIG. 38 illustrates the blocking configuration 71*o*, where the spatial location of arm member 942 and wheel axis A1 is rotationally different than the first position 40A (FIG. 35) and blocks further progression of the arm limiter 970 into the locking configuration. Finally, FIG. 39 illustrates circumstance when 1) the seat is raised, 2) the arm limiter assembly 970 is in the second, locked configuration, and 3) the anti-tip arm 942 encounters a obstacle (not shown) and is pushed upward. If the occupant attempts to lower the seat, the linkage actuator 1350 pulls the crank 74 in a forward rotation direction. This can apply a force to crank 974 exceeds the biasing forces of both resilient members 978 and 980. The crank 974 then rotates relative to the elongate lever 972 in rotational direction C1 (not shown) even though the lever 972 is spatially constrained to stay in the locked position while the arm member 942 and wheel axis A1 is raised for the obstacle O.

FIGS. 40-43 depict another embodiment of the powered wheelchair of the invention. This embodiment, generally designated 1410 is configured similar to the powered wheelchairs 10, 910, and 1310 described above. For instance, the powered wheelchair 1410 includes a frame 14, drive wheels 32 coupled to the frame 14, a pair of forward arm assemblies 938 with a front wheels 46, a pair of rear arm assemblies 948 with rear wheels 47, a lift mechanism 18 mounted to the frame 14 and configured to move the seat 22 between the lowered and raised positions, and a linkage assembly 950 (FIGS. 21 and 22) or the alternative linkage assembly 1340 (FIGS. 34A-34D). The powered wheelchair 410 includes a control system and sensors, similar to any on the wheelchairs 10, 110, 210, 310 . . . 910, and 1310 described above. Accordingly, the description below regarding wheelchair 1410 will use similar reference signs to identify elements common to wheelchair 10 and wheelchair 1410. In accordance with the alternative embodiment, the wheelchair 1410 includes an arm limiter assembly 1470 constructed according to an alternative embodiment.

Figure 40:
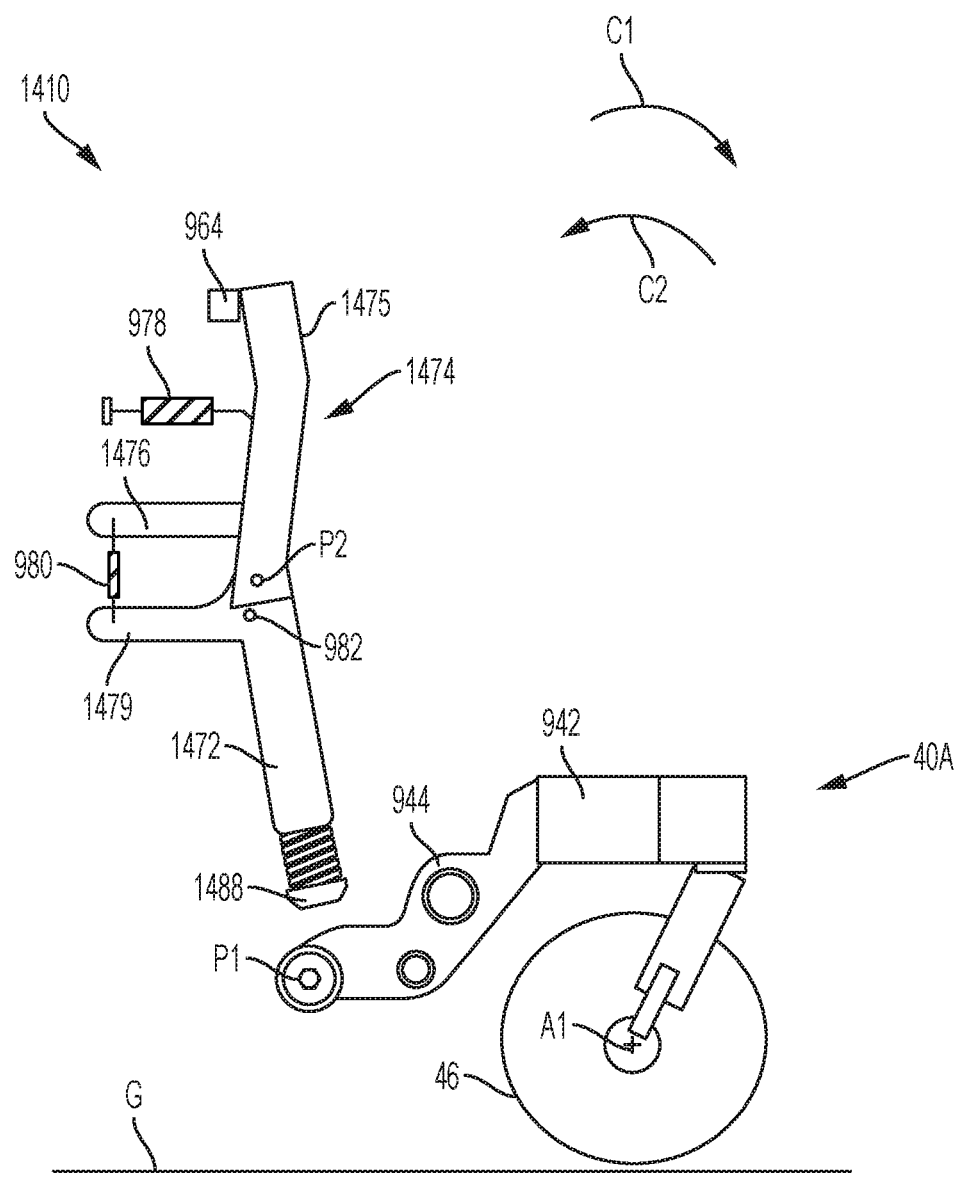
FIG. 40 is a side schematic view a portion of a powered wheelchair according to another embodiment, illustrating an open configuration of the arm limiter assembly and the linkage assembly when the seat is in a lowered position and the wheelchair is operating on flat, level ground.

Turning to FIG. 40, the arm limiter assembly 1470 is configured to transition between the open configuration and the locking configuration so as to limit the range of rotation or motion of the arm member 942 as described above with respect to arm limiter assembly 970. Arm limiter assembly 1470 includes a crank 1474 and an elongate lever 1472, both of which are rotatably coupled to frame 14 at the rotation point P2. The crank 1474 includes first and second elongate legs 1475 and 1476 fixed to each other. The crank 1474 is rotatably coupled to the frame 14 at the rotation point (not shown) proximate where the first and second legs axes 61*a* and 61*b* intersect (61*a* and 61*b* not shown but defined similar to axis shown in FIG. 7). The first leg 1475 has a free end (not numbered) opposite to the rotation point along the axis 61*a*. The first leg 1475, for instance the free end, is configured to be engaged by the engagement head 64 of the linkage assembly 950, or head 1364 of the alternative, cable-based linkage system, as will be further detailed below. The second leg 974 includes a free end (not numbered) opposite to the rotation point along the axis 61*b*, similar to the arm limiter assembly 970 shown in FIG. 7. The first resilient member 1478 can be a spring coupled to frame 14 and the first leg 475.

The elongate lever 1472 is configured to selectively contact the stop member 944 of the arm member 1442, similar to the elongate lever 1472 described above. In accordance with the embodiment illustrated in FIGS. 19-21, a leg 1479 is fixed to the elongate lever 1472 proximate the pivot P2. The second resilient member 1480 is connected to the leg 1479 of the lever 1472, in essence creating a second crank. The first crank 1474 and the crank of legs 1479 and 1472 are rotatably mounted on to the frame at P2 and are rotatable relative to each other. Second resilient member 1480 here, as in the earlier embodiment, places a second biasing force on lever 1479 (and 1472) urging the lever 1472 in the rotation direction C1 about pivot P2. In all other respects, the arm limiter assembly 970 of the first embodiment and the arm limiter assembly 1470 here are similar. For example, the second biasing force applied by the resilient member 1480 is greater than the first biasing force applied by resilient member 1478. The arm limiter assembly 1470 can include a mechanical stop, such as the stop 982 in the earlier embodiment, to restrict the extent of relative rotation of the levers 1479 and 1472 towards the crank 1474 in direction C1.

Figure 41:
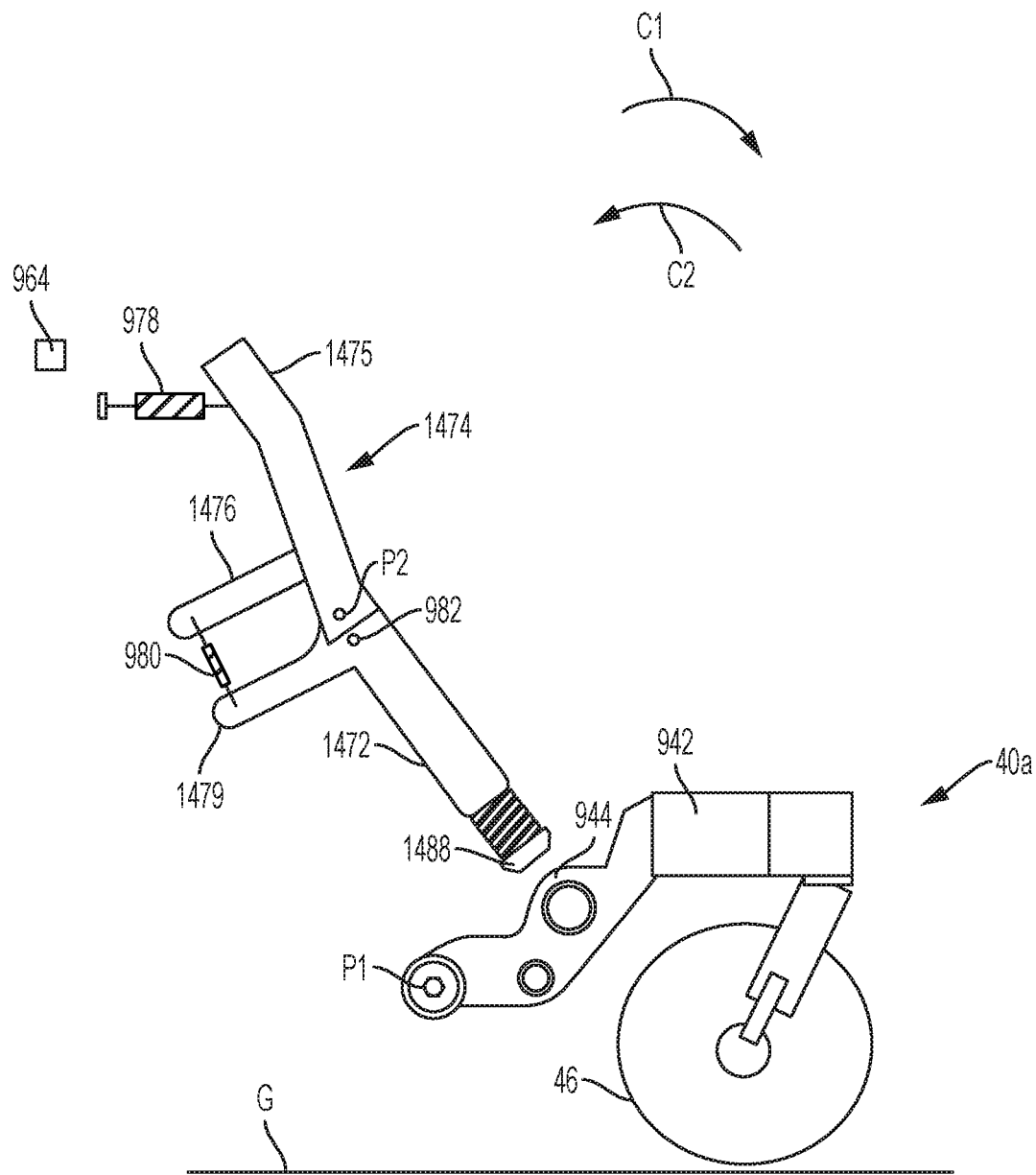
FIG. 41 is a schematic side view of the portion of the powered wheelchair shown in FIG. 40, illustrating the locking configuration of the arm limiter assembly when the seat is in a raised position and the wheelchair is operating on flat, level ground.
Figure 42:
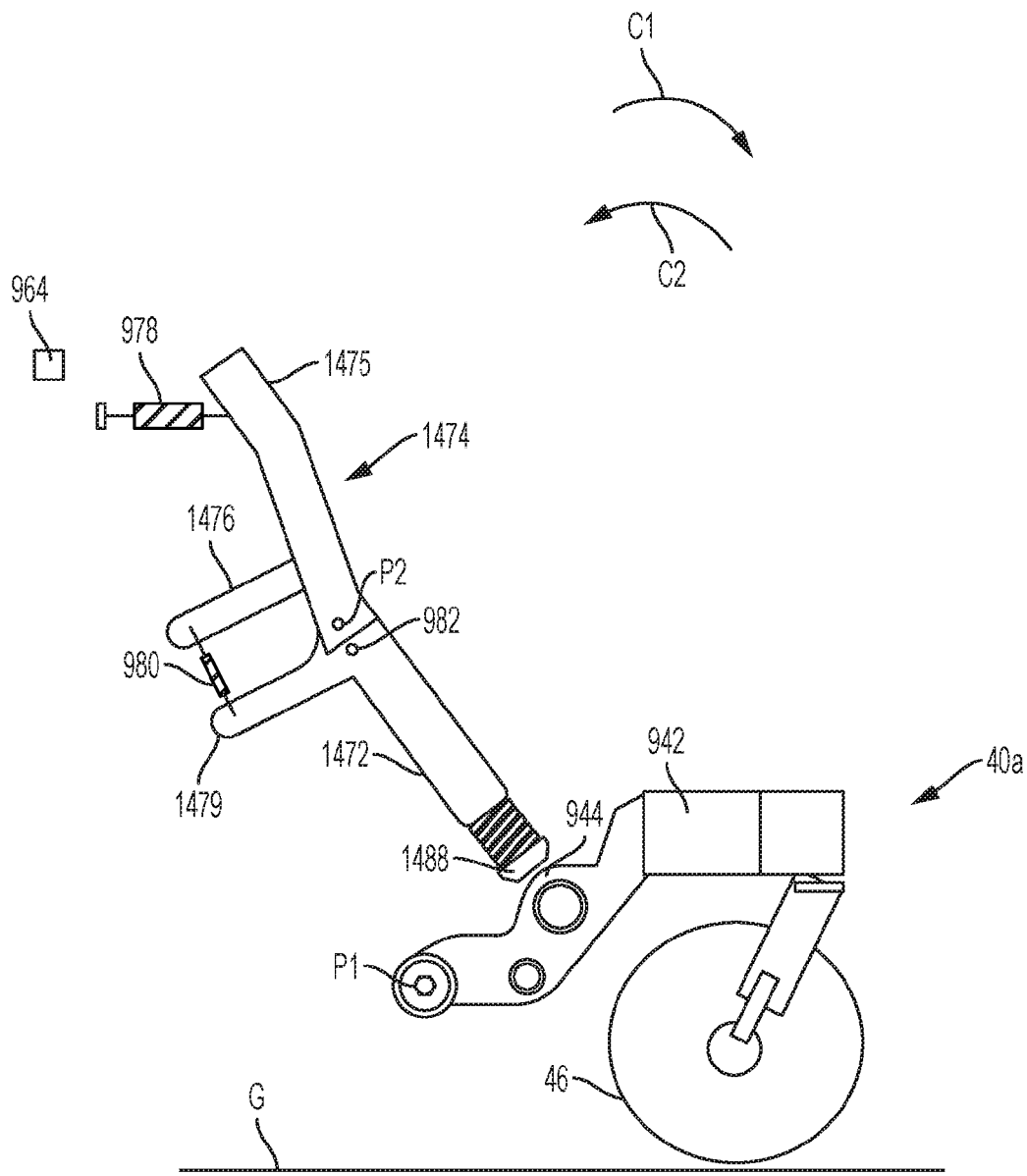
FIG. 42 is a schematic side view of the portion of the powered wheelchair shown in FIG. 40, illustrating the locking configuration when the seat is in a raised position when the seat is in a raised position and the wheelchair is encountering an obstacle.

FIG. 40 illustrates the arm limiter assembly 1470 in the open configuration, FIG. 41 in the locking configuration, and FIG. 42 in the blocked configuration, whereby the arm member 942 is raised and the stop member prevents the arm limiter 1470 from transitioning from the open configuration into the locking configuration. Referring first to FIG. 18, during normal operation and when the seat 1422 is in the lowered position, the arm limiter assembly 470 is in the open configuration. Because the seat is lowered, the linkage assembly 950 (or 340) moves the contact head 964 or 364 to a point that urges first leg 1475 and the arm limiter assembly into the open configuration. The second resilient member 1480 biases the elongate lever 1472 toward the crank 1474 in the first rotational direction C1 (clockwise when viewing FIG. 40) and against the stop 982 (not shown). As noted above, in the open configuration, the arm member 942 is rotatable through its greater range of motion, such that the wheelchair 10 is operable normally to traverse an obstacle or navigate a descent along the surface G.

Turning to FIG. 41, when wheelchair 1410 is operated in an elevated mode with the seat raised, linkage assembly 950, 340 withdraws contact head 964 or 364 from engagement with leg 1475 the arm limiter assembly 1470, thereby allowing the arm limiter assembly 1470 to transition into the locked configuration from the bias exerted by spring member 978. Because the elongate lever 1472 has pivoted into the locking configuration, the translating member 1488 is positioned to abut the top surface of the stop member 944, thus limiting upward rotational movement of the arm member 942 to its second range of motion. Accordingly, when the seat 1422 is elevated into the raised position, the forward arm member 942 will have a limited range of rotation such that the wheelchair 410 is operable to ascend only relatively smaller obstacles than when in the configuration of FIG. 18. When seat 22 is moved into lowered position, the arm limiter assembly 1470 is transitioned back into the open configuration such that range of motion of the arm member 942 is restored.

Figure 43:
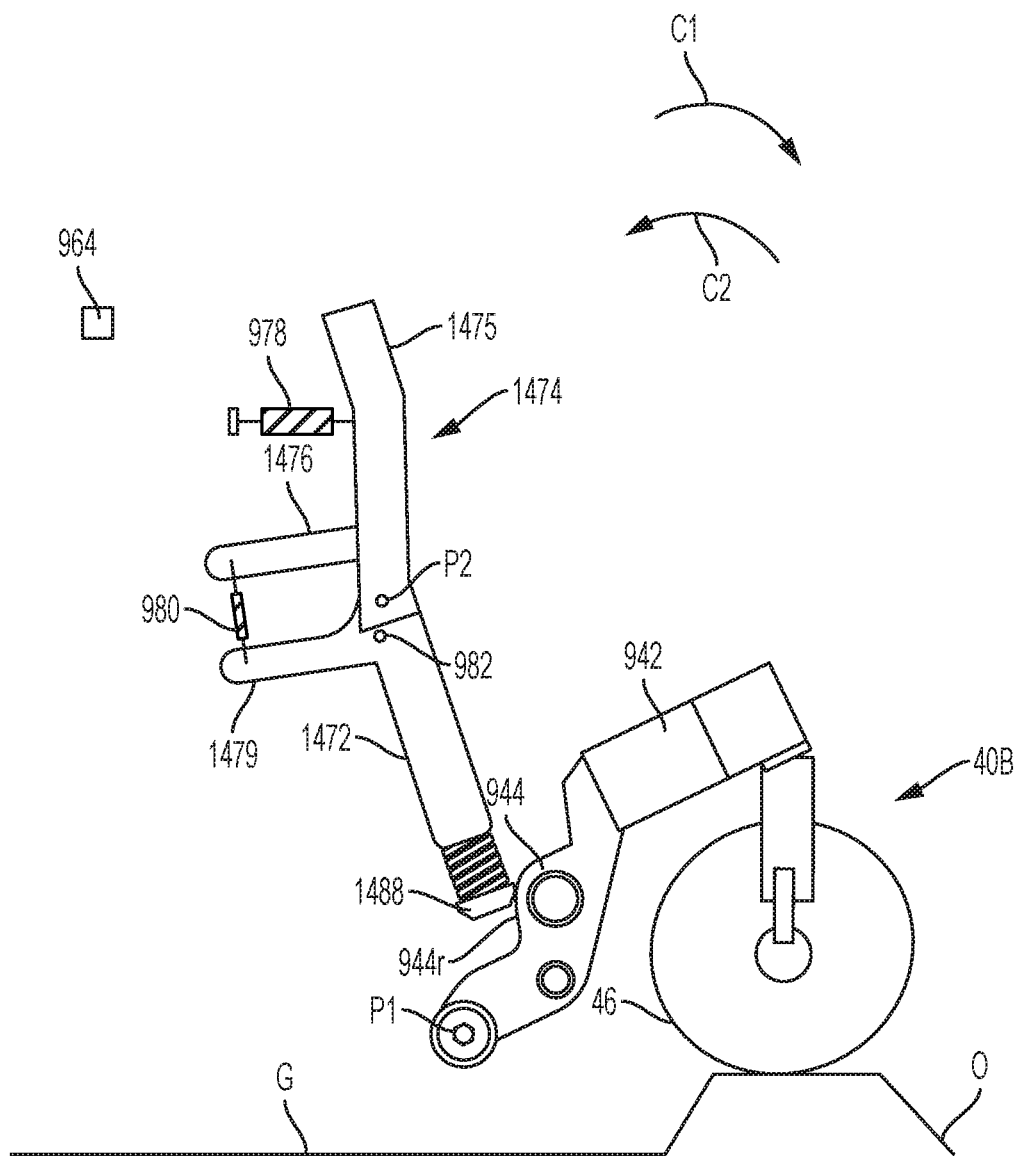
FIG. 43 is a schematic side view of the portion of the powered wheelchair shown in FIG. 40, illustrating the arm limiter assembly prevented from transitioning into the locked configuration when the seat is in a raised position and the wheelchair is encountering an obstacle.
Figure 44:
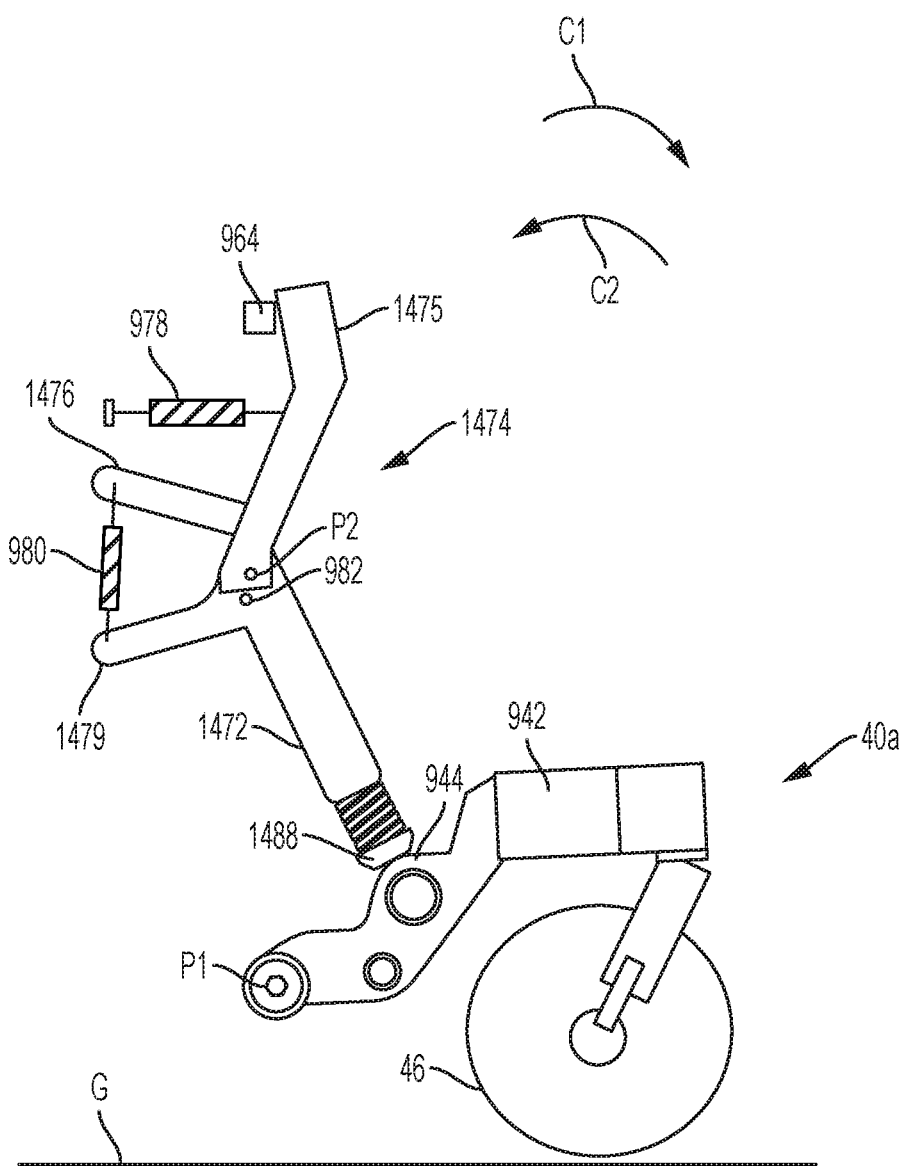
FIG. 44 is a schematic side view of the portion of the powered wheelchair shown in FIG. 40, illustrating the linkage assembly engaged and the arm limiter assembly in the locking configuration as the seat is lowered from a raised position to a lowered positioned while the wheelchair is encountering an obstacle.

FIGS. 42 and 43 depicts the analogous circumstance for arm limiter 1470 as was described with respect to FIG. 23 for arm limiter 970. When the arm position is substantially rotationally different from its first position, to a degree that could engender a tipping or instability risk, the arm limiter can be prevented from transitioning into its second position until the chair is returning to more level, even ground. Accordingly, if front wheel 46 is on uneven ground surface G relative to the drive wheels 32, the arm member 942 will have been pivoted in an upward rotational direction C2 into position 40B, which is rotationally different from the first position 40A. When the arm is so pivoted upward from its first position, the rear surface 944r of the stop member 944 on the arm member 942 would be contacted by the edge of translating member 1488 (FIG. 43) before it can rotate in direction C2 to its second, locking configuration. The arm limiter is prevented from transitioning to its second position when the anti-tip arm is rotationally different from its first position by a predetermined angle. As noted above, the predetermined angle can be about 4 degrees or more, at least 4 degrees or more, equal to 4 degrees. In some embodiments the predetermined angle is at least six (6) degrees, at least (5) degrees, at least four (4) degrees, at least three (3) degrees or at least two (2) degrees. In other embodiments, the predetermined angle is at least about six (6) degrees, at least about five (5) degrees, at least about four (4) degrees, at least about three (3) degrees or at least about two (2) degrees.

FIG. 43 depicts a circumstance of operation that occurs when 1) the seat is raised, 2) the arm limiter assembly 1470 is in the second, locked configuration, and 3) the anti-tip arm 942 encounters a small obstacle (not shown), and so is pushed upward, into actual or near contact with the arm limiter assembly 1470. If the occupant attempts to lower the seat in that circumstance, the linkage contact head 964 (or 1364) would come back into contact with leg 1475 of crank 1474 and apply a force that exceeds the biasing forces of both resilient members 978 and 980. The result is that the crank 474 rotates relative to the elongate lever 1472 in rotational direction C1, even though the lever 1472 is spatially constrained while the anti-tip arm is raised for the obstacle to stay in the locked position. This prevents the arm limiter assembly and lift mechanism from locking out during operation. As soon as the obstacle is traversed and the anti-tip arm naturally lowers, resilient member 80 pulls lever 1479 to rotate assembly 1470 in direction C1 back as far as stop 982 (not shown), to the first position of FIG. 18.

The safety features described in present disclosure are not limited to the powered wheelchair configurations specifically disclosed and illustrated in the accompanying drawings. The wheelchair as described herein can include any one of the arm limiter assemblies 60, 160, 260, 360, 460, 560, 660, 760, 860, 970, or 1470 described herein, a forward arm assembly moveably, i.e. rotatably and/or translatably, coupled to the frame 14, and a rearward arm assembly moveable coupled to the frame 14. More specifically, such a wheelchair includes a forward arm member 42 and a rearward arm member 49 (see FIG. 2A) that are both moveable relative to the frame such that the front wheel 46 and rear wheel 49, respectively, are moveable relative to the frame 14 away (upwardly or downwardly) from their respective first or rest positions. Movement of the wheels 46 and 49 away from the first positions are dependent on the features on the ground G that wheelchair is traversing. In certain embodiments, the forward arm member 42 and the rearward arm members 49 can be linked, directly or indirectly, such that movement of one arm member causes movement of the other arm member. In such an embodiment, arm limiter assemblies 60, 160, 260, 360, 560, 660, 760, 860, 970, or 1470 as described herein selectively permit or prevent movement of 1) the forward arm member 42, 2) the rearward arm member 49, or 3) both the forward and rearward arm member 49 upwardly or downwardly with respect to the first position of each respective wheel 46 and 47. More specifically, any one of arm limiter assemblies 60, 160, 260, 360, 560, 660, 760, 860, 970, or 1470 can be positioned toward the front 14f of the frame 14 to selectively inhibit movement of the front arm assembly 38. And because the forward arm member 42 is linked to the rear arm member 49, when the front arm member 42 has a limited range of motion due to engagement with the arm limiter assembly, the rear arm member 49 has a limited range of motion as well. The reverse is contemplated—that the arm limiter assembly engaged with rear arm member 47 and limiting its range of motion also limits the range of motion of the forward arm member 42. In addition, if one of the front arm member 42 or the rear arm member 49 is moved out of its first or rest position prior to the arm limiter assembly transitioning into the locking configuration, stop members along each arm member 42 or 49 inhibits the arm limiter assembly from transitioning into the locked configuration. When the wheelchair returns to flat, level ground, the front and rear arm members 42 and 49 return to the first position and the arm limiter assembly transitions into the locking configuration.

Various embodiments of wheelchairs have been described. It should be appreciated that the features and elements from one wheelchair can be combined with features and elements of another wheelchair. For instance, any wheelchair 10, 110, 210, 310, 410, 510, 610, 710, 810, 910, 1310, and 1410 may include any one of the arm limiter assemblies 60, 160, 260, 360, 460, 560, 660, 760, 860, 970, or 1470. Further, any components for each arm limiter assemblies 60, 160, 260, 360, 460, 560, 660, 760, 860, 970, or 1470 may be combined with other components from each arm limiter assembly 60, 160, 260, 360, 460, 560, 660, 760, 860, 970, or 1470 as needed. Further linkage assemblies 50, 950, and 1340 may be incorporated into any embodiment of the wheelchairs 10, 110, 210, 310, 410, 510, 610, 710, 810, 910, 1310, and 1410 described here.

While the foregoing description and drawings represent the various exemplary embodiments of the present disclosure, it will be understood that various additions, modifications, combinations and/or substitutions may be made therein without departing from the spirit and scope of the invention as defined in the accompanying claims. In particular, it will be clear to those skilled in the art that the invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components, which are adapted to specific environments and operative requirements without departing from the principles of the invention. In addition, features described herein may be used singularly or in combination with other features. For example, features described in connection with one component or embodiment may be used and/or interchanged with features described in another component or embodiment. The presently disclosed embodiments are therefore to be considered in all respects as illustrative and not restrictive, the scope of the invention being indicated by the appended claims, and not limited to the foregoing description.

What is claimed:

1. A powered wheelchair comprising:
   a frame;
   a lift mechanism supported by the frame;
   a seat supported by the lift mechanism, the lift mechanism configured to move the seat between a lowered position and a raised position;
   a pair of drive wheels;
   at least one drive coupled to the frame and configured to apply a torque to at least one of the drive wheels;
   an arm assembly including an arm member that is pivotably coupled to the frame and a wheel coupled to the arm member, the arm member configured to be in a first position relative to the frame when the wheelchair is operating on flat ground and to be rotatable from that first position; and
   an arm limiter supported by the frame and configured to inhibit motion of the arm member, the arm limiter including a crank rotatably coupled to the frame at a rotation point, and an elongate lever that is rotatably coupled to the frame at the rotation point, the elongate lever having a first end and a second end opposite the first end, and the second end of the elongate lever is configured to be in selective contact with a surface of the arm member, the arm limiter having a) a first configuration in which the arm member is rotatable from the first position through a first range of rotation, and b) a second configuration in which the arm member is rotatable from the first position only through a second range of rotation that is smaller than the first range of rotation,
   wherein the arm limiter is prevented from transitioning into the second configuration when the arm member is rotationally different from the first position.

2. The powered wheelchair of claim 1, wherein as the lift mechanism moves the seat from the lowered position to the raised position, the arm limiter transitions from the first configuration into the second configuration.

3. The powered wheelchair of claim 1, further comprising a linkage assembly that operatively connects the lift mechanism to the arm limiter such that as the seat is moved between the lowered and raised positions, the linkage assembly causes the arm limiter to transition between the first and second configurations.

4. The powered wheelchair of claim 3, wherein the crank includes first and second legs fixed to each other, the first leg having a free end opposite the rotation point, the free end coupled to the linkage assembly.

5. The powered wheelchair of claim 3, wherein the arm limiter further comprises:
   a first resilient member that couples the crank to the frame and that biases the arm limiter into the second configuration;
   a mechanical stop supported by the elongate lever, the mechanical stop configured to restrict relative rotation of the crank and the elongate lever; and
   a second resilient member attached between the second leg of the crank and the elongate lever so as to bias the elongate lever in a first rotational direction such that the stop abuts the crank.

6. The powered wheelchair of claim 5, wherein the first resilient member applies a first biasing force to the arm limiter and the second resilient member applies a second biasing force to the arm limiter that is greater than the first biasing force so as to maintain the relative positions of the first and second elongate members when the first and second elongate members rotate relative to the frame in a first rotational direction.

7. The powered wheelchair of claim 6, configured such that when 1) the arm member is in an upwardly pivoted position relative to its first position, 2) the arm limiter is in the second configuration, and 3) the seat is in motion toward the lowered position, the linkage assembly contacts the first leg of the crank with a force that exceeds the biasing force of the second resilient member such that the crank rotates relative to the elongate lever in a second rotational direction opposite the first rotational direction.

8. The powered wheelchair of claim 3, wherein the linkage assembly is configured to urge the arm limiter toward the first configuration as the lift mechanism moves the seat from the raised position to the lowered position.

9. The powered wheelchair of claim 3, wherein the linkage assembly includes a linkage actuator configured to permit the arm limiter to transition between the first and second configurations.

10. The powered wheelchair of claim 9, wherein the linkage assembly includes a first coupling head that is operably coupled to the lift mechanism, a second coupling head that is coupled to the arm limiter, and a cable member that extends from the first coupling head to the second coupling head.

11. The powered wheelchair of claim 10, wherein the linkage actuator is configured to cause the second coupling head to transition between first and second positions, thereby transitioning the arm limiter between the first and second configurations, respectively.

12. The powered wheelchair of claim 1, wherein the arm assembly is a forward arm assembly such that the arm member extends in a forward direction away from the frame.

13. The powered wheelchair of claim 1, wherein the arm assembly is a rear arm assembly such that the arm member extends in a rearward direction away from the frame.

14. A powered wheelchair comprising:
a frame;
a lift mechanism supported by the frame;
a seat supported by the lift mechanism, the lift mechanism configured to move the seat between a lowered position and a raised position;
a pair of drive wheels;
at least one drive coupled to the frame and configured to apply a torque to at least one of the drive wheels;
a front arm assembly including a front arm member that is rotatably coupled to the frame and a wheel coupled to the front arm member, the front arm member configured to be in a first position relative to the frame when the wheel chair is operating on flat ground;
an arm limiter supported by the frame and configured to inhibit motion of the front arm member, the arm limiter having a first configuration in which the front arm member is rotatable from the first position through a first range of rotation, and a second configuration in which the arm member is rotatable from the first position only through a second range of rotation that is smaller than the first range of rotation; and
a linkage assembly that operatively connects the lift mechanism to the arm limiter such that as the seat is moved between the lowered and raised positions, the linkage assembly causes the arm limiter to transition between the first and second configurations,
wherein the arm limiter is prevented from transitioning into the second configuration when the arm member has rotated from the first position to a second position.

15. The powered wheelchair of claim 14, wherein the arm limiter is prevented from transitioning into the second configuration when the second position of the front arm member is rotationally different from the first position relative to the frame by more than 2 degrees.

16. The powered wheelchair of claim 14, wherein the arm limiter comprises:
a first elongate member rotatably coupled to the frame at a rotation point, the first elongate member coupled to the linkage assembly;
a second elongate member rotatably coupled to the first elongate member at the rotation point, the second elongate member configured to contact a surface of the front arm member when the arm limiter is in the second configuration;
a first resilient member that biases the arm limiter towards the second configuration such that as the lift mechanism moves from the lowered position to the raised position, the first resilient member transitions the arm limiter into the second configuration; and
a second resilient member that biases the second elongate member in a first rotational direction toward the first elongate member.

17. The powered wheelchair of claim 16, wherein the arm limiter includes a mechanical stop configured to restrict the extent of rotation of the first and second elongate members relative to each other.

18. The powered wheelchair of claim 16, wherein the first resilient member applies a first biasing force to the arm limiter and the second resilient member applies a second biasing force to the arm limiter that is greater than the first biasing force so as to maintain the relative positions of the first and second elongate members when the first and second elongate members rotate relative to the frame in the first rotational direction.

19. The powered wheelchair of claim 14, further comprising at least one seat position sensor that is configured to detect when the seat in the lowered position or the raised position.

20. The powered wheelchair of claim 19, further comprising a controller in electronic communication with the seat position sensor, the controller configured to cause the powered wheelchair to operate in an elevated mode at an inhibited speed when the seat is in the raised position.

21. The powered wheelchair of claim 14, further comprising an inclination sensor that is configured to detect when the frame is in a level position with respect to a horizontal plane or an unleveled position with respect to the horizontal plane.

22. The powered wheelchair of claim 21, further comprising a controller in electronic communication with the inclination sensor, the controller configured to cause the powered wheelchair to operate in an elevated mode at an inhibited speed when the frame in the unleveled position.

23. The powered wheelchair of claim 21, wherein the controller is configured, in response to input from an input device to operate the wheelchair in an elevated motion mode, operate the powered wheelchair at a maximum raised-seat drive speed when the frame is in the level position.

24. The powered wheelchair of claim 14, wherein the arm limiter is a first arm limiter disposed on a first side of the frame, and the powered wheelchair further comprises a second arm limiter, wherein when either of the first and second arm limiters are prevented from the transitioning into second configuration, a controller causes the powered wheelchair to operate at an inhibited speed.

25. A powered wheelchair comprising:
a frame;
a lift mechanism supported by the frame;
a seat supported by the lift mechanism, the lift mechanism configured to move the seat between a lowered position and a raised position;
a pair of drive wheels;
at least one drive coupled to the frame and configured to apply a torque to at least one of the drive wheels;
an arm assembly including an arm member that is rotatably coupled to the frame and a wheel coupled to the arm member, the arm member configured to be in a first position relative to the frame when the wheel chair is operating on flat ground;
an arm limiter supported by the frame and configured to inhibit motion of the arm member, the arm limiter having a first configuration in which the arm member is rotatable from the first position through a first range of rotation, and a second configuration in which the arm member is rotatable from the first position only through a second range of rotation that is smaller than the first range of rotation; and
a linkage assembly that operatively connects the lift mechanism to the arm limiter such that as the seat is moved between the lowered and raised positions, the linkage assembly causes the arm limiter to transition between the first and second configurations.

26. The powered wheelchair of claim 25, wherein the arm limiter is prevented from transitioning into the second configuration when the arm member has rotated from the first position to a second position.

27. The powered wheelchair of claim 25, wherein the arm member is a front arm member that is operatively coupled to the at least one drive, such that, when the wheelchair traverses an obstacle, the torque applied to the at least one of the drive wheel causes the forward arm member to rotate.

28. The powered wheelchair of claim 25, wherein the arm limiter comprises:
   a first elongate member rotatably coupled to the frame at a rotation point, the first elongate member coupled to the linkage assembly;
   a second elongate member rotatably coupled to the first elongate member at the rotation point, the second elongate member configured to contact a surface of the arm member when the arm limiter is in the second configuration;
   a first resilient member that biases the arm limiter towards the second configuration such that as the lift mechanism moves from the lowered position to the raised position, the first resilient member transitions the arm limiter into the second configuration; and
   a second resilient member that biases the second elongate member in a first rotational direction toward the first elongate member.

29. The powered wheelchair of claim 28, wherein the linkage assembly includes a first coupling head that is operably coupled to the lift mechanism, a second coupling head that is coupled to the arm limiter, and a cable member that extends from the first coupling head to the second coupling head.

30. The powered wheelchair of claim 29, wherein the linkage assembly includes a linkage actuator configured to permit the arm limiter to transition between the first and second configurations.

31. The powered wheelchair of claim 30, wherein the linkage actuator is configured to cause the second coupling head to transition between first and second positions, thereby transitioning the arm limiter between the first and second configurations, respectively.

* * * * *